United States Patent
Kim et al.

(10) Patent No.: US 12,422,944 B2
(45) Date of Patent: Sep. 23, 2025

(54) ELECTRONIC DEVICE AND METHOD FOR DRIVING THE SAME

(71) Applicant: Samsung Display Co., Ltd., Yongin-si (KR)

(72) Inventors: Hyungbae Kim, Yongin-si (KR); Gwang-Bum Ko, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/793,645

(22) Filed: Aug. 2, 2024

(65) Prior Publication Data

US 2025/0156004 A1 May 15, 2025

(30) Foreign Application Priority Data

Nov. 10, 2023 (KR) .......................... 10-2023-0155300
Dec. 28, 2023 (KR) .......................... 10-2023-0195369

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05); *G06F 3/0412* (2013.01); *G06F 2203/04106* (2013.01)

(58) Field of Classification Search
CPC .... G06F 3/0416; G06F 3/0446; G06F 3/0412; G06F 2203/04106
See application file for complete search history.

(56) References Cited

U.S. PATENT DOCUMENTS

| | | |
|---|---|---|
| 8,228,312 B2 | 7/2012 | Matsubara |
| 11,675,446 B2 | 6/2023 | Kim et al. |
| 2015/0242051 A1* | 8/2015 | Ng .................. G06F 3/0418 345/174 |
| 2022/0244806 A1* | 8/2022 | Kim .................. G06F 3/0416 |
| 2023/0067179 A1 | 3/2023 | Kim et al. |

(Continued)

FOREIGN PATENT DOCUMENTS

| | | |
|---|---|---|
| CN | 113835541 A | 12/2021 |
| EP | 0740265 A2 | 10/1996 |
| KR | 10-2022-0133917 A | 10/2022 |

(Continued)

OTHER PUBLICATIONS

EPO Extended European Search Report dated Apr. 2, 2025, issued in corresponding European Patent Application No. 24211768.7, 9 pages.

*Primary Examiner* — Peter D McLoone
(74) *Attorney, Agent, or Firm* — Womble Bond Dickinson (US) LLP

(57) ABSTRACT

An electronic device includes: a display panel; a sensor layer on the display panel, the sensor layer having a sensing area corresponding to a display area of the display panel, the sensing area comprising a first area and a second area surrounding the first area; and a sensor driver configured to: drive the sensor layer; receive a sensing signal corresponding to an input device, the sensing signal comprising a first peak value, a second peak value, and a third peak value; and calculate coordinates of the input device at the second area based on the second peak value and the third peak value.

30 Claims, 34 Drawing Sheets

(56) References Cited

U.S. PATENT DOCUMENTS

2023/0333692 A1   10/2023   Kim et al.

FOREIGN PATENT DOCUMENTS

| KR | 10-2528556 B1 | 5/2023 |
| TW | 201128461 A1 | 8/2011 |
| WO | 2014/124415 A1 | 8/2014 |
| WO | WO 2023/068872 A1 | 4/2023 |

* cited by examiner

FIG. 28A

LUT1

| Set Coordinate | First Signal Value |
|---|---|
| 0mm | A1 |
| 1mm | A2 |
| 2mm | A3 |
| 3mm | A4 |
| 4mm | A5 |
| 5mm | A6 |
| 6mm | A7 |

FIG. 28B

LUT2

| Set Coordinate | Second Signal Value |
|---|---|
| 0mm | B1 |
| 1mm | B2 |
| 2mm | B3 |
| 3mm | B4 |
| 4mm | B5 |
| 5mm | B6 |
| 6mm | B7 |

FIG. 28C

| Set Coordinate | Third Signal Value | Fourth Signal Value |
|---|---|---|
| 0mm | A1 + B1 | A1 x B1 |
| 1mm | A2 + B2 | A2 x B2 |
| 2mm | A3 + B3 | A3 x B3 |
| 3mm | A4 + B4 | A4 x B4 |
| 4mm | A5 + B5 | A5 x B5 |
| 5mm | A6 + B6 | A6 x B6 |
| 6mm | A7 + B7 | A7 x B7 |

↑ LUT3    ↑ LUT4

FIG. 28D

LUT1-1    LUT2-1    LUT3-1    LUT4-1

| Set Coordinate | First-1 Signal Value | Second-1 Signal Value | Third-1 Signal Value | Fourth-1 Signal Value |
|---|---|---|---|---|
| 0mm | a1 x A1 | b1 x B1 | C1 x (A1+B1) | d1 x (A1xB1) |
| 1mm | a2 x A2 | b2 x B2 | C2 x (A2+B2) | d2 x (A2xB2) |
| 2mm | a3 x A3 | b3 x B3 | C3 x (A3+B3) | d3 x (A3xB3) |
| 3mm | a4 x A4 | b4 x B4 | C4 x (A4+B4) | d4 x (A4xB4) |
| 4mm | a5 x A5 | b5 x B5 | C5 x (A5+B5) | d5 x (A5xB5) |
| 5mm | a6 x A6 | b6 x B6 | C6 x (A6+B6) | d6 x (A6xB6) |
| 6mm | a7 x A7 | b7 x B7 | C7 x (A7+B7) | d7 x (A7xB7) |

ELECTRONIC DEVICE AND METHOD FOR DRIVING THE SAME

CROSS-REFERENCE TO RELATED APPLICATIONS

The present application claims priority to and the benefit of Korean Patent Application No. 10-2023-0155300, filed on Nov. 10, 2023, and Korean Patent Application No. 10-2023-0195369, filed on Dec. 28, 2023, in the Korean Intellectual Property Office, the entire disclosures of each of which are incorporated herein by reference.

BACKGROUND

1. Field

Aspects of some embodiments of the present disclosure herein relate to an electronic device and a method for driving the electronic device.

2. Description of the Related Art

Multimedia electronic devices such as televisions, mobile phones, tablet computers, laptop computers, navigators, game consoles, and the like includes a display panel for displaying an image. Such electronic devices may include a sensor layer (or an input sensor), which is capable of providing a touch-based input mechanism that allows users to relatively easily input information or commands intuitively and conveniently in addition to alternative input mechanisms such as buttons, keyboards, mouses, and the like. The sensor layer may sense a user's touch or pressure. There is an increasing consumer demand for using a pen for fine touch input for a user who is familiar with information input using a writing instrument or a specific application program (for example, application program for sketching or drawing).

The above information disclosed in this Background section is only for enhancement of understanding of the background and therefore the information discussed in this Background section does not necessarily constitute prior art.

SUMMARY

Aspects of some embodiments of the present disclosure herein relate to an electronic device having relatively improved coordinate reliability and a method for driving the electronic device.

Aspects of some embodiments of the present disclosure include an electronic device having relatively improved coordinate reliability and a method for driving the electronic device.

Aspects of some embodiments of the present disclosure include an electronic device including: a display layer; a sensor layer which is on the display layer and on which a sensing area including a first area and a second area that surrounds the first area is defined; and a sensor driving unit configured to drive the sensor layer, wherein the sensor driving unit includes a coordinate calculation part configured to calculate coordinates based on a sensing signal that senses an input device and receive a first lookup table, set coordinates according to a first signal value are defined in the first lookup table, the coordinate calculation part is differently driven to sense the coordinates on the first area and the second area, and the coordinate calculation part is configured to calculate the coordinates of the input device based on a first peak value of the sensing signal on the second area and the first lookup table.

According to some embodiments, the first signal value may correspond to the first peak value.

According to some embodiments, the first signal value may correspond to a value obtained by multiplying the first peak value by a predetermined weight.

According to some embodiments, as the first signal value increases, the set coordinates may increase.

According to some embodiments, when there is no first signal value corresponding to the first peak value in the first lookup table, the coordinate calculation part may be configured to interpolate the set coordinates using the adjacent first signal values so as to calculate the coordinates.

According to some embodiments, the coordinate calculation part may be configured to calculate the first peak value of the sensing signal on the first area as the coordinates of the input device.

According to some embodiments, the sensing signal may be generated based on a differential signal that is sensed differentially with channels, which are adjacent to each other, or channels, which are spaced apart from each other, of the sensor layer based on current induced from the input device.

According to some embodiments, the sensing signal may be generated based on a signal received based on current induced from the input device, and the coordinate calculation part may be configured to calculate the coordinates based on a zero crossing value of the sensing signal on the first area.

According to some embodiments, the sensor driving unit may further include a first memory, and the first lookup table may be stored in the first memory.

According to some embodiments, the electronic device may further include a main driver configured to drive the sensor driving unit and including a second memory, wherein the first lookup table may be stored in the second memory.

According to some embodiments, a plurality of sensing units may be defined on the sensor layer, and each of the plurality of sensing units may have a first width in a first direction and a second width in a second direction crossing the first direction.

According to some embodiments, the first width may be the same as the second width.

According to some embodiments, an area width of the second area, which extends in the first direction, may be proportional to the first width.

According to some embodiments, each of the plurality of sensing units may include: a first electrode extending in the second direction; a second electrode extending in the first direction; a first auxiliary electrode extending in the second direction and adjacent to the first electrode; and a second auxiliary electrode extending in the first direction and adjacent to the second electrode.

According to some embodiments, the first auxiliary electrode of each of the plurality of sensing units may be electrically connected to a ground or electrically connected to the first auxiliary electrode of another sensing unit.

According to some embodiments, when viewed on a plane, the first auxiliary electrode may overlap the first electrode, and the second auxiliary electrode may overlap the second electrode.

According to some embodiments, the first peak value may be a maximum value of the sensing signal sensed on the second area.

According to some embodiments, the coordinate calculation part may be configured to further receive a second lookup table that is different from the first lookup table, the coordinate calculation part may be configured to calculate the coordinates of the input device by further considering a second peak value of the sensing signal on the second area and the second lookup table, and the set coordinates according to the second signal value may be defined in the second lookup table.

According to some embodiments, as the second signal value decreases, the set coordinates may increase.

According to some embodiments, the second signal value may correspond to the second peak value.

According to some embodiments, the second signal value may correspond to a value obtained by multiplying the second peak value by a predetermined weight.

According to some embodiments, the coordinate calculation part may be configured to further receive a third lookup table that is different from each of the first lookup table and the second lookup table, the coordinate calculation part may be configured to calculate the coordinates of the input device by further considering the first peak value of the sensing signal on the second area, the second peak value, and the third lookup table, and the set coordinates according to the third signal value that is proportional to a four arithmetic operation between the first peak value and the second peak value may be defined in the third lookup table.

According to some embodiments, the third signal value may correspond to a value obtained by adding the first peak value and the second peak value.

According to some embodiments, the third signal value may correspond to a value obtained by adding the first peak value and the second peak value and multiplied by a predetermined weight.

According to some embodiments of the present disclosure, in a method for driving an electronic device, which includes a display layer, a sensor layer which is on the display layer and on which a sensing area including a first area and a second area that surrounds the first area is defined, and a sensor driving unit configured to drive the sensor layer, the method includes: sensing coordinates through the sensor driving unit based on a sensing signal sensed by an input device on the first area; and sensing the coordinates on the second area by differently driving the sensor driving unit on the first area, wherein the sensing of the coordinates on the second area includes calculating the coordinates of the input device based on a first lookup table in which set coordinates according to a first peak value and a first signal value of the sensing signal are defined.

According to some embodiments, the first signal value may correspond to the first peak value, and as the first signal value increases, the set coordinates may increase.

According to some embodiments, the sensing of the coordinates on the first area may include calculating the first peak value of the sensing signal as the coordinates of the input device.

According to some embodiments, the sensing signal may be generated based on a differential signal obtained by differentiating the signal received based on current induced from the input device.

According to some embodiments, the sensing of the coordinates on the second area may further include calculating the coordinates of the input device by further considering a second lookup table in which the set coordinates according to a second peak value, which is different from the first peak value of the sensing signal, and the second signal value are defined.

According to some embodiments, the second signal value may correspond to the second peak value, and as the second signal value decreases, the set coordinates may increase.

According to some embodiments, the sensing of the coordinates on the second area may further include calculating the coordinates of the input device by further considering the first peak value and the second peak value of the sensing signal and a third lookup table different from each of the first lookup table and the second lookup table.

According to some embodiments, the set coordinates according to a third signal value that is proportional to a four arithmetic operation between the first peak value and the second peak value may be defined in the third lookup table.

BRIEF DESCRIPTION OF THE DRAWINGS

The accompanying drawings are included to provide a further understanding of aspects of embodiments of the present disclosure, and are incorporated in and constitute a part of this specification. The drawings illustrate embodiments of the inventive concept and, together with the description, serve to explain principles of the inventive concept. In the drawings:

FIG. 28A is a view of a first lookup table according to some embodiments of the present disclosure;

FIG. 28B is a view of lookup tables according to some embodiments of the present disclosure;

FIG. 28C is a view of lookup tables according to some embodiments of the present disclosure;

FIG. 28D is a view of lookup tables according to some embodiments of the present disclosure;

DETAILED DESCRIPTION

Figure 1:
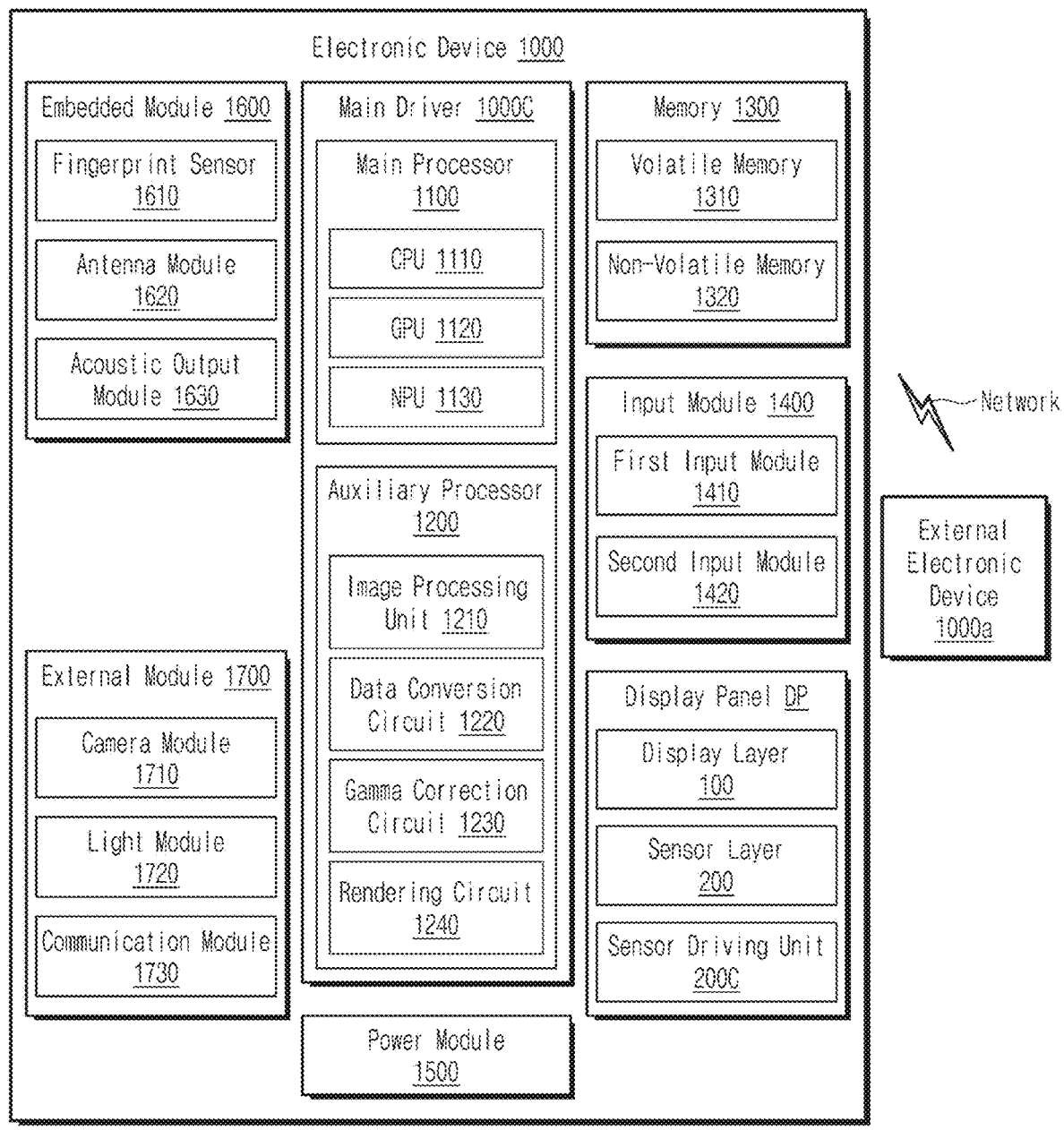
FIG. 1 is a block diagram of an electronic device according to some embodiments of the present disclosure.

In this specification, it will also be understood that when one component (or area, layer, portion) is referred to as being 'on', 'connected to', or 'coupled to' another component, it can be directly located/connected/coupled on/to the one component, or an intervening third component may also be present.

Like reference numerals refer to like elements throughout. Also, in the figures, the thickness, ratio, and dimensions of components are exaggerated for clarity of illustration. The term "and/or" includes any and all combinations of one or more of the associated elements.

It will be understood that although the terms such as 'first' and 'second' are used herein to describe various elements, these elements should not be limited by these terms. These terms are used only to distinguish one component from other components. For example, a first element referred to as a first element in an embodiment can be referred to as a second element in another embodiment without departing from the spirit and scope of the appended claims, and their equivalents. The terms of a singular form may include plural forms unless referred to the contrary.

Also, "under", "below", "above", "upper", and the like are used for explaining relation association of the elements illustrated in the drawings. The terms may be a relative concept and described based on directions expressed in the drawings.

The meaning of 'include' or 'comprise' specifies a property, a fixed number, a process, an operation, an element, a component or a combination thereof, but does not exclude other properties, fixed numbers, processes, operations, elements, components or combinations thereof.

Unless otherwise defined, all terms (including technical and scientific terms) used herein have the same meaning as commonly understood by a person of ordinary skill in the art to which the inventive concept belongs. In addition, terms such as terms defined in commonly used dictionaries should be interpreted as having a meaning consistent with the meaning in the context of the related technology, and unless explicitly defined here, they are interpreted as too ideal or too formal sense.

Hereinafter, aspects of some embodiments of the present disclosure will be described in more detail with reference to the accompanying drawings.

FIG. 1 is a block diagram of the electronic device according to some embodiments of the present disclosure.

Referring to FIG. 1, an electronic device 1000 may output various pieces of information through a display panel DP within an operating system. When a main driver 1000C executes an application stored in a memory 1300, the display panel DP may provide application information to users through a display layer 100. The main driver 1000C may be referred to as a host processor.

The main driver 1000C may acquire external input through an input module 1400 and execute an application corresponding to the external input. For example, when the user selects a camera icon displayed on the display layer 100, the main driver 1000C may acquire user input through a sensor layer 200 and a sensor driving unit 200C, and the camera module 1710 may be activated. The main driver 1000C may transmit image data corresponding to a captured image that is acquired through the camera module 1710 to the display panel DP. The display panel DP may display images corresponding to a captured image through the display layer 100.

As another example, when personal information authentication is performed on the display panel DP, a fingerprint sensor 1610 may acquire input fingerprint information as the input data. The main driver 1000C may compare input data acquired through the fingerprint sensor 1610 with authentication data stored in the memory 1300 to execute an application according to the comparison result. The display panel DP may display information executed according to a logic of the application through the display layer 100.

As another example, when a music streaming icon displayed on the display panel DP is selected, the main driver 1000C may acquire the user's input (e.g., touch input) through the sensor layer 200 and the sensor driving unit 200C and activate a music streaming application stored in the memory 1300. When a music play command is input from the music streaming application, the main driver 1000C may activate an acoustic output module 1630 to provide acoustic information corresponding to the music play command to the user.

An operation of the electronic device 1000 has been briefly described above. Hereinafter, the configuration of the electronic device 1000 will be described in more detail below. Some of the components of the electronic device 1000, which will be described in more detail below, may be integrated and provided as one component, or one component may be provided separately into two or more components.

The electronic device 1000 may communicate with an external electronic device 1000a through a network (e.g., a short-range wireless communication network or a long-range wireless communication network). According to some embodiments, the electronic device 1000 may include a main driver 1000C, a memory 1300, an input module 1400, a display panel DP, a power module 1500, an embedded module 1600, and an external module 1700. According to some embodiments, the electronic device 1000 may omit at least one of the above-described components or add one or more other components. According to some embodiments, some of the above-described components (e.g., a fingerprint sensor 1610, an antenna module 1620, and an acoustic output module 1630) are integrated (e.g., display panel DP) with another component.

The main driver 1000C may execute software to control at least one other component (e.g., hardware or software component) of the electronic device 1000 connected to the main driver 1000C and may perform various data processing or calculation. According to some embodiments, as at least a portion of the data processing or calculation, the main driver 1000C may store a command or data received from another component (e.g., the input module 1400, the fingerprint sensor 1610, or the communication module 1730) in a volatile memory 1310 and process the command or data stored in the volatile memory 1310, and the resulting data may be stored in a non-volatile memory 1320.

The main driver 1000C may include a main processor 1100 and an auxiliary processor 1200. The main processor 1100 may include one or more of a central processing unit (CPU) 1110 or an application processor. The main processor 1100 may further include one or more of a graphic processing unit (GPU) 1120, a communication processor (CP), and an image signal processor (ISP). The main processor 1100 may further include a neural processing unit (NPU) 1130.

The neural processing unit is a processor specialized in processing an artificial intelligence model, and the artificial intelligence model may be generated through machine learning. The artificial intelligence model may include multiple artificial neural network layers. The artificial neural network may include deep neural network (DNN), convolutional neural network (CNN), recurrent neural network (RNN), restricted boltzmann machine (RBM), belief deep network (DBN), bidirectional recurrent deep neural network (BRDNN), deep Q-networks, or one of a combination of two or more of the above, but is not limited to the examples described above. In addition to the hardware structures, the artificial intelligence model may additionally or alternatively include the software structure. At least two of the above-described processing unit and processor may be implemented as an integrated configuration (e.g., a single chip), or each may be implemented as an independent configuration (e.g., a plurality of chips).

The auxiliary processor 1200 may include an image processing unit 1210, a data conversion circuit 1220, a gamma correction circuit 1230, and a rendering circuit 1240. The image processing unit 1210 may convert data format of the image data to output the converted data format.

The data conversion circuit 1220 may receive image data from a driving controller that drives the display layer 100 and may compensate the image data so that the image is displayed at desired brightness according to the characteristics of the electronic device 1000 or the user's settings, etc., or convert the image data to relatively reduce power consumption or compensate for afterimages. The gamma correction circuit 1230 may convert image data or a gamma reference voltage so that an image displayed on the electronic device 1000 has desired gamma characteristics.

The rendering circuit 1240 may receive image data from the driving controller and render the image data by considering a pixel arrangement of the display layer 100 applied to the electronic device 1000. At least one of the data conversion circuit 1220, the gamma correction circuit 1230, or the rendering circuit 1240 may be integrated into another component (e.g., the main processor 1100 or the driving controller). At least one of the data conversion circuit 1220, the gamma correction circuit 1230, or the rendering circuit 1240 may be integrated into a data driver.

The memory 1300 may store various data used by at least one component of the electronic device 1000 (e.g., the main driver 1000C) and input data or output data for commands related thereto. The memory 1300 may include at least one of the volatile memory 1310 or the non-volatile memory 1320.

The input module 1400 may receive commands or data to be used in the component of the electronic device 1000 (e.g., the main driver 1000C, the sensor layer 200, or the acoustic output module 1630) from the outside (e.g., the user or the external electronic device 1000a).

The input module 1400 may include a first input module 1410 through which a command or data is input from the user, and a second input module 1420 through which a command or data is input from the external electronic device 1000a. The first input module 1410 may include a microphone, a mouse, a keyboard (e.g., buttons), or a pen (e.g., a passive pen or active pen). The second input module 1420 may support a designated protocol that is capable of being connected to the external electronic device 1000a wiredly or wirelessly. According to some embodiments, the second input module 1420 may include a high definition multimedia interface (HDMI), a universal serial bus (USB) interface, an SD card interface, or an audio interface. The second input module 1420 may include a connector that is capable of being physically connected to the external electronic device 1000a, for example, the HDMI connector, the USB connector, the SD card connector, or the audio connector (e.g., a headphone connector).

The display panel DP may visually provide information to users. The display panel DP may include a display layer 100, a sensor layer 200, and a sensor driving unit (or sensor driver or sensor driving circuit or sensor driving component) 200C. The display panel DP may further include a window, a chassis, a bracket, and other structural components to protect the display layer 100 (e.g., from damage due to external impacts, contaminants, and the like. The display panel DP may further include an emission driving circuit and a voltage generator.

The sensor layer 200 may generate data values corresponding to coordinate information of an input by the user's body or the pen. The amount of change in capacitance caused by the input of the sensor layer 200 may be generated as a data value. The sensor layer 200 may sense an input by the passive pen or transmit/receive data to/from the active pen.

The sensor layer 200 may measure biological signals such as a blood pressure, moisture, or body fat. For example, when the user touches a portion of the body to the sensor layer or a sensing panel and does not move for a certain period of time, the sensor layer 200 may sense a biological signal based on a change in electric field caused by a portion of the user's body to output information desired by the user to the display panel DP.

The power module 1500 may supply power to the components of the electronic device 1000. The power module 1500 may include a battery that charges power voltage. The battery may include a non-rechargeable primary cell, a rechargeable secondary cell, or a fuel cell. The power module 1500 may include a power management integrated circuit (PMIC). The PMIC may supply power (e.g., optimized power) to each of the above-described modules and the modules to be described below. The PMIC may supply optimized power to each of the above-described components and components to be described in more detail later. The power module 1500 may include a wireless power transmission/reception member electrically connected to the battery. The wireless power transmission/reception member may include a plurality of coil-shaped antenna radiators.

The electronic device 1000 may further include an embedded module 1600 and an external module 1700. The embedded module 1600 may include the fingerprint sensor 1610, the antenna module 1620, and the acoustic output module 1630. The external module 1700 may include a camera module 1710, a light module 1720, and a communication module 1730.

The fingerprint sensor 1610 may generate a data value corresponding to the user's fingerprint. The fingerprint sensor 1610 may include any one of an ultrasonic type, an optical type, or a capacitive type fingerprint sensor.

The antenna module 1620 may include one or more antennas for transmitting or receiving signals or power to the outside. According to some embodiments, the communication module 1730 may transmit a signal to the external electronic device 1000a or receive a signal from the external electronic device 1000a through an antenna suitable for the communication manner. According to some embodiments, the antenna pattern of the antenna module 1620 may be integrated into one component (e.g., the display layer 100 or the sensor layer 200) of the display panel DP.

The acoustic output module 1630 may be a device for outputting acoustic signals to the outside of the electronic device 1000. For example, the acoustic output module 1630 may include a speaker used for general purposes such as multimedia playback or recording playback, and a receiver used exclusively for phone reception. According to some embodiments, the receiver may be provided to be integrated with or separated from the speaker. The acoustic output pattern of the acoustic output module 1630 may be integrated into the display panel DP.

The camera module 1710 may capture still images (e.g., static images) and moving images (e.g., video images). According to some embodiments, the camera module 1710 may include one or more lenses, an image sensor, or an image signal processor. The camera module 1710 may further include an infrared camera capable of measuring the presence or absence of the user, the user's location, and the user's gaze.

The light module 1720 may provide light. The light module 1720 may include a light emitting diode or a xenon lamp. The light module 1720 may operate in conjunction with the camera module 1710 or operate independently.

The communication module 1730 may support establishing a wired or wireless communication channel between the electronic device 1000 and the external electronic device 1000a and performing communication through the established communication channel. The communication module 1730 may include one or all of a wireless communication module such as a cellular communication module, a short-range wireless communication module, or a global navigation satellite system (GNSS) communication module, and a wired communication module such as a local area network (LAN) communication module or a power line communication module.

The communication module 1730 may be configured to communicate with the external electronic device 1000a through a short-range communication network such as Bluetooth, WiFi direct, or infrared data association (IrDA), or a long-distance communication network such as a cellular network, the Internet, or a computer network (e.g., LAN or WAN). The various types of communication modules 1730 described above may be implemented as or integrated into one chip or may be implemented as separate chips.

The embedded module 1600 and the external module 1700 may be used to control the operation of the display panel DP in conjunction with the main driver 1000C.

The main driver 1000C may output a command or data to the display layer 100, the acoustic output module 1630, the camera module 1710, or the light module 1720 based on the input data received from the sensor layer 200. For example, the main driver 1000C may generate image data in response to the input data applied through the mouse or pen to outputs the image data to the display layer 100 or may generate command data in response to the input data to display the camera module 1710 to output the command data to the light module 1720. When the input data is not received from the input module 1400 for a certain period of time, the main driver 1000C may switch an operation mode of the electronic device 1000 to a low-power mode or sleep mode to relatively reduce the power consumption.

Some of the above-described components may be connected to each other through a communication manner between peripheral devices, for example, a bus, a general purpose input/output (GPIO), a serial peripheral interface (SPI), a mobile industry processor interface (MIPI), or an ultra path interconnect (UPI) link to exchange signals (e.g., commands or data) with each other. The main driver 1000C may communicate with the display panel DP through a mutually agreed interface, for example, any one of the above-described communication manners may be used, but are not limited to the above-described communication manners.

The electronic device 1000 according to various embodiments disclosed in this document may be various types of devices. The electronic device 1000 may include, for example, at least one of a portable communication device (e.g., a smart phone), a computer device, a portable multimedia device, a portable medical device, a camera, a wearable device, or a home appliance. The electronic device 1000 according to some embodiments of this document is not limited to the above-described devices.

Figure 2A:
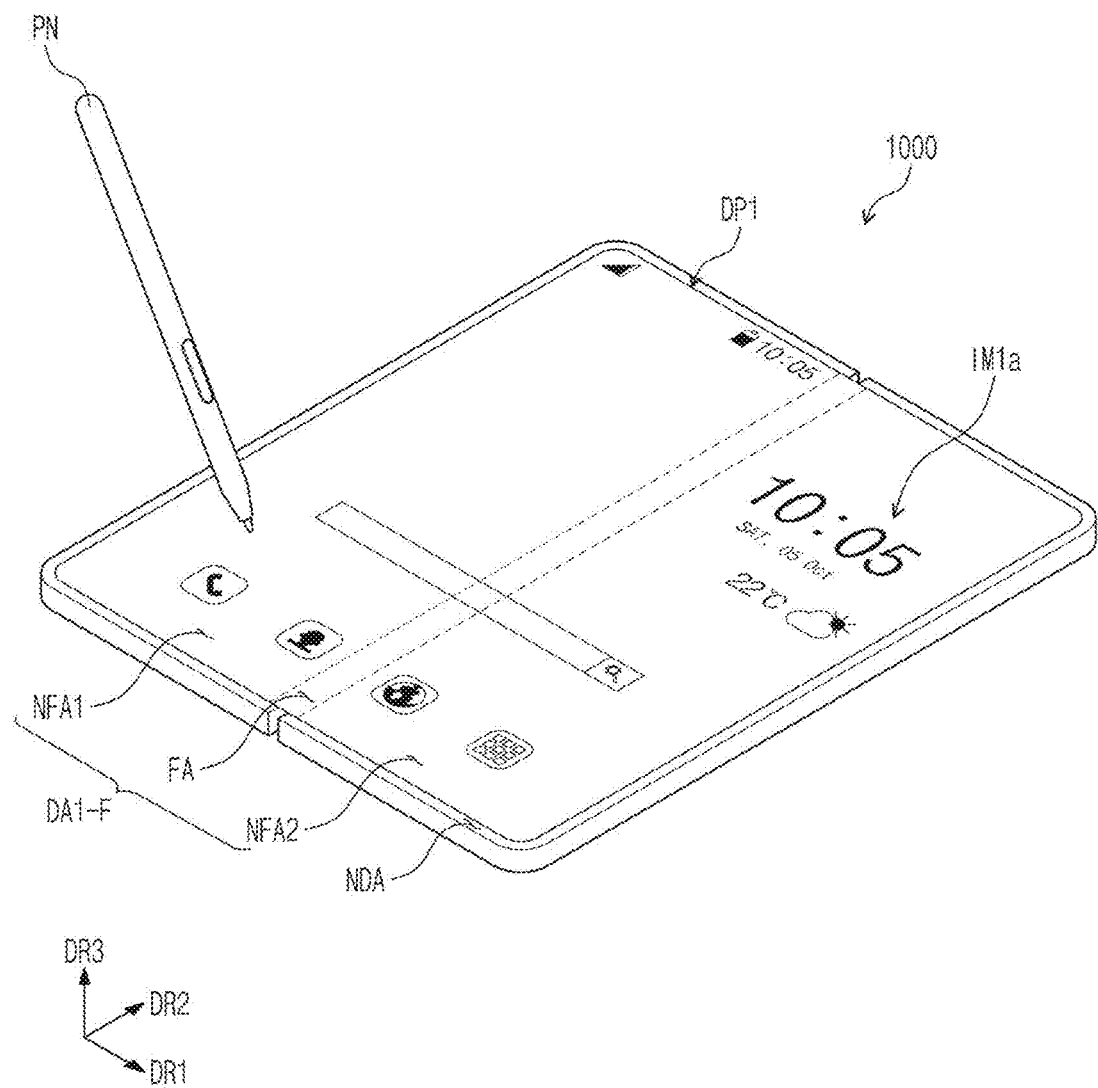
FIG. 2A is a perspective view of the electronic device according to some embodiments of the present disclosure.
Figure 2B:
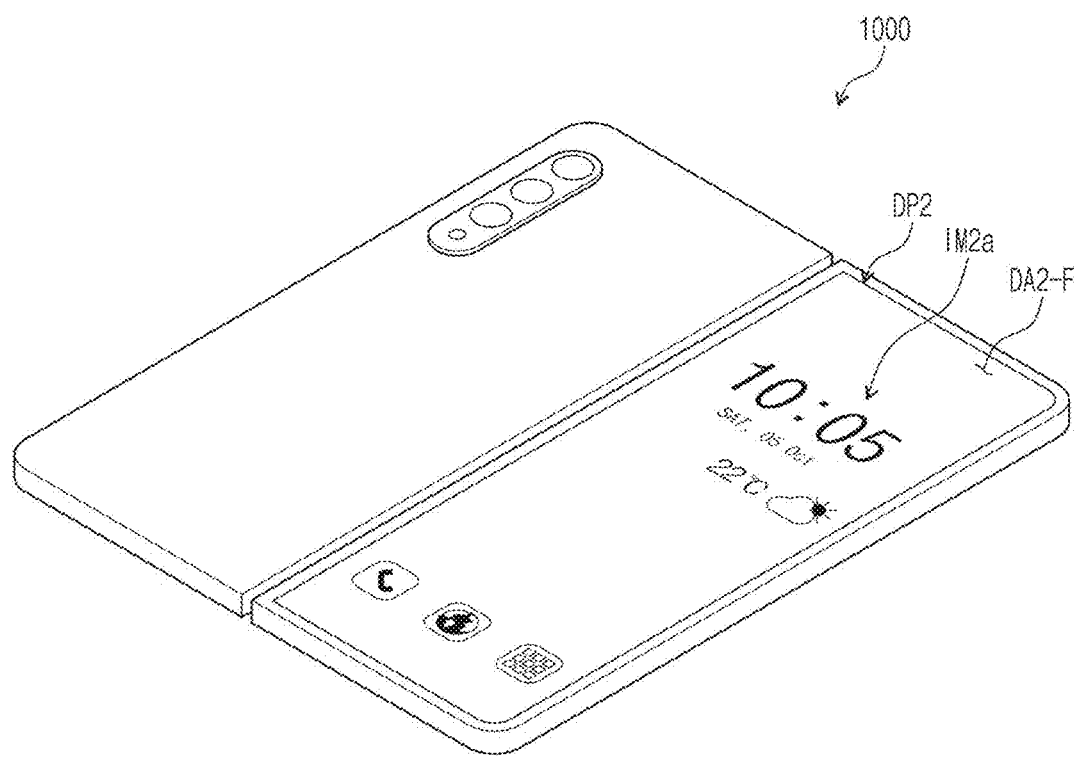
FIG. 2B is a rear perspective view of the electronic device according to some embodiments of the present disclosure.
Figure 2B:
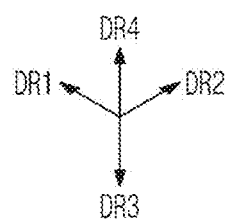

FIG. 2A is a perspective view of the electronic device according to some embodiments of the present disclosure, and FIG. 2B is a rear perspective view of the electronic device according to some embodiments of the present disclosure.

Referring to FIGS. 2A and 2B, the electronic device 1000 may be a device that is activated according to an electrical signal. For example, the electronic device 1000 may display images and sense inputs applied from the outside. The external input may be a user's input. The user's input may include various types of external inputs such as a portion of a user's body, a pen 2000, light, heat, or a pressure. A pen PN may be referred to as an input device PN.

The electronic device 1000 may include a first display panel DP1 and a second display panel DP2. The first display panel DP1 and the second display panel DP2 may be separate panels that are separated from each other. The first display panel DP1 may be referred to as a main display panel, and the second display panel DP2 may be referred to as an auxiliary display panel or an external display panel. The first display panel DP1 may include a first display part DA1-F, and the second display panel DP2 may include a second display part DA2-F. A surface area of the second display panel DP2 may be less than that of the first display panel DP1. The surface area of the first display part DA1-F may be greater than that of the second display part DA2-F to correspond to a sizes of each of the first display panel DP1 and the second display panel DP2.

In a state in which the electronic device 1000 is unfolded, the first display part DA1-F may have a plane substantially parallel to a first direction DR1 and a second direction DR2. A thickness direction of the electronic device 1000 may be parallel to a third direction DR3 crossing the first direction DR1 and the second direction DR2. Thus, a front surface (or top surface) and a rear surface (or bottom surface) of each of members constituting the electronic device 1000 may be defined based on the third direction DR3.

The first display panel DP1 or the first display part DA1-F may include a folding area FA that is folded and unfolded and a plurality of non-folding areas NFA1 and NFA2 that are spaced apart from each other with the folding area FA therebetween. The second display panel DP2 may overlap one of the plurality of non-folding areas NFA1 and NFA2. For example, the second display panel DP2 may overlap the first non-folding area NFA1.

The display direction of the first image IM1a displayed on a portion of the first display panel DP1, for example, the first non-folding area NFA1, and a display direction of a second image IM2a displayed on the second display panel DP2 may be opposite to each other. For example, the first image IM1a may be displayed in the third direction DR3, and the second image IM2a may be displayed in a fourth direction DR4, which is opposite to the third direction DR3.

According to some embodiments of the present disclosure, the folding area FA may be bent relative to a folding axis extending in a direction parallel to a long side of the electronic device 1000, for example, in a direction parallel to the second direction DR2. When the electronic device 1000 is folded, the folding area FA may have a curvature (e.g., a set or predetermined curvature) and curvature radius. The first non-folding area NFA1 and the second non-folding area NFA2 may face each other, and the electronic device 1000 may be inner-folded so that the first display part DA1-F is not exposed to the outside.

According to some embodiments of the present disclosure, the electronic device 1000 may be outer-folded so that the first display part DA1-F is exposed to the outside. According to some embodiments of the present disclosure, the electronic device 1000 may be capable of being in-folded and out-folded in the unfolded state without damaging the electronic device 1000, but embodiments according to the present disclosure are not limited thereto.

In FIG. 2A, an example in which one folding area FA is defined in the electronic device 1000 is illustrated, but embodiments according to the present disclosure are not limited thereto. For example, the electronic device 1000 may define a plurality of folding axes and a plurality of folding areas corresponding thereto, and the electronic device 1000 is in-folded or out-folded in the unfolded state on each of the plurality of folding areas.

According to some embodiments of the present disclosure, at least one of the first display panel DP1 or the second display panel DP2 may sense an input by the pen PN even if it does not include a digitizer. Thus, because the digitizer for sensing the pen PN may be omitted, an increase in thickness, weight, and flexibility of the electronic device 1000 due to the addition of the digitizer may not occur. Thus, not only the first display panel DP1 but also the second display panel DP2 may be configured to sense the pen PN.

Figure 3:
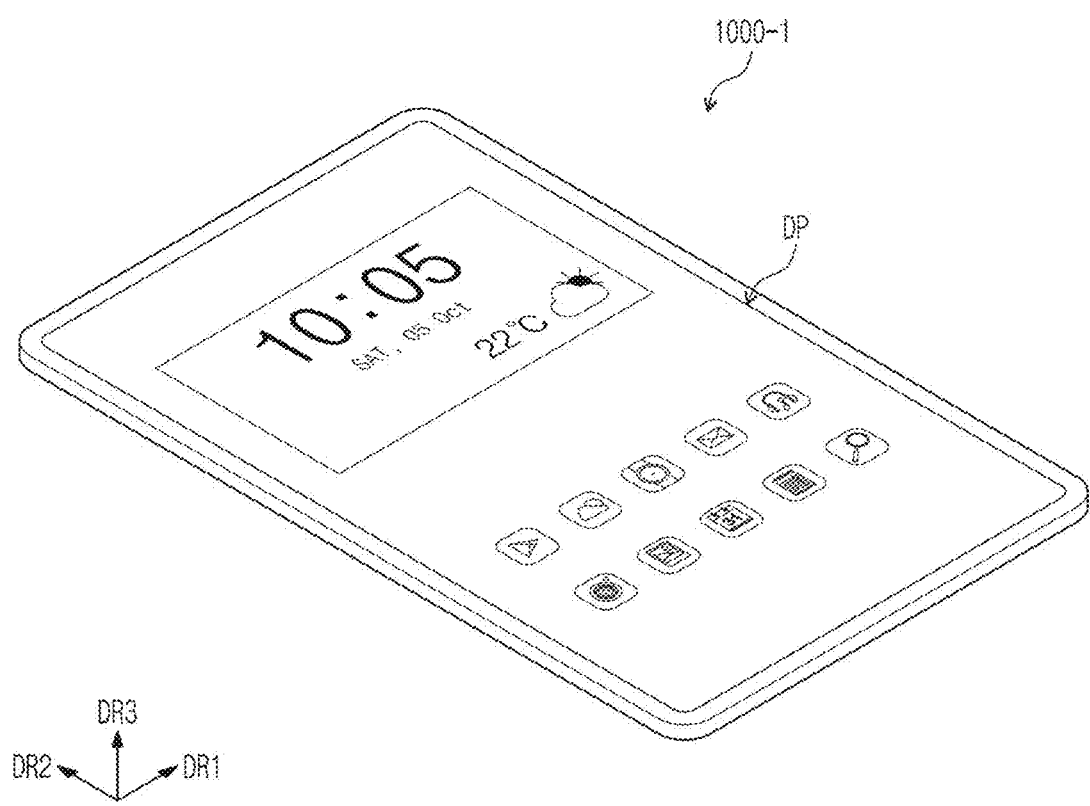
FIG. 3 is a perspective view of an electronic device according to some embodiments of the present disclosure.
Figure 4:
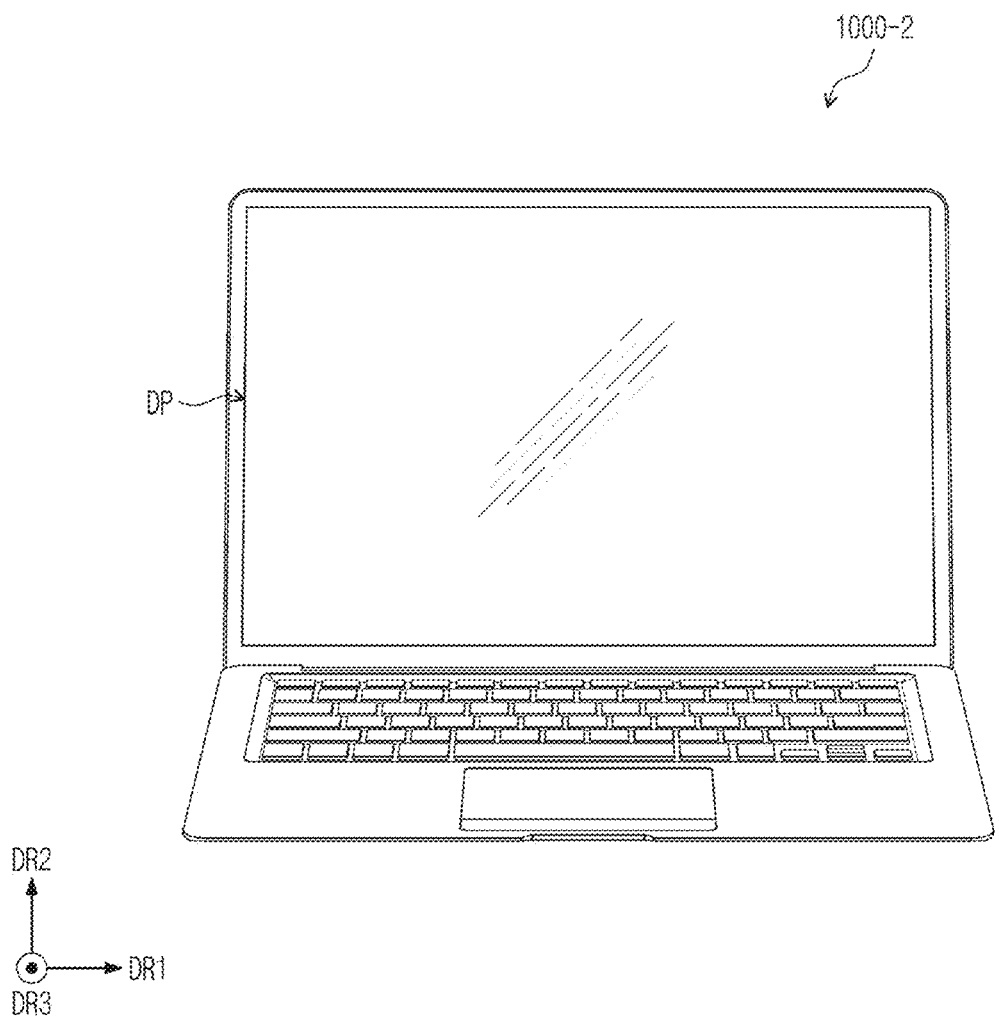
FIG. 4 is a perspective view of an electronic device according to some embodiments of the present disclosure.

FIG. 3 is a perspective view of an electronic device according to some embodiments of the present disclosure, and FIG. 4 is a perspective view of an electronic device according to some embodiments of the inventive concept.

FIG. 3 illustrates an example in which an electronic device 1000-1 is a mobile phone or a tablet, and the electronic device 1000-1 may include a display panel DP. FIG. 4 illustrates an example in which an electronic device 1000-2 is a laptop computer, and the electronic device 1000-2 may include a display panel DP.

According to some embodiments of the present disclosure, the display panel DP may sense external input applied from the outside. The external input may be a user's input. The user's input may include various types of external inputs such as a portion of a user's body, a pen PN (see FIG. 2A), light, heat, or a pressure.

According to some embodiments of the present disclosure, the display panel DP may sense an input by the pen PN even if it does not include a digitizer. Thus, because the digitizer for sensing the pen PN may be omitted, an increase in thickness, weight, and flexibility of the electronic device 1000, 1000-1, or 1000-2 due to the addition of the digitizer may not occur.

In FIG. 2A, a foldable-type electronic device 1000 may be illustrated as an example, and in FIG. 3, a bar-type electronic device 1000-1 may be illustrated as an example. However, the characteristics of embodiments according to the present disclosure to be described below are not limited thereto. For example, descriptions described below may be applied to various electronic devices, such as a rollable-type electronic device, a slidable-type electronic device, and a stretchable-type electronic device.

Figure 5:
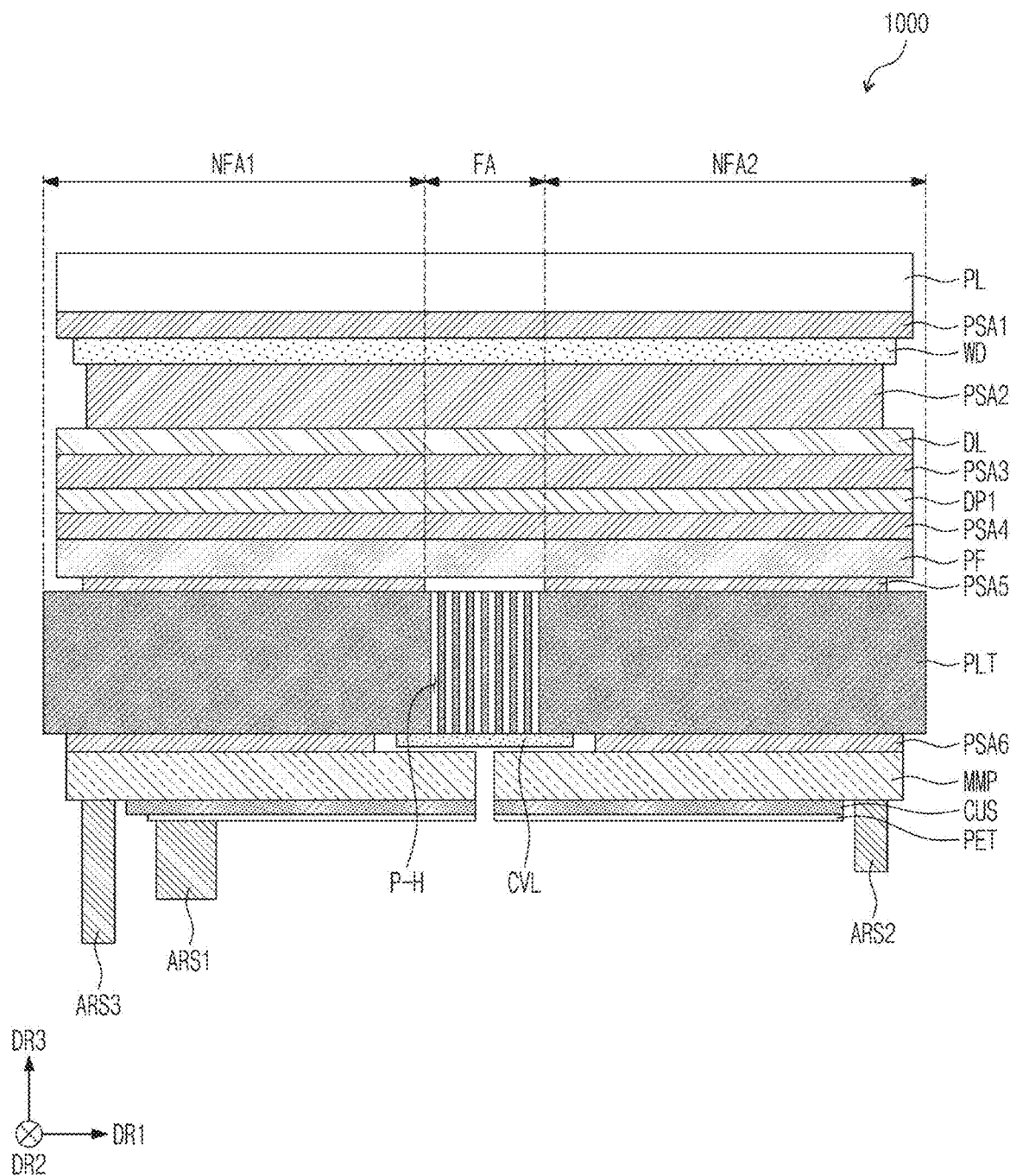
FIG. 5 is a cross-sectional view of an electronic device according to some embodiments of the present disclosure.

FIG. 5 is a cross-sectional view of an electronic device according to some embodiments of the inventive concept. The cross-sectional view illustrated in FIG. 5 may be a cross-sectional view that illustrates a portion of the electronic device 1000 including the first display panel DP1 of the electronic device 1000 illustrated in FIG. 2A.

Referring to FIG. 5, the electronic device 1000 may include a first display panel DP1, upper functional layers, and lower functional layers. The upper functional layers may include components located above the first display panel DP1, and the lower functional layers may include components located below the first display panel DP1.

The first display panel DP1 may be configured to generate images and sense an external input. For example, the first display panel DP1 may include a display layer 100 (see FIG. 6) and a sensor layer 200 (see FIG. 6). This will be described later.

The upper functional layers may include a protective layer PL, a window WD, an impact absorption layer DL, and first to third adhesive layers PSA1, PSA2, and PSA3. The components included in the upper functional layers are not limited to the components described above. At least a portion of the above-described components may be omitted, and other components may be added.

The protective layer PL may protect components located below the protective layer PL. The protective layer PL may have a thickness in a range of 60 micrometers to 70 micrometers (or about 60 micrometers to about 70 micrometers), for example, 65 micrometers (or about 65 micrometers), but the thickness of the protective layer PL is not limited thereto.

A hard coating layer, an anti-fingerprint layer, and the like may be additionally provided on the protective layer PL to relatively improve properties such as chemical resistance and abrasion resistance. For example, the hard coating layer may be a functional layer for improving use characteristics of the electronic device 1000 and may be applied on the protective layer PL. For example, anti-fingerprint properties, anti-pollution properties, and anti-scratch properties may be relatively improved by the hard coating layer. For example, a thickness of the hard coating layer may be 5 micrometers (or about 5 micrometers), but embodiments according to the present disclosure are not particularly limited thereto.

The window WD may be located below the protective layer PL. A first adhesive layer PSA1 may be located between the window WD and the protective layer PL. The first adhesive layer PSA1 may have a thickness in a range of 30 micrometers to 40 micrometers (or about 30 micrometers to about 40 micrometers), for example, 35 micrometers (or about 35 micrometers), and the thickness of the first adhesive layer PSA1 is not limited thereto. According to some embodiments of the present disclosure, a bezel pattern may be located between the first adhesive layer PSA1 and the protective layer PL.

The window WD may include an optically transparent insulating material. For example, the window WD may include a glass substrate or a synthetic resin film. The window WD may have a single-layered structure or a multilayered structure. For example, the window WD may include a plurality plastic films bonded to each other by using an adhesive or include a glass substrate and a plastic film, which are bonded to each other by using an adhesive. When the window WD is the glass substrate, the window WD may have a thickness in a range of 80 micrometers (or about 80 micrometers) or less and may have, for example, a thickness of 30 micrometers (or about 30 micrometers), but the thickness of the window WD is not limited thereto.

The impact absorption layer DL may be located below the window WD. The second adhesive layer PSA2 may be located between the window WD and the impact absorption layer DL. The second adhesive layer PSA2 may have a thickness in a range of 70 micrometers to 80 micrometers (or about 70 micrometers to about 80 micrometers), for example, 75 micrometers (or about 75 micrometers), and the thickness of the second adhesive layer PSA2 is not limited thereto.

The impact absorption layer DL may protect the first display panel DP1 by absorbing an impact applied to the first display panel DP1. The impact absorption layer DL may be manufactured in the form of a stretched film. For example, the impact absorption layer DL may include a flexible plastic material. The flexible plastic material may be defined as a synthetic resin film. For example, the impact absorption layer DL may include a flexible plastic material such as polyimide or polyethylene terephthalate. The impact absorption layer DL may have a thickness in a range of 18 micrometers to 28 micrometers (or about 18 micrometers to about 28 micrometers), for example, about 23 micrometers, but the thickness of the impact absorption layer DL is not limited thereto. According to some embodiments of the present disclosure, the impact absorption layer DL may be omitted.

The third adhesive layer PSA3 may be located between the impact absorption layer DL and the first display panel DP1. The third adhesive layer PSA3 may have a thickness in a range of 45 micrometers to 55 micrometers (or about 45 micrometers to about 55 micrometers), for example, 50 micrometers (or about 50 micrometers), and the thickness of the third adhesive layer PSA3 is not limited thereto.

The lower functional layers may include a protective film PF, a plate PLT, a cover layer CVL, a shielding layer MMP, a lower sheet CUS, an insulating film PET, and step compensation members ARS1, ARS2, and ARS3, and fourth to sixth adhesive layers PSA4, PSA5, and PSA6. The components included in the lower functional layers are not limited to the components described above. At least a portion of the above-described components may be omitted, and other components may be added.

The protective film PF may be coupled to a rear surface of the first display panel DP1 through the fourth adhesive layer PSA4. The fourth adhesive layer PSA4 may have a thickness in a range of 20 micrometers to 30 micrometers (or about 20 micrometers to about 30 micrometers), for example, 25 micrometers (or about 25 micrometers), and the thickness of the fourth adhesive layer PSA4 is not limited thereto.

The protective film PF may prevent or reduce scratches or other damage from occurring on the rear surface of the first display panel DP1 during the process of manufacturing the first display panel DP1. The protective film PF may be a colored polyimide film. For example, the protective film PF may be an opaque yellow film, but embodiments are not limited thereto. The protective layer PL may have a thickness in a range of 45 micrometers to 55 micrometers (or about 45 micrometers to about 55 micrometers), for example, 50 micrometers (or about 50 micrometers), but the thickness of the protective layer PL is not limited thereto.

The plate PLT may be located below the protective film PF. A fifth adhesive layer PSA5 may be located between the plate PLT and the protective film PF. The fifth adhesive layer PSA5 may have a thickness in a range of 11 micrometers to 21 micrometers (or about 11 micrometers to about 21 micrometers), for example, 16 micrometers (or about 16 micrometers), and the thickness of the fifth adhesive layer PSA5 is not limited thereto.

The plate PLT may include carbon fiber reinforced plastic (CFRP), a metal, or an metal alloy. The plate PLT may support components located thereon. Openings P-H may be defined (formed or provided) in a portion of the plate PLT. For example, the plate PLT may include the openings P-H, each of which has a shape passing from a top surface to a bottom surface of the plate PLT. The openings P-H may be defined in an area overlapping the folding area FA. When viewed in a plan view, for example, in the third direction DR3 or in the thickness direction of the plate PLT, the openings P-H may overlap the folding area FA. A portion of the plate PLT may be more easily deformed by the openings P-H. The plate PLT may have a thickness in a range of 160 micrometers to 180 micrometers (or about 160 micrometers to about 180 micrometers), for example, 170 micrometers (or about 170 micrometers), but the thickness of the plate PLT is not limited thereto.

The cover layer CVL may be attached to the plate PLT. The cover layer CVL may cover the openings P-H of the plate PLT. Thus, the cover layer CVL may prevent or reduce instances of foreign substances or contaminants being introduced into the openings P-H. The cover layer CVL may include thermoplastic polyurethane, but embodiments according to the present disclosure are not particularly limited thereto. The cover layer CVL may have a thickness in a range of 11 micrometers to 21 micrometers (or about 11 micrometers to about 21 micrometers), for example, 16 micrometers (or about 16 micrometers), but the thickness of the cover layer CVL is not limited thereto.

The shielding layer MMP may be located below the plate PLT and the cover layer CVL. A sixth adhesive layer PSA6 may be located between the shielding layer MMP and the plate PLT. The sixth adhesive layer PSA6 may have a thickness in a range of 15 micrometers to 25 micrometers (or about 15 micrometers to about 25 micrometers), for example, 20 micrometers (or about 20 micrometers), and the thickness of the sixth adhesive layer PSA6 is not limited thereto.

The shielding layer MMP may include magnetic metal powder. The shielding layer MMP may be referred to as a ferrite sheet, a magnetic metal powder layer, a magnetic layer, a magnetic circuit layer, or a magnetic path layer. The shielding layer MMP may shield magnetic fields that pass through the first display panel DP1. For example, the shielding layer MMP may serve to guide a direction of the transmitted magnetic fields in a different direction. Thus, the magnetic fields that reach the shielding layer MMP may be shielded without leaking to the outside, for example, to a lower side of the shielding layer MMP. The shielding layer MMP may have a thickness in a range of 53 micrometers to 63 micrometers (or about 53 micrometers to about 63 micrometers), for example, 58 micrometers (or about 58 micrometers), but the thickness of the shielding layer MMP is not limited thereto.

The lower sheet CUS may be located below the shielding layer MMP. The lower sheet CUS may be a sheet that serves to reflect the magnetic fields toward the shielding layer MMP. The lower sheet CUS may include a metal or a metal alloy. For example, the lower sheet CUS may include aluminum, copper, or a copper alloy. The lower sheet CUS may have a thickness in a range of 15 micrometers to 25 micrometers (or about 15 micrometers to about 25 micrometers), for example, 20 micrometers (or about 20 micrometers), but the thickness of the lower sheet CUS is not limited thereto.

The insulating film PET may be located under the lower sheet CUS. The insulating film PET may include polyethylene terephthalate, but is not particularly limited thereto. The insulating film PET may prevent or reduce instances of static electricity being introduced. For example, the insulating film PET may prevent or reduce instances of an electrical interference between members located on the insulating film PET and members located below the insulating film PET from being occurring. A thickness of the insulating film PET may be in a range of 3 micrometers to 9 micrometers (or about 3 micrometers to about 9 micrometers), for example, 6 micrometers (or about 6 micrometers), but the thickness of the insulating film PET is not limited thereto.

The step compensation members ARS1, ARS2, and ARS3 may include a first step compensation member ARS1 attached to the insulating film PET, a second step compensation member ARS2 attached to the shielding layer MMP, and a third step compensation member ARS3 attached to the shielding layer MMP. A thickness of each of the first to third step compensation members ARS1, ARS2, and ARS3 may be set variously depending on a product structure or component arrangement relationship. For example, the thickness of the first step compensation member ARS1 may be 90 micrometers (or about 90 micrometers), the thickness of the second step compensation member ARS2 may be 87 micrometers (or about 87 micrometers), and the thickness of the third step compensation member ARS3 may be 87 micrometers (or about 87 micrometers), but are not particularly limited thereto.

In addition, according to some embodiments of the present disclosure, each of the sixth adhesive layer PSA6, the shielding layer MMP, the lower sheet CUS, and the insulating film PET may have a structure separated from a portion overlapping the folding area FA. For example, each of the sixth adhesive layer PSA6, the shielding layer MMP, the lower sheet CUS, and the insulating film PET may be divided into two components spaced apart from each other with a gap (e.g., a set or predetermined gap) therebetween at the portion overlapping the folding area FA. The gap may be in a range of 0.6 mm to 1.7 mm (or about 0.6 mm to about 1.7 mm), but is not particularly limited thereto.

Figure 6:
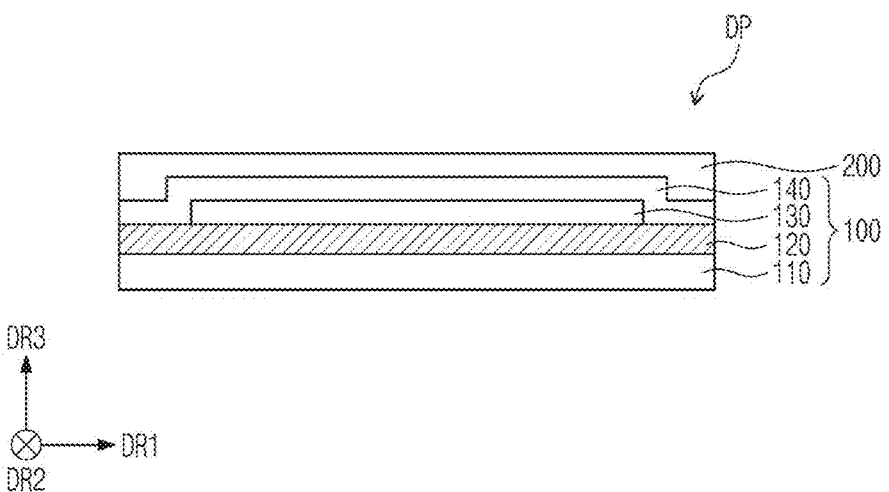
FIG. 6 is a schematic cross-sectional view of a display panel according to some embodiments of the present disclosure.

FIG. 6 is a schematic cross-sectional view of a display panel according to some embodiments of the inventive concept.

Referring to FIG. 6, the display panel may include a display layer 100 and a sensor layer 200.

The display layer 100 may be configured to generate images. The display layer 100 may be an emission-type display layer. For example, the display layer 100 may be an organic light emitting display layer, an inorganic light emitting display layer, an organic-organic light emitting display layer, a quantum dot display layer, a micro LED display layer, or a nano LED display layer. The display layer 100 may include a base layer 110, a circuit layer 120, a light emitting element layer 130, and an encapsulation layer 140.

The base layer 110 may be a member that provides a base surface on which a circuit layer 120 is located. The base layer 110 may has a single layered structure or a multilayered structure. The base layer 110 may be a glass substrate, a metal substrate, a silicon substrate, or a polymer substrate, but embodiments are not particularly limited thereto.

The circuit layer 120 may be located on the base layer 110. The circuit layer 120 may include an insulating layer, a semiconductor pattern, a conductive pattern, and a signal line. The insulating layer, the semiconductor layer, and the conductive layer may be formed on the base layer 110 in a manner such as coating or vapor deposition, and then, the insulating layer, the semiconductor layer, and the conductive layer may be selectively patterned through a plurality of photolithography processes.

A light emitting element layer 130 may be located on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro LED, or a nano LED.

An encapsulation layer 140 may be located on the light emitting element layer 130. The encapsulation layer 140 may protect the light emitting element layer 130 against foreign substances or contaminants such as moisture, oxygen, and dust particles.

The sensor layer 200 may be located on the display layer 100. The sensor layer 200 may sense an external input applied from the outside. The sensor layer 200 may be an integrated sensor formed continuously during the process of manufacturing the display layer 100, or the sensor layer 200 may be an external sensor attached to the display layer 100. The sensor layer 200 may be referred to as a sensor, an input sensing layer, an input sensing panel, or an electronic device for sensing input coordinates.

According to some embodiments of the present disclosure, the sensor layer 200 may sense both inputs from a passive type input unit such as the user's body and an input device that generates magnetic fields having a resonant frequency (e.g., a set or predetermined resonant frequency). The input device may be referred to as a pen, an input pen, a magnetic pen, a stylus pen, or an electromagnetic resonance pen.

Figure 7:
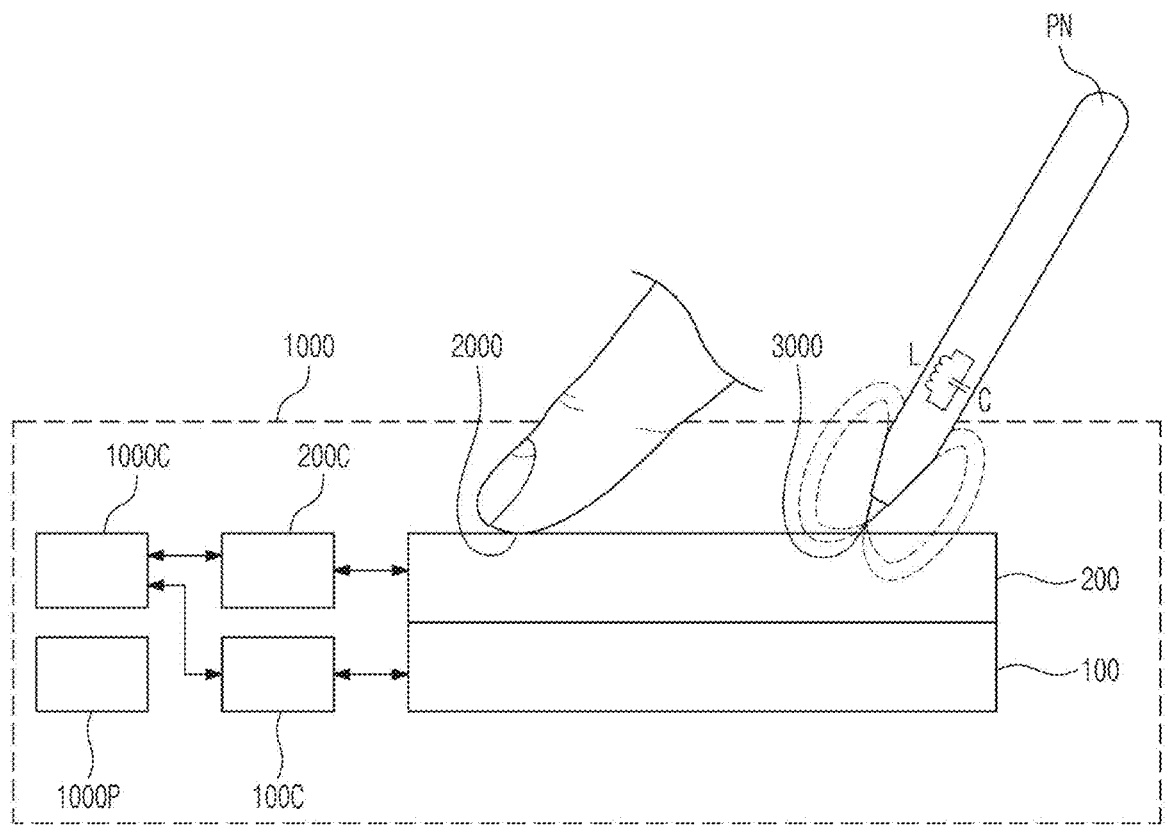
FIG. 7 is a view for explaining an operation of the electronic device according to some embodiments of the present disclosure.

FIG. 7 is a view for explaining an operation of the electronic device according to some embodiments of the inventive concept.

Referring to FIG. 7, the electronic device 1000 includes a display layer 100, a sensor layer 200, a display driver 100C, a sensor driving unit 200C, a main driver 1000C, and a power circuit 1000P.

The sensor layer 200 may sense a first input 2000 or a second input 3000 applied from the outside. Each of the first input 2000 and the second input 3000 may be an input unit capable of providing a change in capacitance of the sensor layer 200 or an input unit capable of causing induced current in the sensor layer 200. For example, the first input 2000 may be a passive input unit such as the user's body. The second input 3000 may be an input using the pen PN or an RFIC tag. For example, the pen PN may be a passive type pen or an active type pen.

According to some embodiments of the present disclosure, the pen PN may be a device that generates magnetic fields having a resonant frequency (e.g., a set or predetermined resonant frequency). The pen PN may be configured to transmit an output signal based on electromagnetic resonance. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. According to some embodiments of the present disclosure, the RLC resonance circuit may be a variable resonance circuit that varies in resonance frequency. In this case, the inductor L may be a variable inductor, and/or the capacitor C may be a variable capacitor, but are not particularly limited thereto.

The inductor L may generate current by the magnetic fields generated in the sensor layer 200. However, embodiments of the inventive concept are not particularly limited thereto. For example, when the pen PN operates as an active type, the pen PN may generate current even if it does not receive magnetic fields from the outside. The generated current may be transferred to the capacitor C. The capacitor C may charge the current input from the inductor L and discharge the charged current to the inductor L. Thereafter, the inductor L may emit magnetic fields at the resonant frequency. The induced current may flow in the sensor layer 200 due to the magnetic fields emitted by the pen PN, and the induced current may be transmitted to the sensor driving unit 200C as a received signal (or a sensing signal, a signal, and the like).

The main driver 1000C may control an overall operation of the electronic device 1000. For example, the main driver 1000C may control operations of the display driver 100C and the sensor driving unit 200C. The main driver 1000C may include at least one microprocessor and may further include a graphic controller. The main driver 1000C may be referred to as an application processor, a central processing unit, or a main processor.

The display driver 100C may control the display layer 100. The display driver 100C may receive image data RGB and a control signal D-CS from the main driver 1000C. The control signal may include various signals. For example, the control signal may include an input vertical synchronization signal, an input horizontal synchronization signal, a main clock, and a data enable signal.

The sensor driving unit 200C may control the sensor layer 200. The sensor driving unit 200C may receive the control signal from the main driver 1000C. The control signal may include a clock signal of the sensor driving unit 200C. In addition, the control signal may further include a mode decision signal that determines a driving mode of the sensor driving unit 200C and the sensor layer 200.

The sensor driving unit 200C may be implemented as an integrated circuit (IC) and electrically connected to the sensor layer 200. For example, the sensor driving unit 200C may be mounted directly on an area (e.g., a set or predetermined area) of the display panel or mounted on a separate printed circuit board using a chip on film (COF) method and electrically connected to the sensor layer 200.

The sensor driving unit 200C and the sensor layer 200 may selectively operate in the first mode or the second mode. For example, the first mode may be a mode for sensing a touch input, for example, the first input 2000. The second mode may be a mode for sensing a pen (PN) input, for example, the second input 3000. The first mode may be referred to as a touch sensing mode, and the second mode may be referred to as a pen sensing mode.

Switching between the first mode and the second mode may be accomplished in various manners. For example, the sensor driving unit 200C and the sensor layer 200 may be time-division driven in the first mode and the second mode and may sense the first input 2000 and the second input 3000. Alternatively, the switching between the first mode and the second mode may occur due to the user's selection or a specific action of the user, or one of the first mode and the second mode may be activated or deactivated by activating or deactivating a specific application or may be switched from one to the other. Alternatively, when the first input 2000 is sensed while the sensor driving unit 200C and the sensor layer 200 are operating alternately in the first mode and the second mode, the sensor driving unit 200C and the sensor layer 200 may be maintained in the first mode, and when the second input 3000 is sensed, the sensor driving unit 200C and the sensor layer 200 may be maintained in the second mode.

The sensor driving unit 200C may calculate input coordinate information based on the signal received from the sensor layer 200 and provide a coordinate signal with the coordinate information to the main driver 1000C. The main driver 1000C may execute an operation corresponding to a user input based on the coordinate signal I-SS. For example, the main driver 1000C may operate the display driver 100C to display a new application image on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driving unit 200C. For example, the plurality of driving voltages may include a gate high voltage, a gate low voltage, a first driving voltage (e.g., ELVSS voltage), a second driving voltage (e.g., ELVDD voltage), an initialization voltage, etc., but is not particularly limited thereto. The power circuit 1000P may be provided in the power module 1500 (see FIG. 1).

Figure 8:
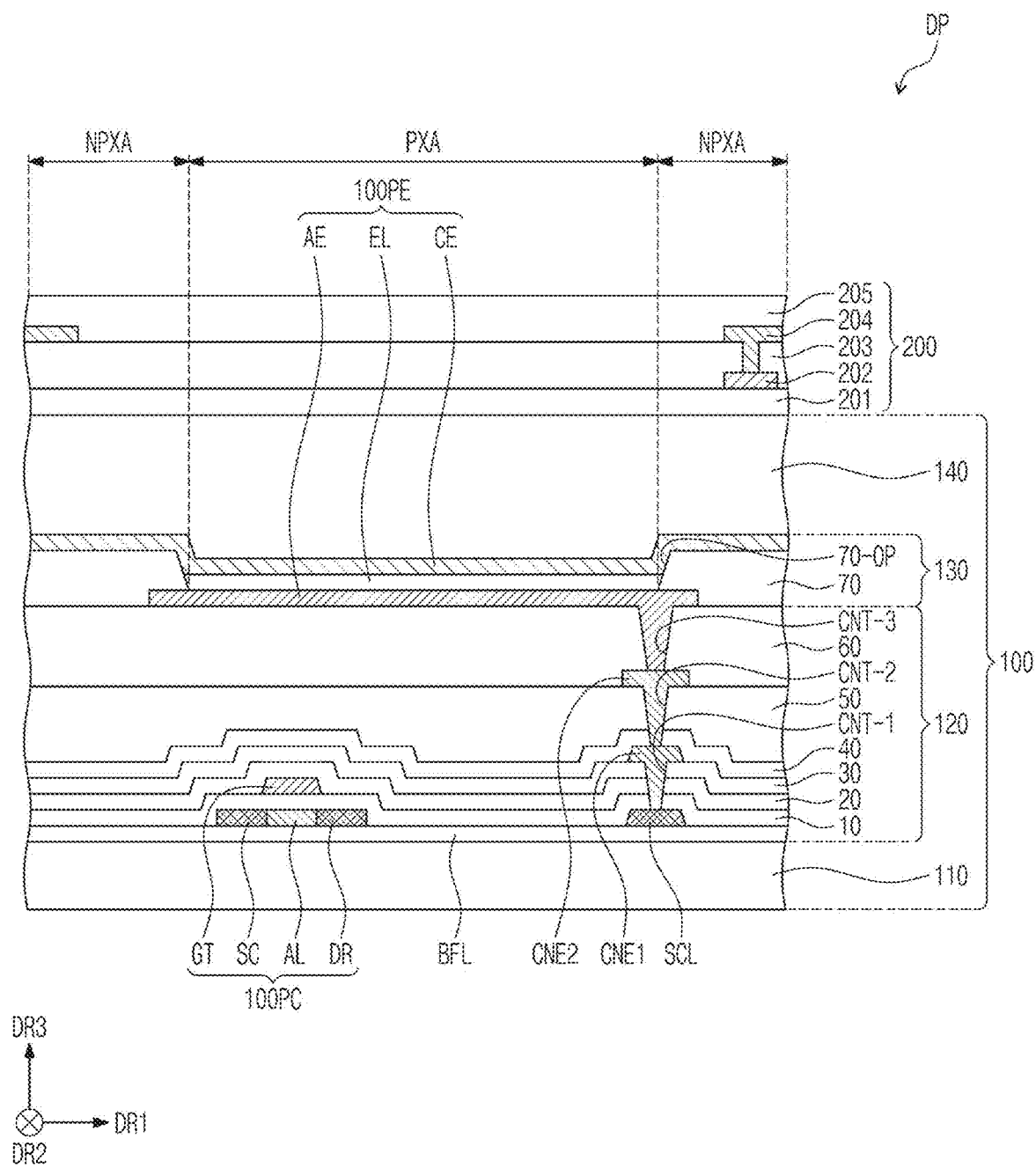
FIG. 8 is a cross-sectional view of the display panel according to some embodiments of the present disclosure.

FIG. 8 is a cross-sectional view of the display panel according to some embodiments of the inventive concept. In describing FIG. 8, the same reference numerals are used for the components described through FIG. 6, and descriptions thereof will be omitted.

Referring to FIG. 8, at least one buffer layer BFL located on a top surface of the base layer 110. The buffer layer BFL may relatively improve bonding force between the base layer 110 and the semiconductor pattern. The buffer layer BFL may be provided as a multilayer. Alternatively, the display layer 100 may further include a barrier layer. The buffer layer BFL may include at least one of silicon oxide, silicon nitride, or silicon oxynitride. For example, the buffer layer BFL may include a structure in which the silicon oxide layer and the silicon nitride layer may be alternately laminated.

Semiconductor patterns SC, AL, DR, and SCL may be located on the buffer layer BFL. Each of the semiconductor patterns SC, AL, DR, and SCL may include polysilicon. However, each of the semiconductor patterns SC, AL, DR, and SCL is not limited thereto and may include amorphous silicon, low-temperature polycrystalline silicon, or an oxide semiconductor.

FIG. 8 may only shows some semiconductor patterns SC, AL, DR, and SCL, and an additional semiconductor pattern may be located on the other area. The semiconductor patterns SC, AL, DR, and SCL may be arranged in specific rules over pixels. The semiconductor patterns SC, AL, DR, and SCL may have different electrical properties depending on whether the semiconductor patterns SC, AL, DR, and SCL are doped. The semiconductor patterns SC, AL, DR, and SCL may include first regions SC, DR, and SCL having high conductivity and a second region AL having low conductivity. The first regions SC, DR, and SCL may be doped with an N-type dopant or a P-type dopant. A P-type transistor may include a doped region doped with the P-type dopant, and an N-type transistor may include a doped region doped with the N-type dopant. The second region AL may be a non-doped region or may be doped at a concentration less than that of the first region.

The conductivity of the first regions SC, DR, and SCL may be greater than that of the second region AL and may serve (or substantially serve) as an electrode or a signal line. The second region AL may correspond (or substantially correspond) to an active region AL (or channel) of the transistor 100PC. In other words, a portion AL of the semiconductor pattern SC, AL, DR, and SCL may be the active region AL of the transistor 100PC, and other portions SC and DR may be a source region SC of the transistor 100PC or a drain region DR, and another portion SCL may be a connection electrode or a connection signal line SCL.

Each of the pixels may have an equivalent circuit including seven transistors, one capacitor, and a light emitting element, and an equivalent circuit diagram of the pixel may be modified in various forms. In FIG. 8, one transistor 100PC and light emitting element 100PE provided in a pixel are illustrated as an example.

The source region SC, the active region AL, and the drain region DR of the transistor 100PC may be formed from the semiconductor patterns SC, AL, DR, and SCL. The source region SC and the drain region DR may extend in opposite directions from the active region AL on a cross section. FIG. 8 illustrates a portion of the connection signal line SCL formed from the semiconductor patterns SC, AL, DR, and SCL. According to some embodiments, the connection signal line SCL may be connected to the drain region DR of the transistor 100PC on the plane.

A first insulating layer 10 may be located on the buffer layer BFL. The first insulating layer 10 may commonly overlap a plurality of pixels and may cover the semiconductor patterns SC, AL, DR, and SCL. The first insulating layer 10 may include an inorganic layer and/or an organic layer and have a single-layered or multilayered structure. The first insulating layer 10 may include at least one of aluminum oxide, titanium oxide, silicon oxide, silicon nitride, silicon oxynitride, zirconium oxide, or hafnium oxide. According to some embodiments, the first insulating layer 10 may include a single-layered silicon oxide layer. The insulating layer of the circuit layer 120, which will be described in more detail later, as well as the first insulating layer 10 may be an inorganic layer and/or an organic layer and may have a single-layered or a multilayered structure. The inorganic layer may include at least one of the above-described materials, but embodiments according to the present disclosure are not limited thereto.

A gate GT of the transistor 100PC is located on the first insulating layer 10. The gate GT may be a portion of a metal pattern. The gate GT overlaps the active region AL. In the process of doping or relatively reducing the semiconductor patterns SC, AL, DR, and SCL, the gate GT may function as a mask.

The second insulating layer 20 may be located on the first insulating layer 10 to cover the gate GT. A second insulating layer 20 may commonly overlap the pixels. The second insulating layer 20 may be an inorganic layer and/or an organic layer and have a single-layered or multilayered structure. The second insulating layer 20 may include at least one of silicon oxide, silicon nitride, or silicon oxynitride. According to some embodiments, the second insulating layer 20 may have a multilayer structure including a silicon oxide layer and a silicon nitride layer.

A third insulating layer 30 may be located on the second insulating layer 20. The third insulating layer 30 may has a single layer or multilayer structure. For example, the third insulating layer 30 may have a multilayer structure including a silicon oxide layer and a silicon nitride layer.

A first connection electrode CNE1 may be located on the third insulating layer 30. The first connection electrode CNE1 may be connected to the connection signal line SCL through a contact hole CNT-1 passing through the first to third insulating layers 10 to 30.

A fourth insulating layer 40 may be located on the third insulating layer 30. The fourth insulating layer 40 may be a single-layered silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be located on the fifth insulating layer 50 to cover the second connection electrode CNE2. The sixth insulating layer 60 may be an organic layer.

A light emitting element layer 130 may be located on the circuit layer 120. The light emitting element layer 130 may include a light emitting element 100PE. For example, the light emitting element layer 130 may include an organic light emitting material, an inorganic light emitting material, an organic-inorganic light emitting material, a quantum dot, a quantum rod, a micro LED, or a nano LED. Hereinafter, the light emitting element 100PE is described as an example of an organic light emitting element, but embodiments according to the present disclosure are not particularly limited thereto.

The light emitting element 100PE may include a first electrode AE, an emission layer EL, and a second electrode CE.

The first electrode AE may be located on the sixth insulating layer 60. The first electrode AE may be connected to the second connection electrode CNE2 through a contact hole CNT-3 passing through the sixth insulating layer 60.

A pixel defining layer 70 may be located on the sixth insulating layer 60 to cover a portion of the first electrode AE. An opening 70-OP is defined in the pixel defining layer 70. The opening 70-OP of the pixel defining layer 70 exposes at least a portion of the first electrode AE.

The first display part DA1-F (see FIG. 1A) may include an emission area PXA and a non-emission area NPXA adjacent to the emission area PXA. A non-emission area NPXA may surround (e.g., in a periphery or outside a footprint of) the emission area PXA. According to some embodiments, an emission area PXA may be defined to correspond to a portion of an area of the first electrode AE, which is exposed by the opening 70-OP.

The emission layer EL may be located on the first electrode AE. The emission layer EL may be located on an area corresponding to the opening 70-OP. That is, the emission layer EL may be located to be separated from each of the pixels. When the emission layer EL is located to be separated from each of the pixels, each of the emission layers EL may emit light having at least one of blue, red, or green color. However, the embodiments according to the present disclosure are not limited thereto. For example, the emission layer EL may be commonly provided to be connected to the pixels. In this case, the emission layer EL may provide blue light or white light.

The second electrode CE may be located on the emission layer EL. The second electrode CE may have an integrated shape and may be commonly located on the plurality of pixels.

According to some embodiments of the present disclosure, a hole control layer may be located between the first electrode AE and the emission layer EL. The hole control layer may be commonly located on the emission area PXA and the non-emission area NPXA. The hole control layer may include a hole transport layer and may further include a hole injection layer. An electron control layer may be located between the emission layer EL and the second electrode CE. The electron control layer may include an electron transport layer and may further include an electron injection layer. The hole control layer and the electron control layer may be commonly provided in the pixels by using an open mask or inkjet process.

An encapsulation layer 140 may be located on the light emitting element layer 130. The encapsulation layer 140 may include an inorganic layer, an organic layers, and an inorganic layer, which are sequentially laminated, but layers constituting the encapsulation layer 140 are not limited thereto. The inorganic layers may protect the light emitting element layer 130 against moisture and oxygen, and the organic layer may protect the light emitting element layer 130 against foreign substances such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the embodiments of the inventive concept are not limited thereto.

The sensor layer 200 may include a base layer 201, a first conductive layer 202, a sensing insulating layer 203, a second conductive layer 204, and a cover insulating layer 205.

The base layer 201 may be an inorganic layer containing at least one of silicon nitride, silicon oxynitride, or silicon oxide. Alternatively, the base layer 201 may be an organic layer including an epoxy resin, an acrylic resin, or an imide-based resin. Each of the base layer 201 may have a single-layered structure or a multilayered structure in which a plurality of layers are laminated in the third direction DR3.

Each of the first conductive layer 202 and the second conductive layer 204 may have a single-layered structure or a multilayered structure in which a plurality of layers are laminated in the third directional axis DR3.

Each of the first conductive layer 202 and the second conductive layer 204, each of which has a single layer structure, may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymers such as poly(3,4-ethylenedioxythiophene) (PEDOT), metal nanowires, graphene, and the like.

Each of the first conductive layer 202 and the second conductive layer 204, each of which has a multi-layered structure, may include a metal layer. The metal layers may have a three-layered structure of titanium/aluminum/titanium. The conductive layer having the multilayered structure may include at least one metal layer and at least one transparent conductive layer.

At least one of the sensing insulating layer 203 or the cover insulating layer 205 may include an inorganic layer. The inorganic layer may include at least one of oxide, titanium oxide, silicon oxide, silicon nitride, silicon oxynitride, zirconium oxide, or hafnium oxide.

At least one of the sensing insulating layer 203 or the cover insulating layer 205 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

Figure 9:
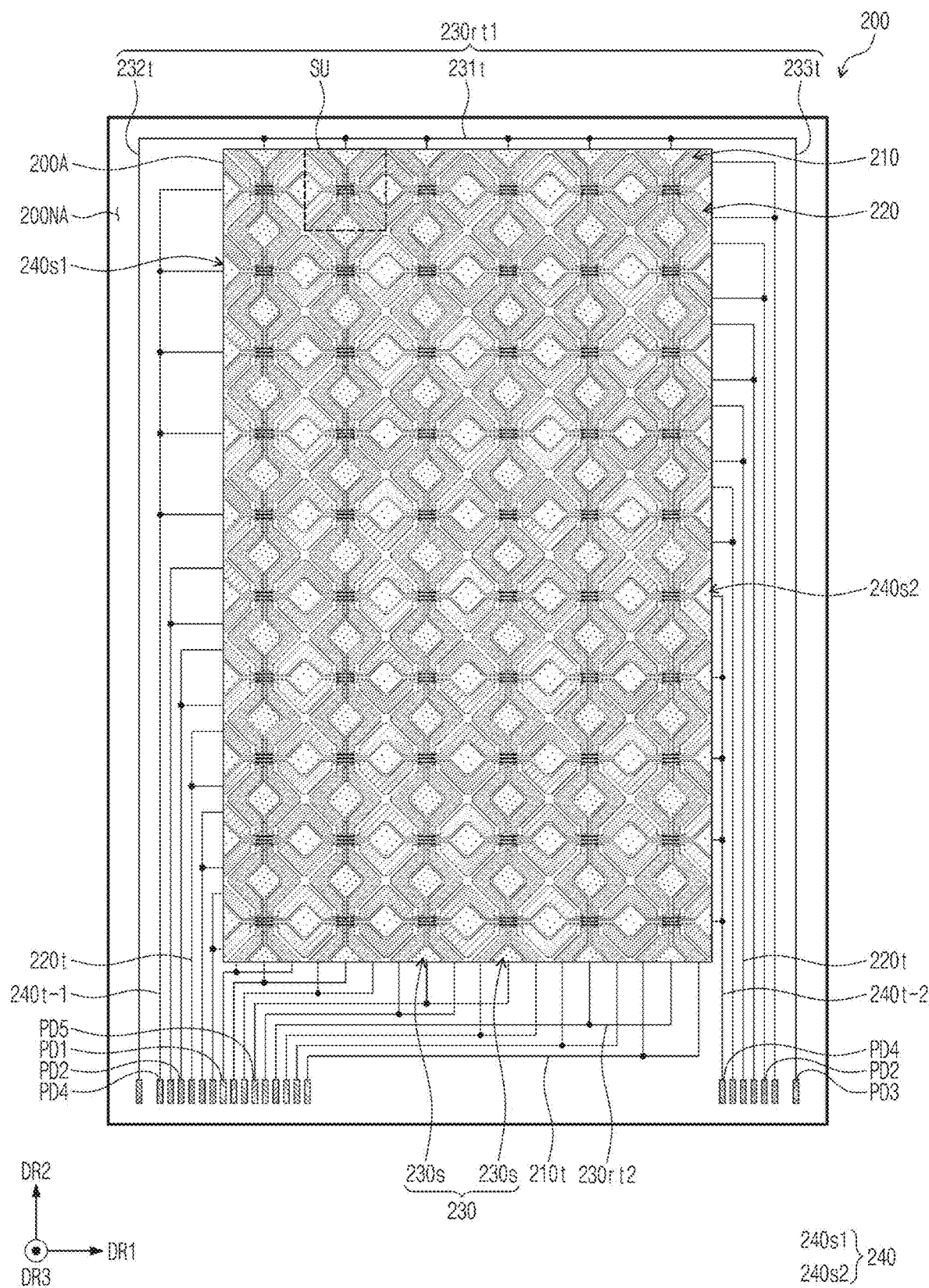
FIG. 9 is a plan view of a sensor layer according to some embodiments of the present disclosure.
Figure 10:
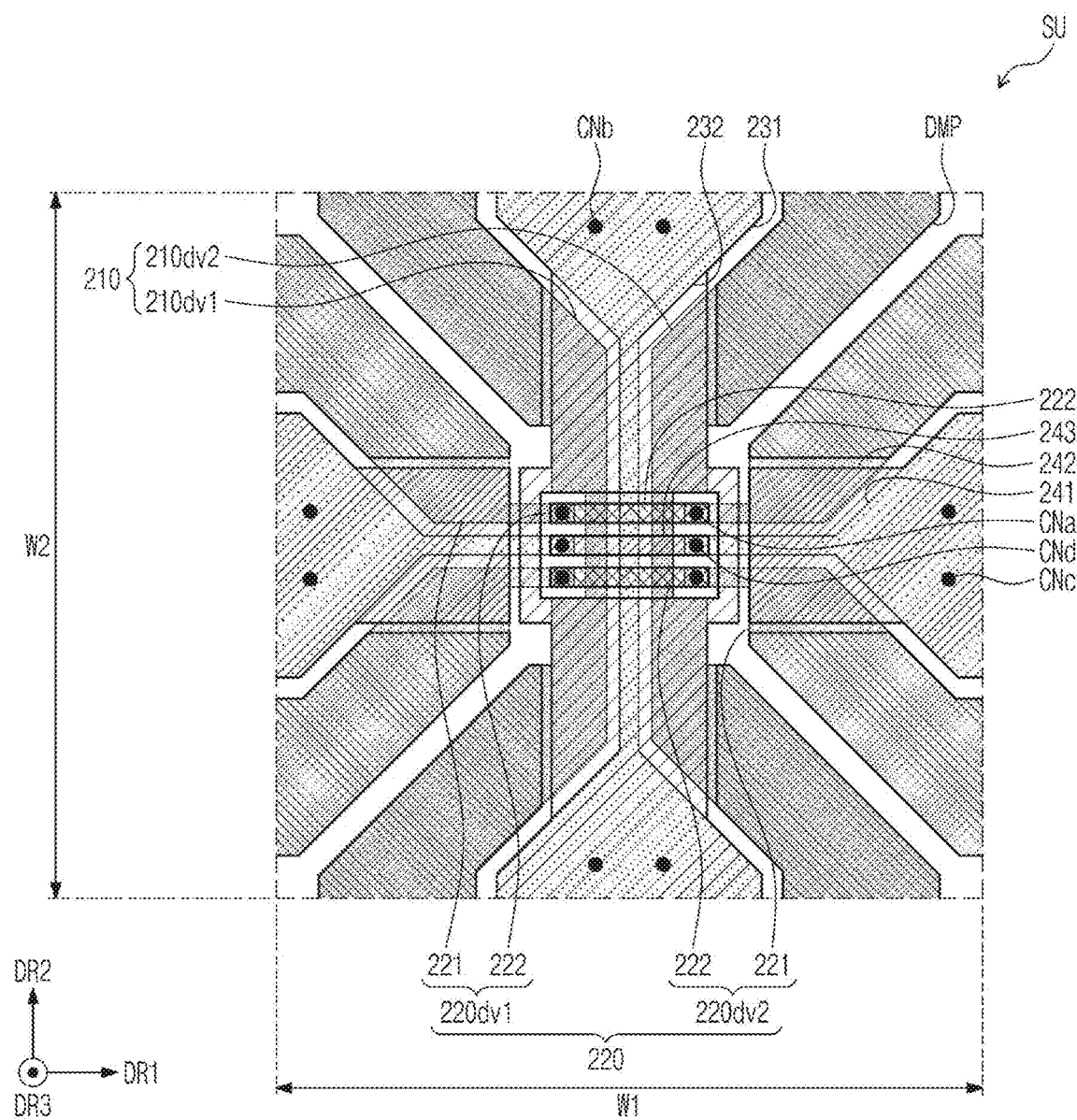
FIG. 10 is a plan view of one sensing unit according to some embodiments of the present disclosure.
Figure 11A:
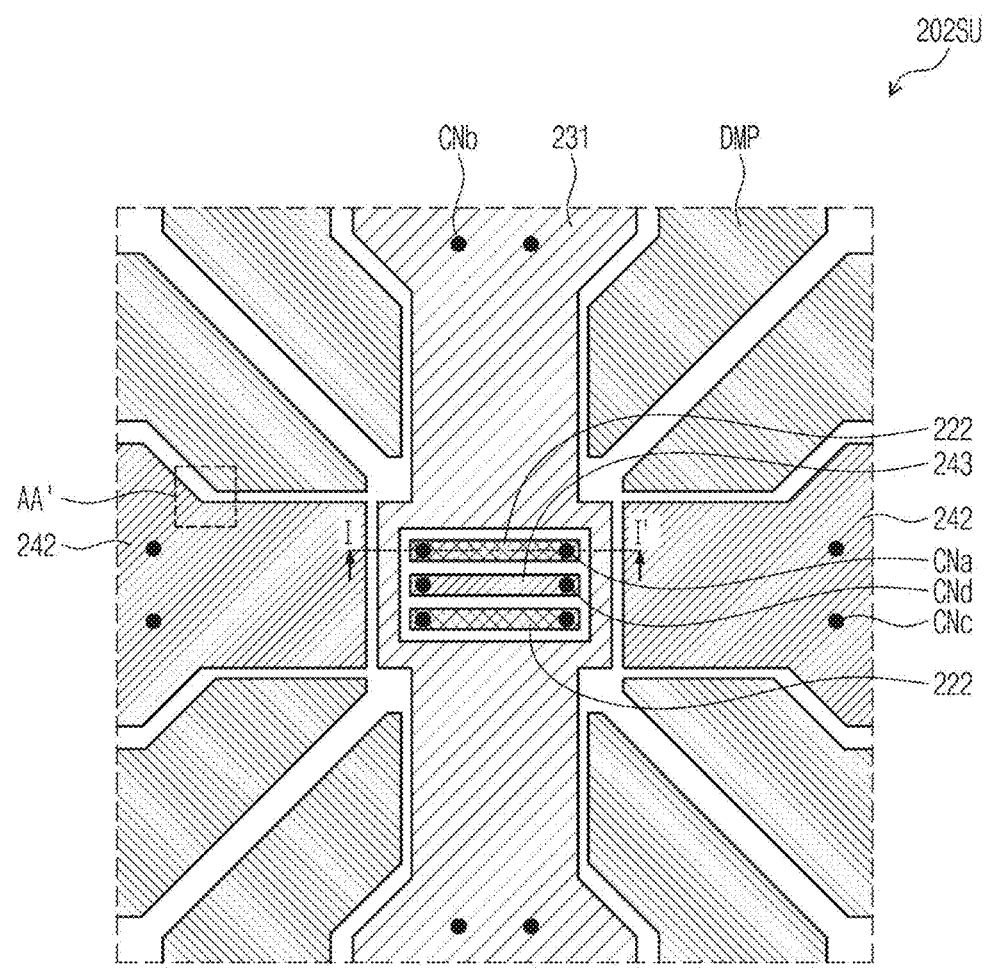
FIG. 11A is a plan view illustrating a first conductive layer of the sensing unit according to some embodiments of the present disclosure.
Figure 11B:
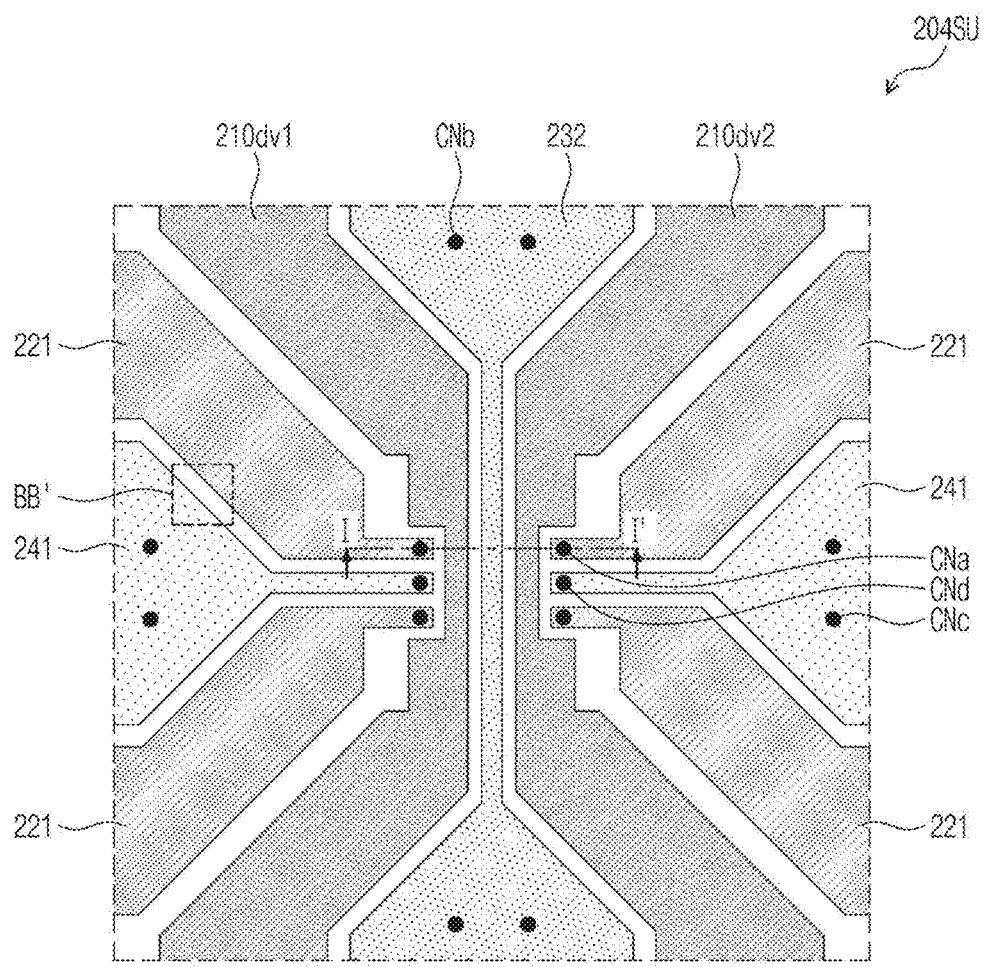
FIG. 11B is a plan view illustrating a second conductive layer of the sensing unit according to some embodiments of the present disclosure.
Figure 12:
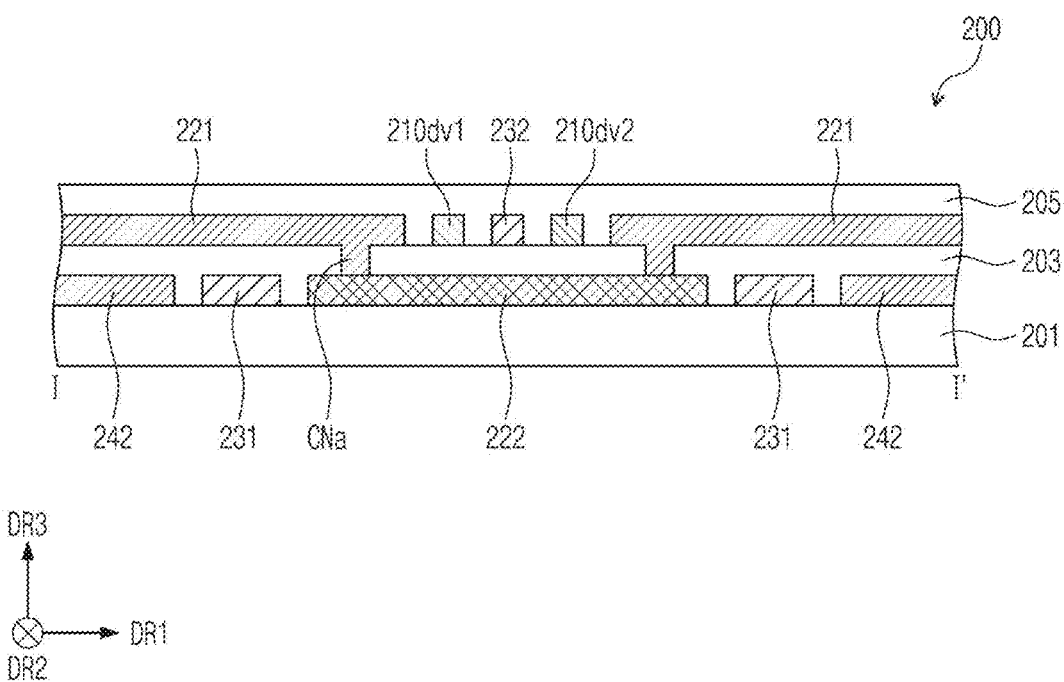
FIG. 12 is a cross-sectional view of a sensing layer, taken along line I-I' in each of FIGS. 11A and 11B according to some embodiments of the present disclosure.

FIG. 9 is a plan view of a sensor layer according to some embodiments of the inventive concept. FIG. 10 is a plan view of one sensing unit according to some embodiments of the inventive concept. FIG. 11A is a plan view illustrating a first conductive layer of the sensing unit according to some embodiments of the inventive concept. FIG. 11B is a plan view illustrating a second conductive layer of the sensing unit according to some embodiments of the inventive concept. FIG. 12 is a cross-sectional view of a sensing layer, taken along line I-I' in each of FIGS. 11A and 11B according to some embodiments of the inventive concept.

Referring to FIG. 9, the sensor layer 200 may define or include a sensing area 200A and a peripheral area 200NA adjacent to (e.g., in a periphery or outside a footprint of) the sensing area 200A.

A plurality of sensing units SU located on the sensing area 200A may be defined on the sensor layer 200. The plurality of sensing units SU may be arranged in the first direction DR1 and the second direction DR2.

The sensor layer 200 may include a plurality of first electrodes 210, a plurality of second electrodes 220, a plurality of third electrodes 230, and a plurality of fourth electrodes 240.

Each of the first electrodes 210 may cross the second electrodes 220. Each of the first electrodes 210 may extend in the second direction DR2, and the first electrodes 210 may be arranged to be spaced apart from each other in the first direction DR1. Each of the second electrodes 220 may extend in the first direction DR2, and the second electrodes 220 may be arranged to be spaced apart from each other in the second direction DR1. The sensing unit SU of the sensor layer 200 may be an area on which one first electrode 210 and one second electrode 220 cross each other.

In FIG. 9, 6 first electrodes 210 and 10 second electrodes 220 may be illustrated as an example, and 60 sensing units SU may be illustrated as an example. However, the first electrodes 210 and the number of second electrodes 220 are not limited thereto, and the number of first electrodes 210 and the second electrodes 220 may vary according to the design and size of the sensor layer 200.

Referring to FIGS. 9 and 10, the sensing unit SU may have a first width W1 in the first direction DR1 and a second width W2 in the second direction DR2. The first width W1 may be the same as the second width W2. For example, each of the first width W1 and the second width W2 may be in a range of 3 millimeters (mm) to 5 mm (or about 3 mm to about 5 mm). For example, each of the first width W1 and the second width W1 may be 4 mm (or about 4 mm).

The sensing unit SU may include one first electrode 210 of the plurality of first electrodes 210, one second electrode 220 of the plurality of second electrodes 220, one third electrode 230 of the plurality of third electrodes 230, and one fourth electrode 240 of the plurality of fourth electrodes 240.

Each of the first electrodes 210 may include first division electrodes 210$dv$1 and 210$dv$2. The first division electrodes 210$dv$1 and 210$dv$2 may extend along the second direction DR2 and may be spaced apart from each other in the first direction DR1. The first division electrodes 210$dv$1 and 210$dv$2 may have shapes that are axisymmetric to each other with respect to a line extending in the second direction DR2.

Each of the second electrodes 220 may include second division electrodes 220$dv$1 and 220$dv$2. The second electrodes 220 may extend along the first direction DR1 and may be spaced apart from each other in the second direction DR2. The second division electrodes 220$dv$1 and 220$dv$2 may have shapes that are axisymmetric to each other with respect to a line extending in the first direction DR1.

Referring to FIGS. 10, 11A, 11B, and 12, each of the second division electrodes 220$dv$1 and 220$dv$2 may include a sensing pattern 221 and a bridge pattern 222. The sensing pattern 221 and the bridge pattern 222 may be located on different layers, and the sensing pattern 221 and the bridge pattern 222 may be electrically connected to each other through a first contact I. For example, the bridge pattern 222 may be included in the first conductive layer 202SU, and the sensing pattern 221 and the first division electrodes 210$dv$1 and 210$dv$2 may be included in the second conductive layer 204SU. The first conductive layer 202SU may be included in the first conductive layer 202 of FIG. 8, and the second conductive layer 204SU may be included in the second conductive layer 204 of FIG. 8.

Each of the third electrodes 230 may extend in the second direction DR2, and the third electrodes 230 may be arranged to be spaced apart from each other in the first direction DR1. According to some embodiments of the present disclosure, each of the third electrodes 230 may include a plurality of first auxiliary electrodes 230$s$ connected in parallel. The number of first auxiliary electrodes 230$s$ included in each of the third electrodes 230 may vary. For example, as the number of third auxiliary electrodes 230$s$ included in each of the third electrodes 230 increases, resistance of each of the third electrodes 230 may decrease, power efficiency may be relatively improved, and sensing sensitivity may be relatively improved. On the other hands, as the number of first auxiliary electrodes 230$s$ included in each of the third electrodes 230 decreases, a loop coil pattern formed using the third electrodes 230 may be implemented in more various forms.

Although FIG. 9 illustrates an example in which one third electrode 230 includes two first auxiliary electrodes 240$s$, the present disclosure is not particularly limited thereto. The first auxiliary electrodes 230$s$ may be located to one-to-one correspond to the first electrodes 210. Thus, one sensing unit SU may include a portion of one first auxiliary electrode 230$s$.

A coupling capacitor may be defined between one first electrode 210 and one first auxiliary electrode 230$s$. In this case, induced current generated during the pen sensing may be transmitted from the first auxiliary electrode 230$s$ to the first electrode 210 through the coupling capacitor. That is, the first auxiliary electrode 230$s$ may serve to supplement a signal transmitted from the first electrode 210 to the sensor driving unit 200C. Thus, the greatest effect may be acquired when a phase of the signal induced in the first auxiliary electrode 230$s$ matches a phase of the signal induced in the first electrode 210. Thus, a center of each of the first electrodes 210 in the second direction DR2 and a center of each of the first auxiliary electrodes 230$s$ in the second direction DR2 may overlap each other. In addition, a center of each of the first electrodes 210 in the first direction DR1 and a center of each of the first auxiliary electrodes 230$s$ in the first direction DR1 may also overlap each other.

According to some embodiments of the present disclosure, because one third electrode 230 includes two first auxiliary electrodes 230$s$, one third electrode 230 may correspond to (overlap) two first electrodes 210. Thus, the number of first electrodes 210 included in the sensor layer 200 may be greater than the number of third electrodes 230. For example, the number of first electrodes 210 may be the same as the product of the number of third electrodes 230 included in the sensor layer 200 and the number of first auxiliary electrodes 230$s$ included in each of the third electrodes 230. In FIG. 9, the number of first electrodes 210 may be six, the number of third electrodes 230 may be three, and the number of first auxiliary electrodes 230$s$ included in each of the third electrodes 230 may be two, although embodiments according to the present disclosure are not limited thereto.

The fourth electrodes 240 may be arranged along the second direction DR2, and the fourth electrodes 240 may extend along the first direction DR1. According to some embodiments of the present disclosure, each of the fourth electrodes 240 may include second auxiliary electrodes 240$s$1 or 240$s$2 connected in parallel. The second auxiliary electrodes 240$s$1 or 240$s$2 may be referred to as a second-1 auxiliary electrode 240$s$1 and a second-2 auxiliary electrode 240$s$2.

Routing directions of the second auxiliary electrodes 240$s$1 and 240$s$2 may be different from each other. In FIG. 9, two fourth electrodes 240 and five second auxiliary electrodes 240s1 or 240s2 included in each of the fourth electrodes 240 are illustrated as an example.

In this specification, different routing directions may mean that connection positions between the electrodes and the trace lines are different from each other. For example, a first connection position of a fourth trace line 240t1 electrically connected to the second auxiliary electrode 240s1 and a second connection of a fourth trace line 240t2 electrically connected to the second auxiliary electrode 240s2 may be different from each other. The first connection position may be a left end of the second auxiliary electrode 240s1, and the second connection position may be a right end of the second auxiliary electrode 240s2.

According to some embodiments of the present disclosure, the sensor layer 200 may include one fourth electrode. In this case, the fourth electrode may include 10 second auxiliary electrodes connected in parallel. The number of second auxiliary electrodes is illustrated only as an example in FIG. 9, and the number of second auxiliary electrodes included in the fourth electrode is not limited to the above-described example.

FIG. 9 illustrates that five second auxiliary electrodes 240s1 are electrically connected to each other, and five second auxiliary electrodes 240s2 are electrically connected to each other. That is, an area ratio of the two fourth electrodes 240 or a number ratio of the second auxiliary electrodes included in each of the two fourth electrodes 240 may have one to one ratio. However, embodiments according to the present disclosure are not particularly limited thereto. For example, the number of second auxiliary electrodes 240s1 and 240s2 may be different from each other.

According to some embodiments of the present disclosure, when each of the fourth electrodes 240 includes second auxiliary electrodes 240s1 or 240s2 connected in parallel, an effect of increasing in surface area of one fourth electrode 230 may occur. In addition, resistance of each of the fourth electrodes 240 may decrease to relatively improve sensing sensitivity to a second input 3000 (see, e.g., FIG. 7).

A coupling capacitor may be defined between one second electrode 220 and one second auxiliary electrode 240s1. In this case, induced current generated during the pen sensing may be transmitted from the second auxiliary electrode 240s1 to the second electrode 220 through the coupling capacitor. That is, the second auxiliary electrode 240s1 may serve to supplement a signal transmitted from the second electrode 220 to the sensor driving unit 200C. Thus, the greatest effect may be acquired when a phase of the signal induced in the second auxiliary electrode 240s1 matches a phase of the signal induced in the second electrode 220. Thus, a center of each of the second electrodes 220 in the first direction DR1 and a center of each of the second auxiliary electrodes 240s1 in the first direction DR1 may overlap each other. Thus, a center of each of the second electrodes 220 in the second direction DR2 and a center of each of the second auxiliary electrodes 240s1 in the second direction DR2 may overlap each other.

Referring to FIGS. 9, 11A, and 11B, each of the first auxiliary electrodes 230s1 included in the third electrode 230 may include a third-1 pattern 231 and a third-2 pattern 232. The third-1 pattern 231 and the third-2 pattern 232 may be located on different layers, and the third-1 pattern 231 and the third-2 pattern 232 may be electrically connected to each other through a second contact CNb. The third-1 pattern 231 may be included in the first conductive layer 202SU, and the third-2 pattern 232 may be included in the second conductive layer 204SU.

According to some embodiments of the present disclosure, a portion of the third-1 pattern 231 may overlap a portion of each of the first division electrodes 210dv1 and 210dv2. Thus, a coupling capacitance may be provided (or formed) between the first electrode 210 and the third electrode 230.

Referring to FIGS. 9, 11A, and 11B, each of the second auxiliary electrodes 240s1 or 240s2 included in the fourth electrode 240 may include a fourth-1 pattern 241, a fourth-2 pattern 242, and a fourth-3 pattern 243. The fourth-2 pattern 242 and the fourth-3 pattern 243 may be located on the same layer, and the fourth-1 pattern 241 may be located on a layer that is different from that on which the fourth-2 pattern 242 and the fourth pattern 243-3 are located. The fourth-1 pattern 241 and the fourth-2 pattern 242 may be electrically connected to each other through a third contact CNc, and the fourth-1 pattern 241 and the fourth-3 pattern 243 may be electrically connected through a fourth contact CNd. The fourth-2 pattern 242 and the fourth-3 pattern 243 may be included in the first conductive layer 202SU, and the fourth-1 pattern 241 may be included in the second conductive layer 204SU.

According to some embodiments of the present disclosure, a portion of the fourth-2 pattern 242 may overlap the sensing pattern 221 of each of the second division electrodes 220dv1 and 220dv2. Thus, a coupling capacitor may be defined (e.g., provided or formed) between the second electrode 220 and the fourth electrode 240.

According to some embodiments of the present disclosure, the first conductive layer 202SU may further include dummy patterns DMP. Each of the dummy patterns DMP may be electrically floated or electrically grounded. According to some embodiments of the present disclosure, the dummy patterns DMP may be omitted.

The sensor layer 200 may further include a plurality of first trace lines 210t located on the peripheral area 200NA, a plurality of first pads PD1 connected to one-to-one correspond to the first trace lines 210t, a plurality of second trace lines 220t, and a plurality of second pads PD2 connected to one-to-one correspond to the second trace lines 220t.

The first trace lines 210t may one-to-one correspond to and be electrically connected to the first electrodes 210. The two first division electrodes 210dv1 and 210dv1 included in one first electrode 210 may be connected to one of the first trace lines 210t. Each of the first trace lines 210t may include a plurality of branches to be connected to the two first division electrodes 210dv1 and 210dv1. According to some embodiments of the present disclosure, the two first division electrodes 210dv1 and 210dv1 may be connected to each other within the sensing area 200A.

The second trace lines 220t may one-to-one correspond to and be electrically connected to each of the second electrodes 220. The two second division electrodes 220dv1 and 220dv1 included in one second electrode 220 may be connected to one of the second trace lines 220t. Each of the second trace lines 220t may include a plurality of branches to be connected to the two second division electrodes 220dv1 and 220dv2. According to some embodiments of the present disclosure, the two second division electrodes 220dv1 and 220dv2 may also be connected to each other within the sensing area 200A.

The sensor layer 200 may further include a third trace line 230rt1 located on the peripheral area 200NA, a plurality of third pads PD3 connected to one end and the other end of the third trace line 230rt1, fourth trace lines 240t-1 and 240t-2, fourth pads PD4 connected to one-to-one correspond to the fourth trace lines 240t-1 and 240t-2, fifth trace lines 230rt2, and fifth pads PD5 connected to one-to-one correspond to the fifth trace lines 230rt2.

The third trace line 230rt1 may be electrically connected to at least one first auxiliary electrode 230s of the first auxiliary electrodes 230s. According to some embodiments of the present disclosure, the third trace line 230rt1 may be electrically connected to all of the first auxiliary electrodes 230s. That is, the third trace line 230rt1 may be electrically connected to all of the third electrodes 230. The third trace line 230rt1 may include a first line portion 231t extending in the first direction DR1 and electrically connected to the third electrodes 230, a second line portion 232t extending from a first end of the first line portion 231t in the second direction DR2, and a third line portion 233t extending from a second end of the first line portion 231t in the second direction.

According to some embodiments of the present disclosure, each of resistance of the second line portion 232t and resistance of the third line portion 233t may be substantially equal to that of one third electrode of the third electrodes 230. Thus, there may be an effect in which the second line portion 232t and the third line portion 233t serve as the third electrodes 230, and the third electrodes 230 are located on the peripheral area 200NA. For example, each of one of the second line portion 232t and the third line portion 233t and one of the third electrodes 230 may form a coil. Thus, a pen located on an area adjacent to the peripheral area 200NA may also be sufficiently charged by a loop including the second line part 232t or the third line part 233t.

According to some embodiments of the present disclosure, to adjust the resistance of the second line portion 232t and the resistance of the third line portion 233t, a width of each of the second line portion 232t and the third line portion 233t in the first direction DR1 may be adjusted. However, this is only an example, and the first to third line portions 231t, 232t, and 233t may have substantially the same width. The fifth trace lines 230rt2 may be connected to one-to-one correspond to the fourth electrodes 230. That is, the number of fifth trace lines 230rt2 may correspond to the number of third electrodes 230. In FIG. 9, three fifth trace lines 230rt2 are illustrated as an example.

According to some embodiments of the present disclosure, the fifth trace lines 230rt2 and the fifth pad PD5 may be omitted, and a charging driving mode for charging the pen may be omitted. In this case, the sensor layer 200 may sense an input from an active type pen that is capable of emitting magnetic fields even if the magnetic fields are not provided from the sensor layer 200.

The fourth trace lines 240t-1 and 240t-2 may be spaced apart from each other with the sensing area 200A therebetween. The fourth trace line 240t-1 may be electrically connected to at least one second auxiliary electrode 240s1 of the second auxiliary electrodes 240s1. For example, one end of each of the second auxiliary electrodes 240s1 may be connected to the fourth trace line 240t-1. The fourth trace line 240t-2 may be electrically connected to at least one second auxiliary electrode 240s2 of the second auxiliary electrodes 240s2. For example, one end of each of the second auxiliary electrodes 240s2 may be connected to the fourth trace line 240t-2.

Figure 13A:
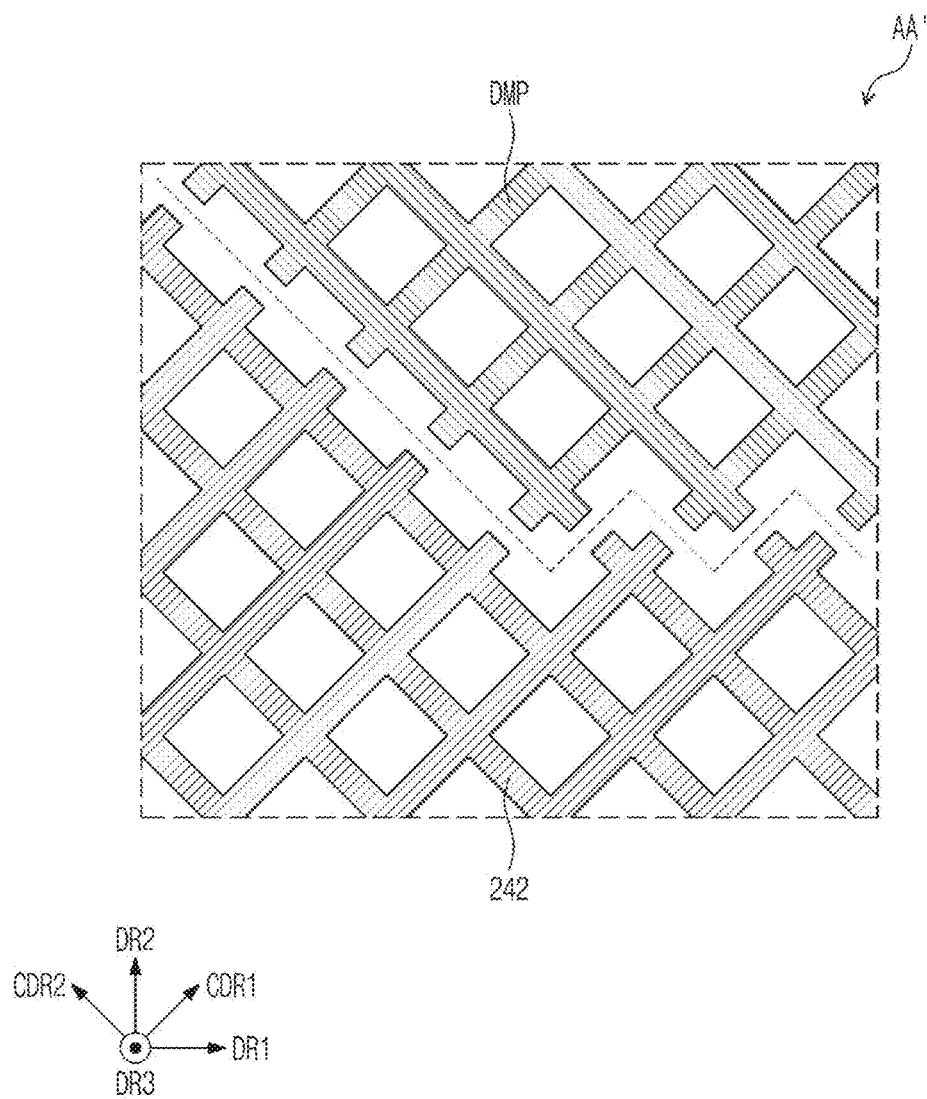
FIG. 13A is an enlarged plan view of an area AA' of FIG. 11A.
Figure 13B:
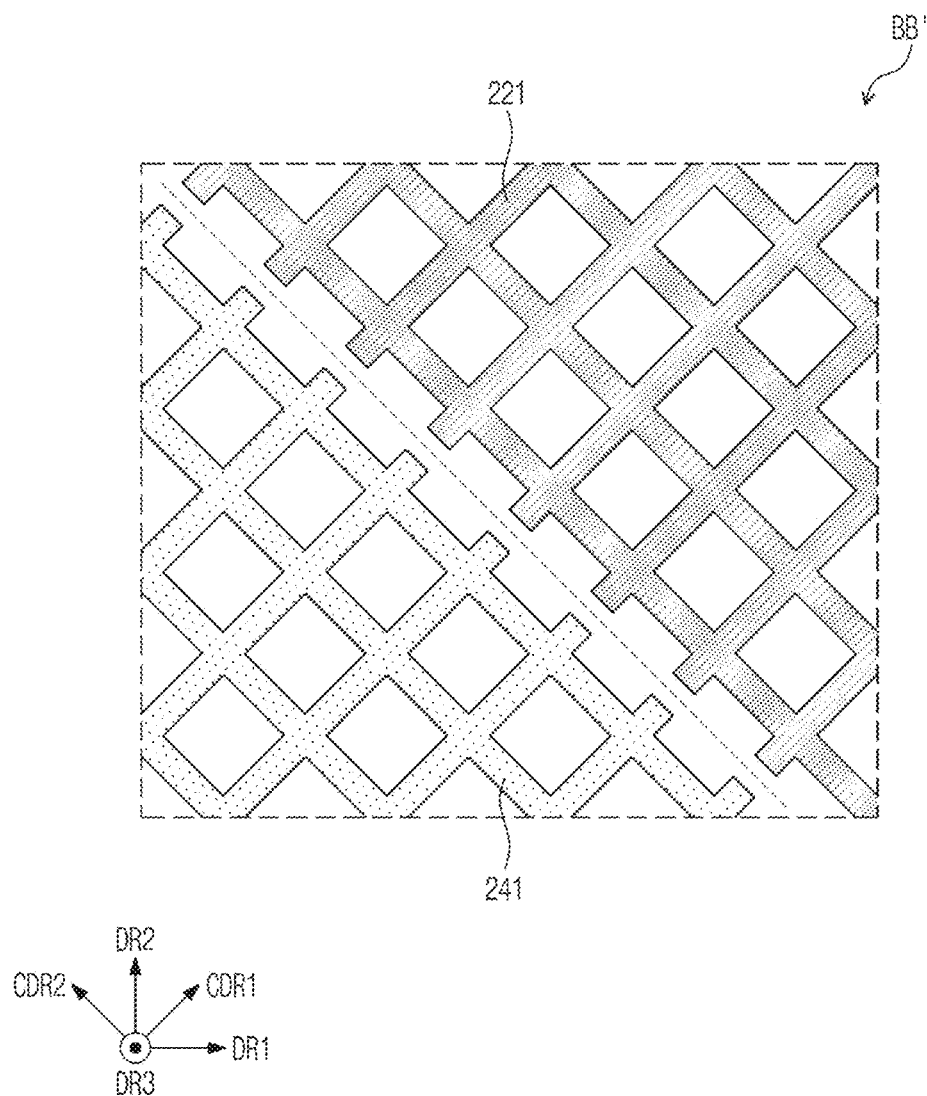
FIG. 13B is an enlarged plan view of an area BB' of FIG. 1B.

FIG. 13A is an enlarged plan view of an area AA' of FIG. 11A. FIG. 13B is an enlarged plan view of an area BB' of FIG. 1B.

Referring to FIGS. 11A, 11B, 13A, and 13B, each of first electrodes 210, second electrodes 220, third electrodes 230, fourth electrodes 240, and dummy patterns DMP may have a mesh structure. Each of the mesh structures may include a plurality of mesh lines. Each of the plurality of mesh lines may have a straight line shape extending in a direction (e.g., a set or predetermined direction), and the plurality of mesh lines may be connected to each other. Openings in which the mesh structure are not provided may be defined (provided or formed) in each of the first electrodes 210, the second electrodes 220, the third electrodes 230, the fourth electrodes 240, and the dummy patterns DMP.

FIGS. 13A and 13B illustrate an example in which the mesh structure includes mesh lines extending in a first crossing direction CDR1, which crosses the first direction DR1 and the second direction DR2, and mesh lines extending in a second crossing direction CDR2, which crosses the first crossing direction CDR1. However, the extension direction of the mesh lines constituting the mesh structure is not particularly limited to that illustrated in FIGS. 13A and 13B. For example, the mesh structure may include only mesh lines extending in the first direction DR1 and the second direction DR2 or may include mesh lines extending in the first direction DR1, the second direction DR2, the first crossing direction CDR1, and the second crossing direction CDR2. That is, the mesh structure may be changed into various forms or configurations.

Figure 14:
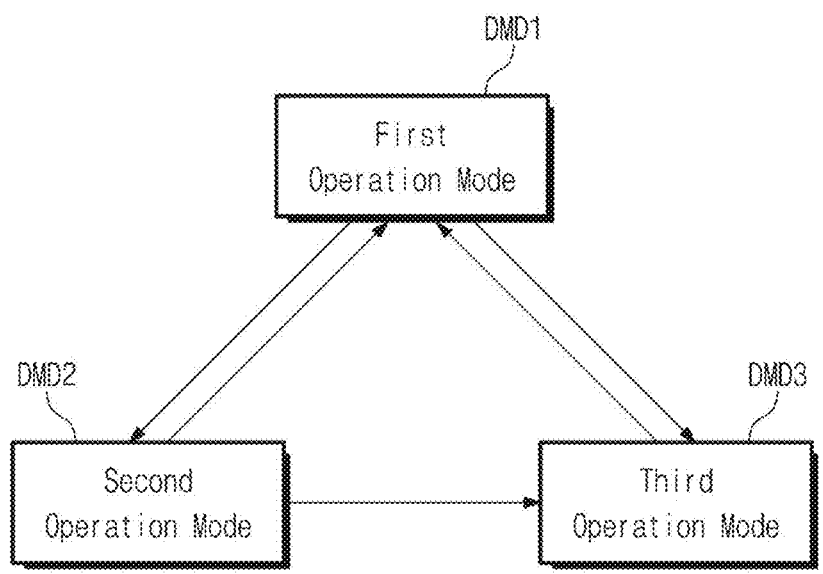
FIG. 14 is a view illustrating an operation of a sensor driving unit according to some embodiments of the present disclosure.

FIG. 14 is a view illustrating an operation of the sensor driving unit according to some embodiments of the present disclosure.

Referring to FIGS. 7 and 14, the sensor driving unit 200C may be configured to be selectively driven in one of a first operation mode DMD1, a second operation mode DMD2, and a third operation mode DMD3.

The first operation mode DMD1 may be referred to as a touch and pen standby mode, the second operation mode DMD2 may be referred to as a touch activation and pen standby mode, and the third operation mode DMD3 may be referred to as a pen activation mode. The first operation mode DMD1 may be a mode that waits for a first input 2000 and a second input 3000. The second operation mode DMD2 may be a mode that senses the first input 2000 and waits for the second input 3000. The third operation mode DMD3 may be a mode for sensing the second input 3000.

According to some embodiments of the present disclosure, the sensor driving unit 200C may be driven first in the first operation mode DMD1. When the first input 2000 is sensed in the first operation mode DMD1, the sensor driving unit 200C may be switched (or changed) to the second operation mode DMD2. Alternatively, when the second input 3000 is sensed in the first operation mode DMD1, the sensor driving unit 200C may be switched (or changed) to the third operation mode DMD3.

According to some embodiments of the present disclosure, when the second input 3000 is sensed in the second operation mode DMD2, the sensor driving unit 200C may be switched to the third operation mode DMD3. When the first input 2000 is released (or not detected) in the second operation mode DMD2, the sensor driving unit 200C may be switched to the first operation mode DMD1. When the second input 3000 is released (or not sensed) in the third operation mode DMD3, the sensor driving unit 200C may be switched to the first operation mode DMD1.

Figure 15:
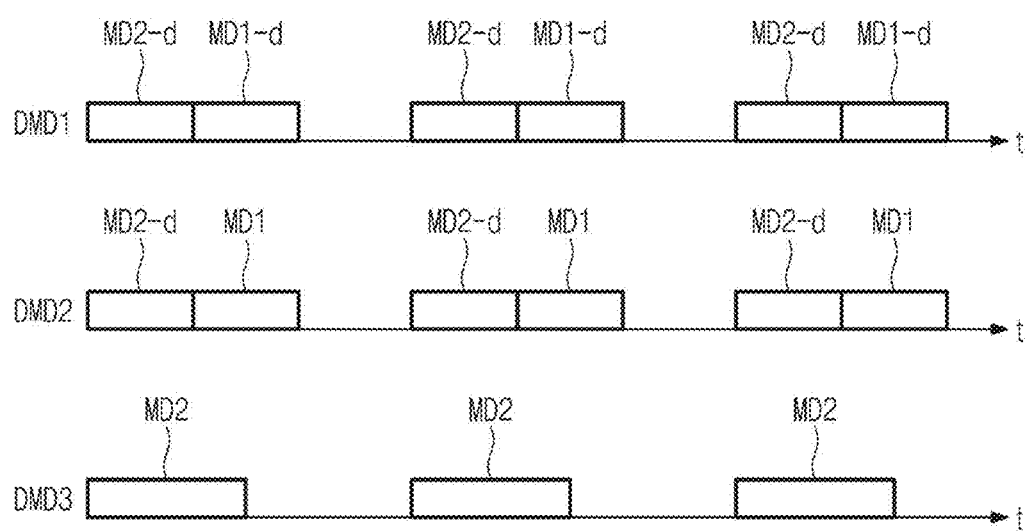
FIG. 15 is a view illustrating an operation of the sensor driving unit according to some embodiments of the present disclosure.

FIG. 15 is a view illustrating an operation of the sensor driving unit according to some embodiments of the present disclosure.

Referring to FIGS. 7, 14, and 15, operations in the first to third operation modes DMD1, DMD2, and DMD3 are illustrated in order of time (t).

In the first operation mode DMD1, the sensor driving unit 200C may be repeatedly driven in a second mode MD2-d and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. FIG. 15 illustrates an example in which the sensor driving unit 200C operates in the first mode MD1-*d* continuously after the second mode MD2-*d*, but the order is not limited thereto.

In the second operation mode DMD2, the sensor driving unit 200C may be repeatedly driven in the second mode MD2-*d* and the first mode MD1. During the second mode MD2-*d*, the sensor layer 200 may be scan-driven to detect the second input 3000. During the first mode MD1, the sensor layer 200 may be scan-driven to detect coordinates by the first input 2000.

In the third operation mode DMD3, the sensor driving unit 200C may be driven in the second mode MD2. During the second mode MD2, the sensor layer 200 may be scan-driven to detect coordinates by the second input 3000. In the third operation mode DMD3, the sensor driving unit 200C may not operate in the first mode MD1-*d* or MD1 until the second input 3000 is released (or not detected).

Referring to FIG. 9 together, in the first mode MD1-*d* and the first mode MD1, both the third electrodes 230 and the fourth electrodes 240 may be grounded. Thus, touch noise flowing through the third electrodes 230 and the fourth electrodes 240 may be prevented or reduced.

In the second mode MD2-*d* and the second mode MD2, one end of each of the third electrodes 230 and the fourth electrodes 240 may be floated. Additionally, in the second mode MD2-*d* and the second mode MD2, the other end of each of the third electrodes 230 and the fourth electrodes 240 may be grounded or floated. Thus, compensation of the sensing signal may be maximized or relatively improved by the coupling between the first electrodes 210 and the third electrodes 230 and the coupling between the second electrodes 220 and the fourth electrodes 240.

Figure 16A:
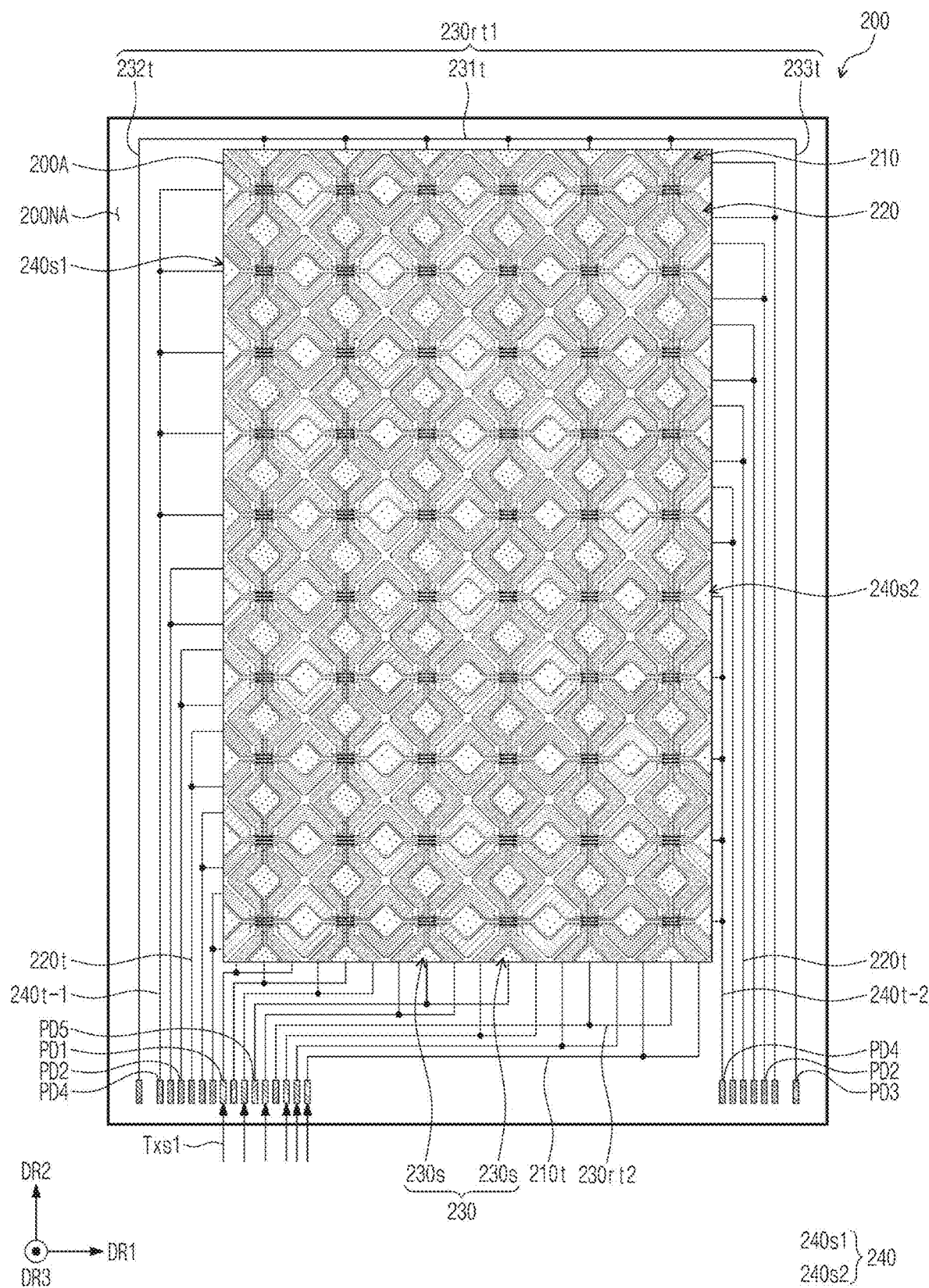
FIGS. 16A and 16B are views for explaining a first mode according to some embodiments of the present disclosure.
Figure 16B:
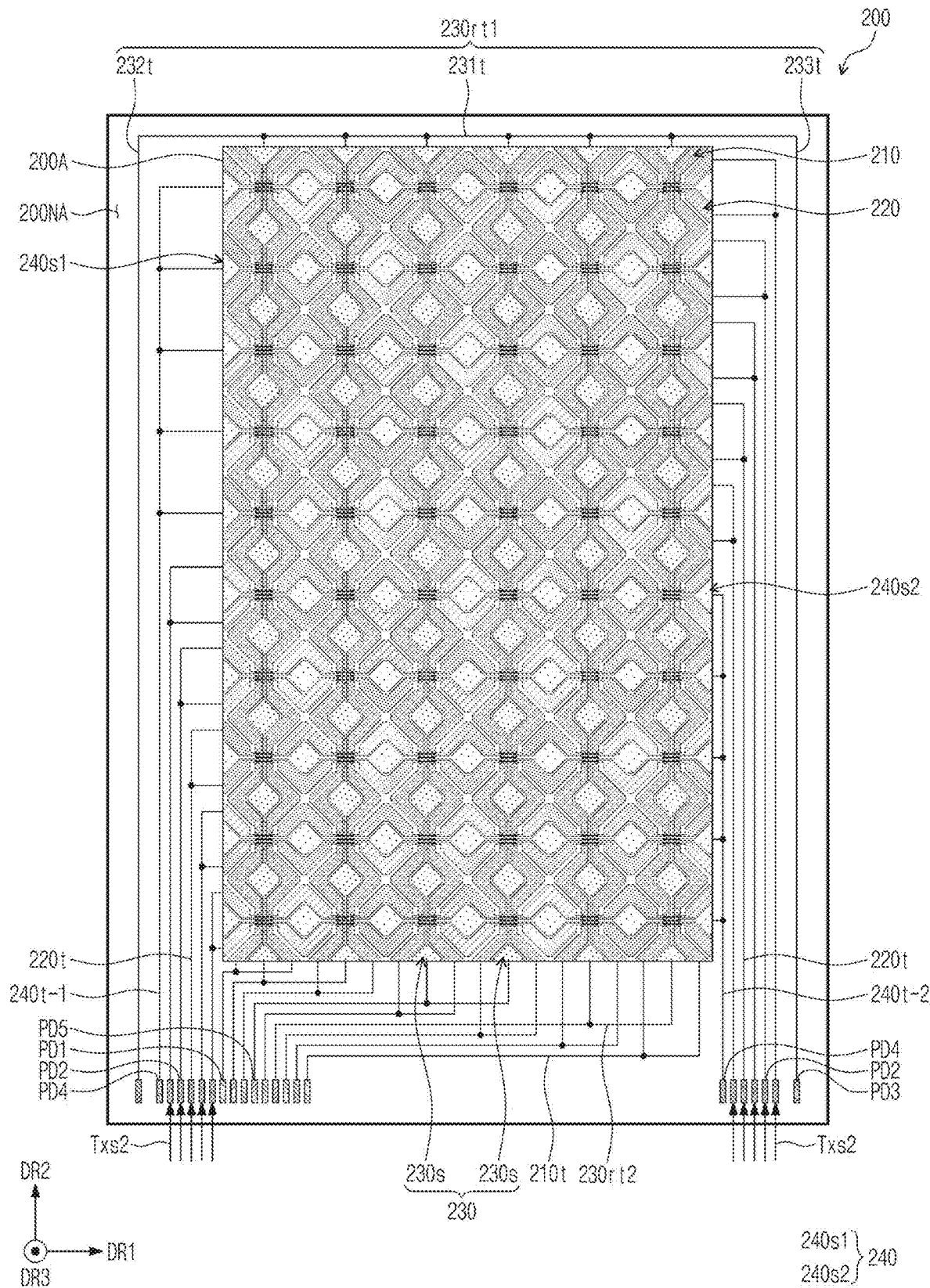

FIGS. 16A and 16B are views for explaining the first mode according to some embodiments of the present disclosure.

Referring to FIGS. 15, 16A, and 16B, the first mode MD1-*d* and the first mode MD1 may include a self-capacitance detection mode. The self-capacitance detection mode may include a first sub-section and a second sub-section. FIG. 16A is a view for explaining an operation in the first sub-section, and FIG. 16B is a view for explaining an operation in the second sub-section.

The sensor driving unit 200C may be configured to output driving signals Txs1 and Txs2 to the first electrodes 210 and the second electrodes 220 in the self-capacitance detection mode and may be configured to calculate input coordinates by sensing changes in capacitance of each of the second electrodes 220. Referring to FIG. 16A, in the first sub-section, the sensor driving unit 200C may output the driving signal Txs1 to the first trace lines 210*t*. Referring to FIG. 16B, in the second sub-section, the sensor driving unit 200C may output the driving signal Txs2 to the second trace lines 220*t*.

The third electrodes 230 may be electrically connected to the third trace line 230*rt*1 and the fifth trace line 230*rt*2, and the fourth electrodes 240 may be electrically connected to the fourth trace lines 240*t*-1 and 240*t*-2. In the self-capacitance detection mode, both the third electrodes 230 and the fourth electrodes 240 may be grounded. Thus, noise may not be introduced through the third electrodes 230 and fourth electrodes 240.

Figure 17:
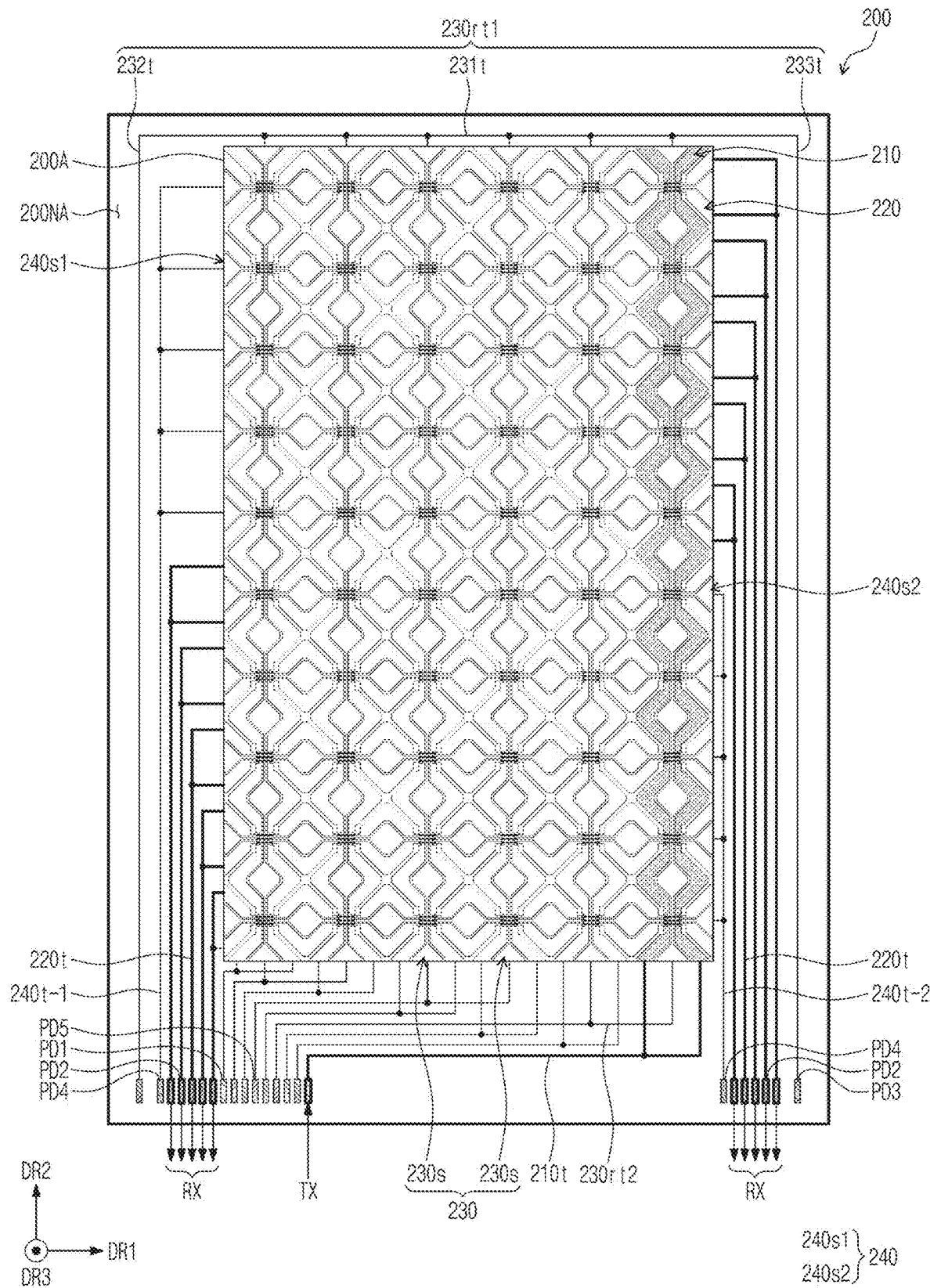
FIG. 17 is a view for explaining the first mode according to some embodiments of the present disclosure.

FIG. 17 is a view for explaining the first mode according to some embodiments of the present disclosure.

Referring to FIGS. 7, 15, and 17, the first mode MD1-*d* and the first mode MD1 may further include a mutual capacitance detection mode. FIG. 17 is a view for explaining the mutual capacitance detection mode in the first mode MD1-*d* and the first mode MD1.

In the mutual capacitance detection mode, the sensor driving unit 200C may sequentially provide a transmission signal TX to the first electrodes 210 and may detect coordinates for the first input 2000 by using a reception signal RX detected through the second electrodes 220. For example, the sensor driving unit 200C may be configured to calculate input coordinates by sensing changes in mutual capacitance between the first electrodes 210 and the second electrodes 220.

FIG. 17 illustrates an example in which the transmission signal TX is provided to one first electrode 210, and the reception signal RX is output from the second electrodes 220. To clarify the expression of the signal, only one first electrode 210 to which the transmission signal TX is provided may be hatched in FIG. 17. The sensor driving unit 200C may detect the input coordinates for the first input 2000 by sensing a change in capacitance between the first electrode 210 and each of the second electrodes 220.

In the mutual capacitance detection mode, both the third electrodes 230 and the fourth electrodes 240 may be grounded. Thus, noise may not be introduced (or may be relatively reduced) through the third electrodes 230 and fourth electrodes 240.

In each of the first modes MD1-*d* and MD1, the sensor layer 200 may alternately repeat the operations described in FIGS. 16A, 16B, and 17. However, this is only an example and is not particularly limited thereto. For example, in each of the first mode MD1-*d* and the first mode MD1, the sensor layer 200 may repeatedly perform only the operation described in FIG. 17. Alternatively, in the first mode MD1-*d*, the sensor layer 200 may repeatedly perform at least one of the operations described in FIGS. 16A, 16B, and 17, and in the first mode MD1, the sensor layer 200 may alternately repeat the operations described in FIGS. 16A, 16B, and 17.

Figure 18:
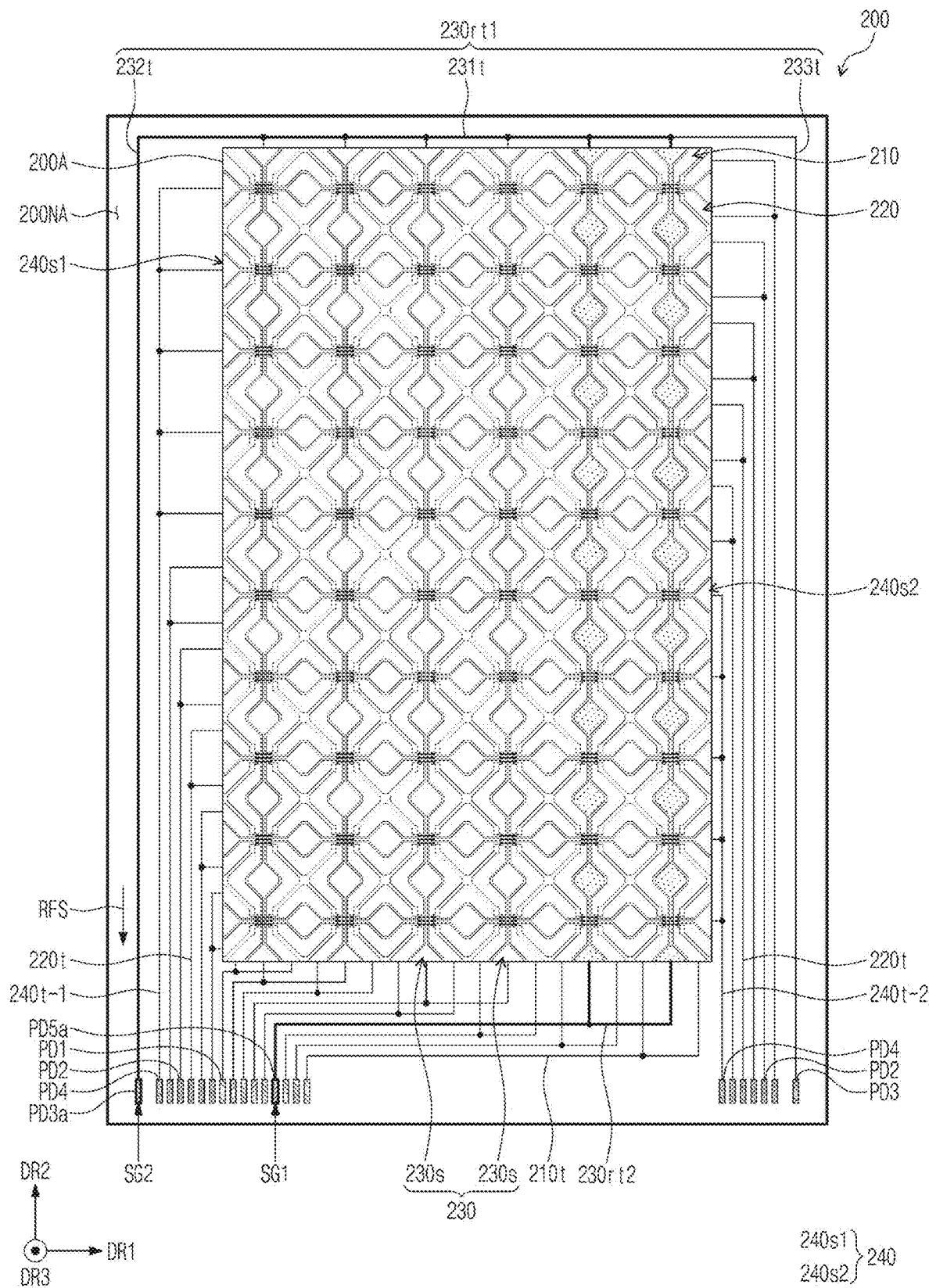
FIG. 18 is a view for explaining a second mode according to some embodiments of the present disclosure.

FIG. 18 is a view for explaining the second mode according to some embodiments of the present disclosure.

Referring to FIGS. 7, 15, and 18, the second mode MD2 may include a charging driving mode and a pen sensing driving mode.

In the charging driving mode, the sensor driving unit 200C may apply a first charging signal SG1 to at least one of the third pads PD3 or the fifth pads PD5 and may apply a second charging signal SG2 to the other at least one pad. The second charging signal SG2 may be an inverse signal of the first charging signal SG1. For example, the first charging signal SG1 may be a sinusoidal wave signal.

FIG. 18 illustrates an example in which the first charging signal SG1 is applied to one pad, and the second charging signal SG2 is applied to the other pad, but is not limited thereto. For example, the first charging signal SG1 may be applied to two or more pads, and the second charging signal SG2 may be applied to two or more other pads.

Because the first charging signal SG1 and the second charging signal SG2 are applied to at least two pads, current RFS may have a current path flowing through at least one pad to at least one other pad. Additionally, because the first charging signal SG1 and the second charging signal SG2 are sinusoidal signals having an inverse relationship with each other, the direction of the current RFS may be changed periodically.

The first charging signal SG1 and the second charging signal SG2 may have an anti-phase relationship with each other. Thus, the noise generated in the display layer 100 by the first charging signal SG1 may be offset with the noise generated by the second charging signal SG2. Thus, a flicker phenomenon may not occur in the display layer 100, and display quality of the display layer 100 may be relatively improved.

The second charging signal SG2 may be provided to one third pad PD3a connected to one third trace line 230rt1, and the first charging signal SG1 may be provided to one fifth pad PD5a connected to the third electrode 230. The current RFS may flow through the current path defined by the fifth pad PD5a, the fifth trace line 230rt2 connected to the fifth pad PD5a, the third electrode 230, a portion of the third trace line 230rt1 connected to the third pad PD3a, and the third electrode 230. The current path may have a coil shape. Thus, in the second charging mode, a resonance circuit of the pen PN may be charged by the current path. Here, the plurality of third electrodes 230 may be referred to as a plurality of channels, respectively.

According to some embodiments of the present disclosure, a current path of a loop coil pattern may be implemented by the components included in the sensor layer 200. Thus, the electronic device 1000 may charge the pen PN using the sensor layer 200. Thus, because there is no need to separately add the coil for charging the pen PN, the electronic device 1000 may not increase in thickness and weight and may not be deteriorated in flexibility.

In the charging driving mode, the first electrodes 210, the second electrodes 220, and the fourth electrodes 240 may be grounded, have a constant voltage applied, or be electrically floated. For example, the first electrodes 210, the second electrodes 220, and the fourth electrodes 240 may be floated. In this case, the current RFS may not flow through the first electrodes 210, the second electrodes 220, and the fourth electrodes 240.

The charging driving mode may include a searching charging driving mode and a tracking charging driving mode.

Because it is not in the state in which the position of the pen PN is sensed in the searching charging mode, the first charging signal SG1 or the second charging signal SG2 may be provided sequentially to all the channels included in the sensor layer 200. For example, the first charging signal SG1 and the second charging signal SG2 may be sequentially scanned in the first direction DR1. That is, the entire sensing area 200A of the sensor layer 200 may be scanned in the searching charging driving mode.

When the pen PN is sensed in the searching charging driving mode, the sensor layer 200 may be driven for tracking charging. For example, in the tracking charging driving mode, the sensor driving unit 200C may sequentially output the first charging signal SG1 and the second charging signal SG2 to an area that overlaps a point, at which the pen PN is sensed, rather than the entire sensing layer 200.

Thus, after the position of the pen PN is sensed, channels that are charged and driven in response to the position of the pen PN in a previous frame may be limited. Thus, efficiency of charging operation may be relatively improved as the channels overlapping an area on which the pen is not located are not charged.

Figure 19A:
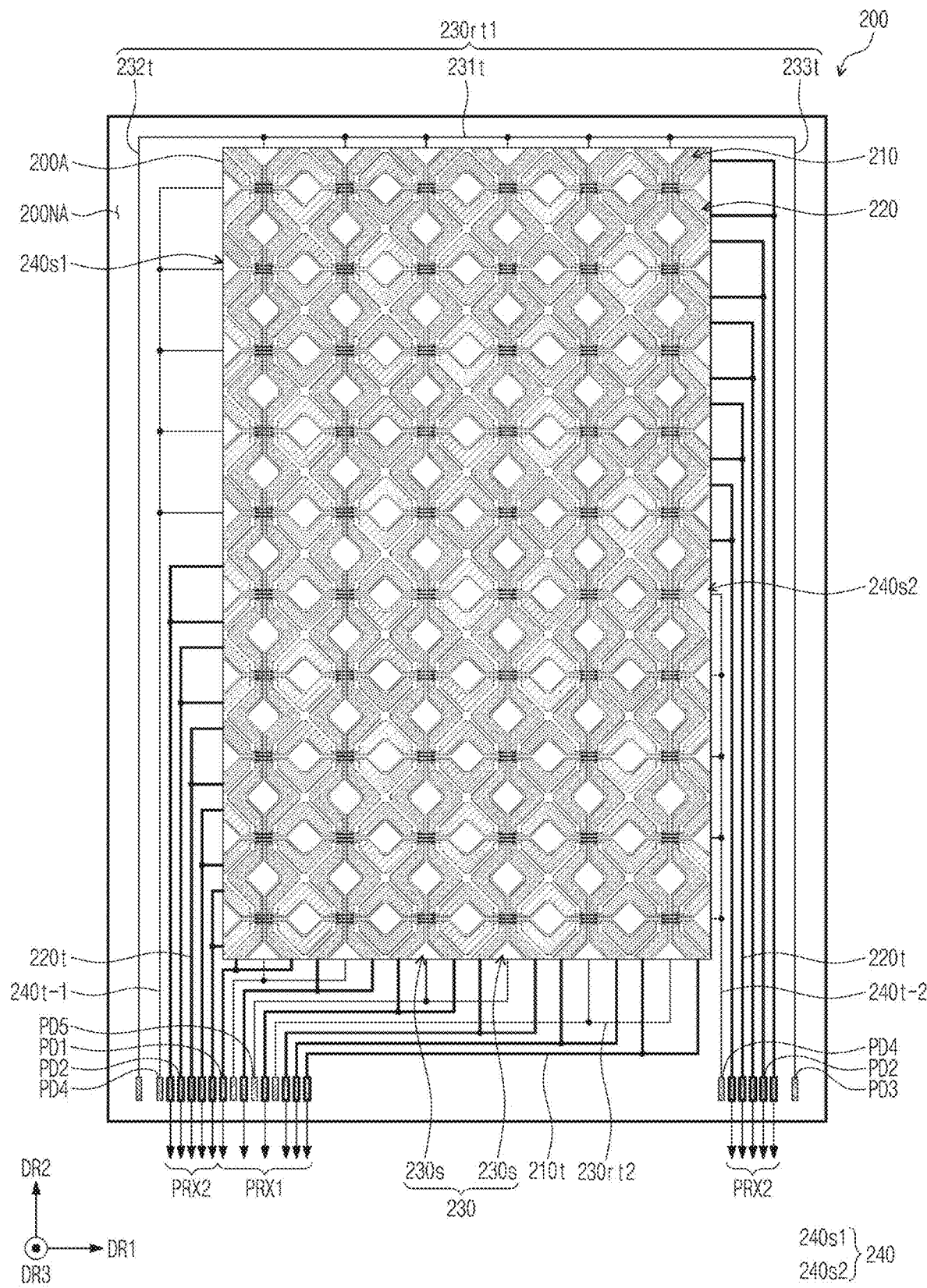
FIG. 19A is a view for explaining the second mode according to some embodiments of the present disclosure.
Figure 19B:
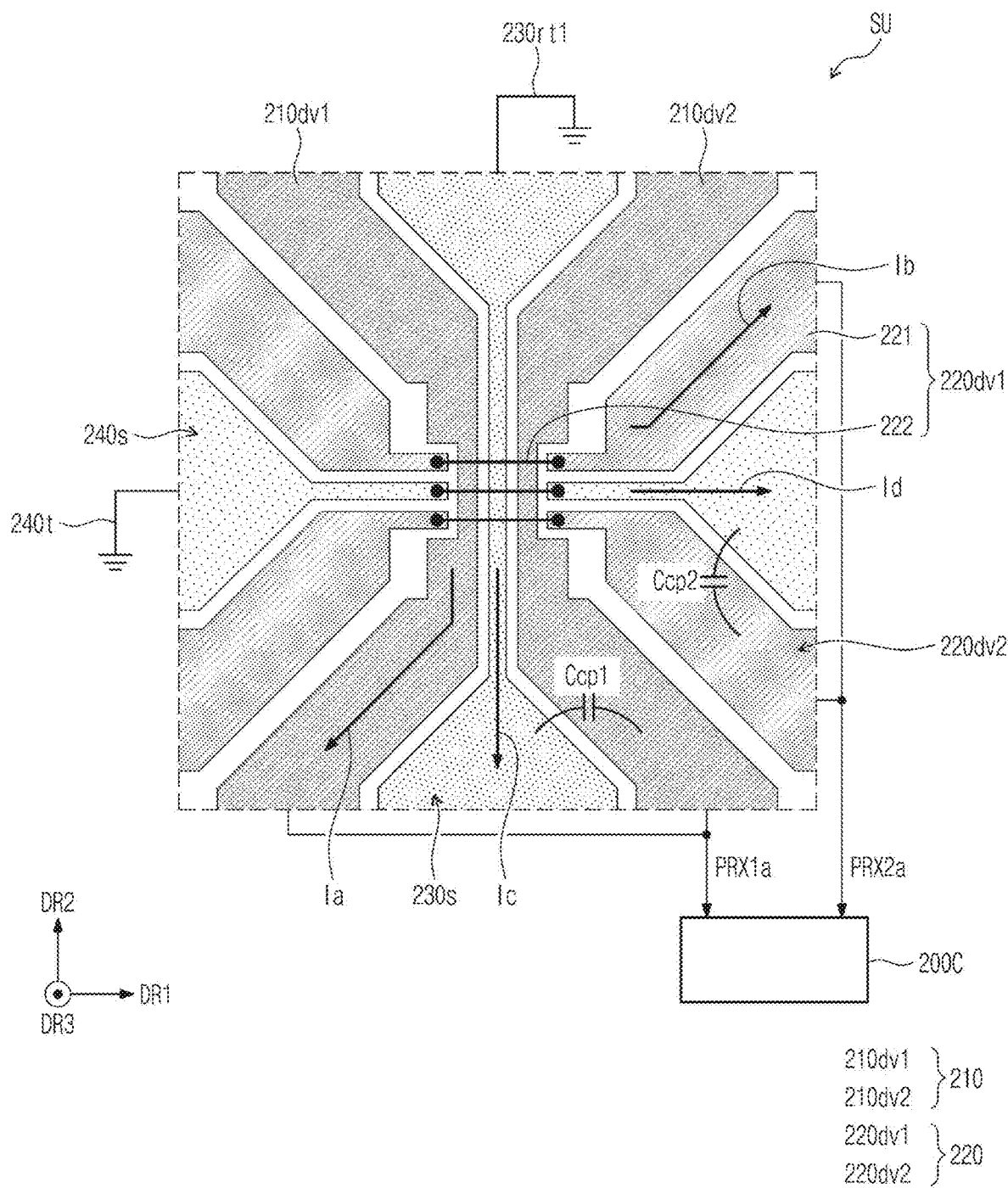
FIG. 19B is a view for explaining the second mode on the basis of sensing units according to some embodiments of the present disclosure.

FIG. 19A is a view for explaining the second mode according to some embodiments of the present disclosure, and FIG. 19B is a view for explaining the second mode on the basis of sensing units according to some embodiments of the present disclosure.

Referring to FIGS. 7, 19A, and 19B, in the second mode, the charging driving mode and the pen sensing driving mode may be alternately repeated. FIG. 19B illustrates one sensing unit SU through which first to fourth induced current Ia, Ib, Ic, and Id generated by the pen PN flow.

An RLC resonance circuit of the PN may emit magnetic fields at a resonance frequency while discharging the charged charges. The first induced current Ia may be generated in the first electrode 210, and the second induced current Ib may be generated in the second electrode 220 by the magnetic fields provided from the pen PN. In addition, the third induced current Ic may be generated in the first auxiliary electrode 230s of the third electrode 230, and the fourth induced current Id may also be generated in the second auxiliary electrode 240s of the fourth electrode 240.

A first coupling capacitor Ccp1 may be located between the first auxiliary electrode 230s and the first electrode 210, and a second coupling capacitor Ccp2 may be dispose between the second auxiliary electrode 240s and the second electrode 220. The third induced current Ic may be transmitted to the first electrode 210 through the first coupling capacitor Ccp1, and the fourth induced current Id may be transmitted to the second electrode 220 through the second coupling capacitor Ccp2. Here, each of the plurality of first electrodes 210 and the plurality of second electrodes 220 may be referred to as a channel.

The sensor driving unit 200C may receive a first sensing signal PRX1a based on the first induced current Ia and the third induced current Ic from the first electrode 210 and may receive a second sensing signal PRX2a based on the induced current Ib and the fourth induced current Id from the second electrode 220. That is, the sensor driving unit 200C may receive the first sensing signal PRX1 from the plurality of first electrodes 210 and may receive the second sensing signal PRX2 from the plurality of second electrodes 220. The sensor driving unit 200C may detect coordinates CD (see FIG. 20) of the pen PN based on the first sensing signal PRX1 and/or the second sensing signal PRX2.

The sensor driving unit 200C may receive the first sensing signal PRX1a from the first electrodes 210 and may receive the second sensing signal PRX2a from the second electrodes 220. Here, both ends of the third electrodes 230 and the fourth electrodes 240 may be floated. Thus, compensation of the sensing signal may be maximized or relatively improved by the coupling between the first electrodes 210 and the third electrodes 230 and the coupling between the second electrodes 220 and the fourth electrodes 240. In addition, other ends of the third electrodes 230 and the fourth electrodes 240 may be grounded or floated. Thus, the third induced current Ic and the fourth induced current Id may be sufficiently transmitted to the first electrodes 210 and the second electrodes 220 by the coupling between the first electrodes 210 and the third electrodes 230 and the coupling between the second electrodes 220 and the fourth electrodes 240.

According to some embodiments of the present disclosure, the routing directions of the electrode and the auxiliary electrode, which overlap each other, of the sensor layer 200 may be different from each other. For example, the routing direction of the first electrode 210 and the routing direction of the first auxiliary electrode 230s may be different from each other. In addition, the routing direction of the second electrode 220 and the routing direction of the second auxiliary electrode 240s may be different from each other. For example, in FIG. 18B, the first electrode 210 and the first trace line 210t may be connected at a lower portion of the sensing unit SU, and the first auxiliary electrode 230s and the third trace line 230rt1 may be connected to an upper portion of the sensing unit SU. The second electrode 220 and the second trace line 220t may be connected to a left side of the sensing unit SU, and the second auxiliary electrode 240s and the fourth trace line 240t may be connected to a right side of the sensing unit SU.

Figure 20:
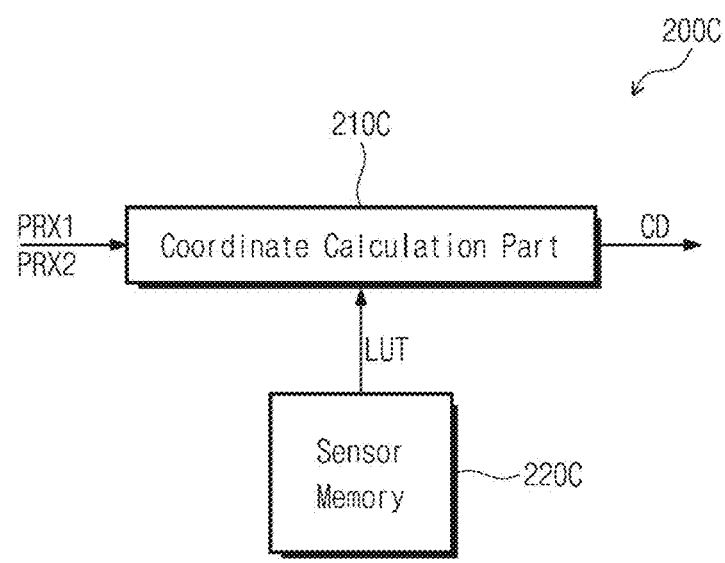
FIG. 20 is a block diagram of a sensor driving unit according to some embodiments of the present disclosure.

FIG. 20 is a block diagram of the sensor driving unit according to some embodiments of the present disclosure.

Referring to FIGS. 7 and 20, the sensor driving unit 200C may include a coordinate calculation part (or coordinate calculator or coordinate calculation circuit or coordinate calculation component) 210C.

The coordinate calculation part 210C may calculate coordinates CD based on the sensing signals PRX1 and PRX2 sensed by the pen PN in the sensor layer 200.

The coordinate calculation part 210C may receive a lookup table LUT. Set coordinates according to a first signal value may be defined in the lookup table LUT. This will be described later.

The sensor driving unit 200C may further include a sensor memory 220C. The lookup table LUT may be stored in the sensor memory 220C. However, this is an example, and the sensor memory 220C according to some embodiments of the present disclosure may be omitted, and the lookup table LUT may be stored in the memory 1300 (see FIG. 1) of the electronic device 1000 (see FIG. 1).

Figure 21:
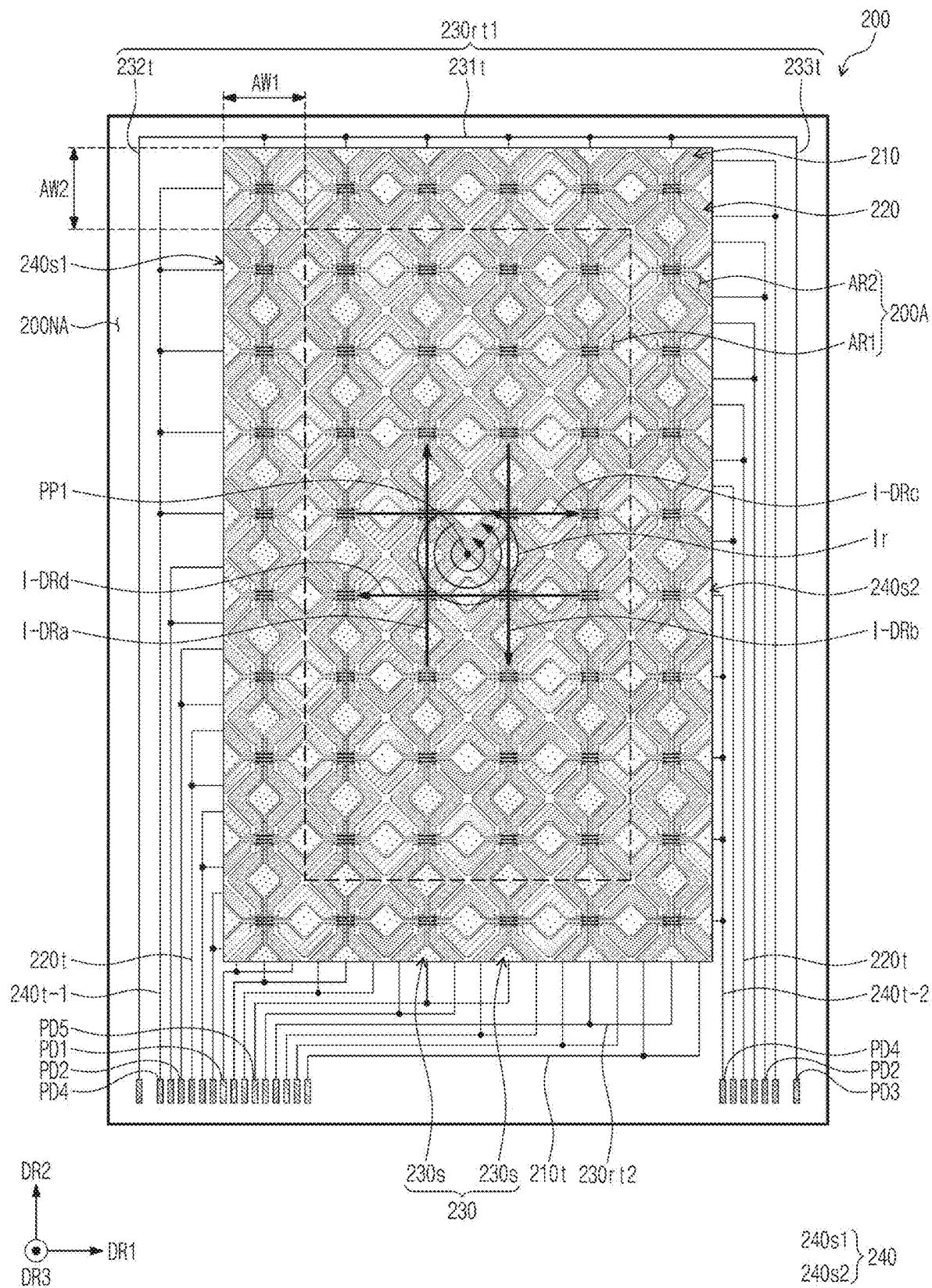
FIG. 21 is a view of a sensor layer for explaining an operation of the sensor driving unit according to some embodiments of the present disclosure.
Figure 22:
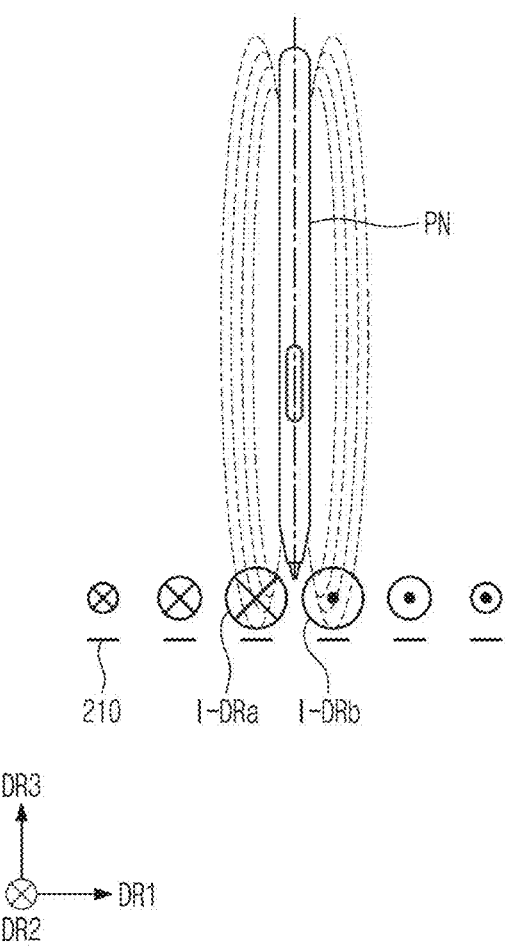
FIG. 22 is a view illustrating an intensity and direction of induced current generated in a pan and first electrodes according to some embodiments of the present disclosure.

FIG. 21 is a view of the sensor layer for explaining an operation of the sensor driving unit according to some embodiments of the present disclosure, and FIG. 22 is a view illustrating an intensity and direction of induced current generated in the pan and the first electrodes according to some embodiments of the present disclosure. In describing FIG. 21, the same reference numerals are used for the components described through FIG. 9, and descriptions thereof will be omitted.

Referring to FIGS. 9, 21, and 22, the sensing area 200A may include a first area AR1 and a second area AR2. The second area AR2 may be located adjacent to the first area AR1. The second area AR2 may surround the first area AR1. The first area AR1 may be referred to as a center area, and the second area AR2 may be referred to as a peripheral area.

A first area width AW1 extending in the first direction DR1 of the second area AR2 may be proportional to a first width W1 of the sensing unit SU (see FIG. 10). A second area width AW2 extending in the second direction DR2 of the second area AR2 may be proportional to a second width W2 of the sensing unit SU (see FIG. 10). For example, the second area AR2 may be defined by a width equal to those of two sensing units SU. The first area width AW1 and the second area width AW2 may be the same as each other. According to some embodiments, each of the first area width AW1 and the second area width AW2 may be 8 millimeters (mm) (or about 8 mm), although embodiments according to the present disclosure are not limited thereto. For example, according to some embodiments, the sizes of the first area width AW1 and the second area width AW2 may be proportional to the pitch of (e.g., the distance between) the adjacent sensing units SU.

According to some embodiments, the sizes of each of the first area width AW1 and the second area width AW2 may be equal to a pitch between adjacent channels of the sensor layer (e.g., 2 mm, 3 mm, 4 mm, 5 mm, etc.) multiplied by a number of channels (e.g., a set or predetermined number of channels) for which an input signal from an input device is predetermined to indicate the input device is at an edge region or a dead zone. For example, as described with respect to FIG. 29, the dead zone or edge region may occur at an area corresponding to the edge of the sensor layer and the second channel (e.g., located 8 mm from an edge of the sensor layer). Thus, the dead zone corresponds to the pitch (4 mm) multiplied by a number of channels in a range between which measurements are predetermined to be taken for the second area (e.g., 3), divided by two. Thus, as illustrated in some embodiments, the dead zone may occur between 0 mm and 6 mm from an edge of the sensor layer. When the pitch is 3 mm, the dead zone may occur between 0 mm and 4.5 mm from an edge of the sensor layer.

The pen PN according to some embodiments of the present disclosure may be close to a first position PP1 overlapping the first area AR1. Current Ir may flow through an inductor L while the RLC resonance circuit of the pen PN discharges the charged charges. The magnetic fields may be generated by the current Ir. Induced currents I-DRa, I-DRb, I-DRc, and I-DRd may be generated in the plurality of first electrodes 210 and the plurality of second electrodes 220 by the current Ir. The induced currents I-DRa, I-DRb, I-DRc, and I-DRd may be generated in a direction opposite to the direction of the current Ir.

The first induced current I-DRa may be generated in the first electrodes 210 located at a left side of the first position PP1 in the second direction DR2. That is, based on the position of the pen PN, the first induced current I-DRa may flow in a direction entering a cross section.

The second induced current I-DRb may be generated in the first electrodes 210 located at a right side of the first position PP1 in a direction opposite to the second direction DR2. That is, based on the position of the pen PN, the second induced current I-DRb may flow in a direction coming from the cross section.

A size of a circle indicating the direction of each of the induced current I-DRa and I-DRb may correspond to a size of each of the induced current I-DRa and I-DRb. That is, as a distance from the pen PN increases, the intensities of the induced currents I-DRa and I-DRb may decrease. When the pen PN is not tilted and is provided in a direction parallel to the third direction DR3, the intensities of the induced currents I-DRa and I-DRb may be symmetrical to each other in a left and right direction based on the first position PP1 of the pen PN.

The third induced current I-DRc may be generated in the second electrodes 220 located above the first position PP1 in the first direction DR1.

The fourth induced current I-DRd may be generated in the second electrodes 220 located below the first position PP1 in a direction opposite to the first direction DR1.

In FIG. 22, the first electrodes 210 are described as an example, but the descriptions of the induced currents I-DRa and I-DRb according to some embodiments of the present disclosure may be equally applied to the induced current I-DRc and I-DRd generated in the second electrodes 220.

Figure 23A:
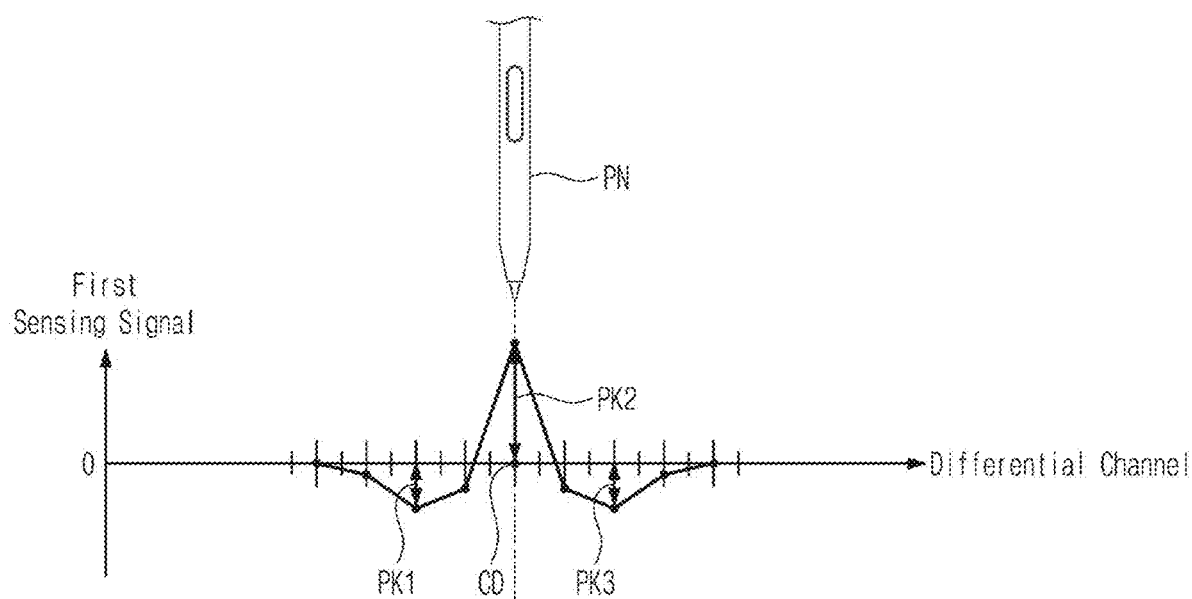
FIG. 23A is a graph of a sensing current value illustrating a sensing signal acquired form a differential pair of channels according to some embodiments of the present disclosure.

FIG. 23A is a graph of a sensing current value illustrating a sensing signal acquired form a differential pair of channels according to some embodiments of the present disclosure. FIG. 23A illustrates an example of the first sensing signal PRX1 (see FIG. 19A) acquired from differential channels defined by the first electrodes 210 (see FIG. 21).

Referring to FIGS. 20 to 23A, the coordinate calculation part 210C may calculate coordinates CD of the pen PN located on the first area AR1 through a first method. The first sensing signal PRX1 may be generated from a differential signal sensed differentially with the adjacent channels or the channels spaced apart from each other of the sensor layer 200 based on the current induced from the pen PN through the first method. The first method may be referred to as a differential method.

When the pen PN is located on the first area AR1, the coordinate calculation part 210C may differentially sense the adjacent channels or the channels spaced apart from each other of the plurality of first electrodes 210 to sense the first sensing signal PRX1. FIG. 23A illustrates the first sensing signal PRX1 acquired by differentially sensing an N-th first electrode and an N+2-th first electrode. However, this is an example, and the number of first electrodes for the differential sensing according to some embodiments of the present disclosure is not limited thereto. For example, the N-th first electrode and an N+3-th first electrode may be differentially sensed.

The coordinate calculation part 210C may acquire data about the differentially sensed current. The above data may be used to process information about the input from the pen PN. The first sensing signal PRX1 may include the above data. Peak values PK1, PK2, and PK3 that are necessary for calculating position coordinates of the pen PN may be selected from the sensing current value graph, The plurality of peak values PK1, PK2, and PK3 may include a first peak value PK1, a second peak value PK2, and a third peak value PK3. Each of the first peak value PK1 and the third peak value PK3 may have a negative sign, and the second peak value PK2 may have a positive sign. The first peak value PK1 and the third peak value PK3 may be spaced apart from each other with the second peak value PK2 therebetween. The second peak value PK2 may be a maximum value of the sensing current value graph. The first peak value PK1 and the third peak value PK3 may be the smallest value and/or the second smallest value of the sensing current value graph.

The coordinate calculation part 210C may calculate an X coordinate (CD) of the pen PN based on the second peak value PK2. The X coordinate detected from the plurality of first electrodes 210 and a Y coordinate detected from the plurality of second electrodes 220 may be corrected according to a tilt angle and an azimuth angle, which will be described later.

Figure 23B:
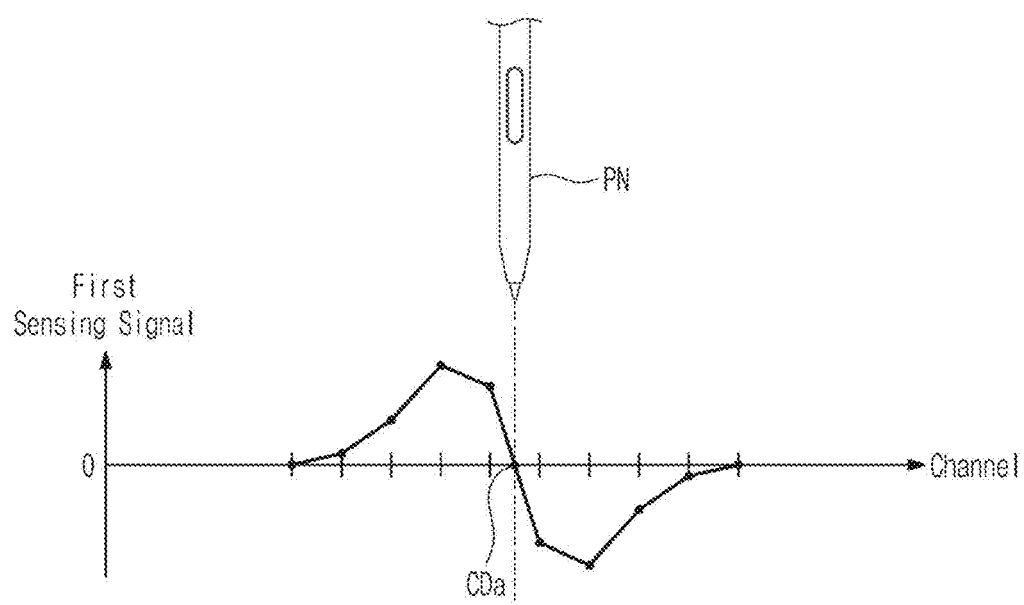
FIG. 23B is a graph of a sensing current value illustrating current acquired from the channels according to some embodiments of the present disclosure.

FIG. 23B is a graph of a sensing current value illustrating current acquired from the channels according to some embodiments of the present disclosure. FIG. 23B illustrates an example in which the first sensing signal PRX1 (see FIG. 19A) acquired from the channels defined by the first electrodes 210 (see FIG. 21).

Referring to FIGS. 20, 21, and 23B, the coordinate calculation part 210C may calculate coordinates CDa of the pen PN through a second method different from the first method with respect to the pen located on the first area AR1. The first sensing signal PRX1 may be generated from a signal received based on the current induced from the pen PN through the second method. The second method may be referred to as a single-ended method.

When the pen PN is located on the first area AR1, the coordinate calculation part 210C may sense channels corresponding to the plurality of first electrodes 210 to sense the first sensing signal PRX1.

The direction of the current sensed from the channels spaced apart from each other with the portion, at which the pen PN is located, therebetween may be different. Thus, the directions of the current flowing through the channels, which are located at the left side, and the channels, which are located at the right side, based on the position of the pen PN may be different. The coordinate calculation part 210C may calculate the coordinates CDa based on a zero crossing value of the first sensing signal PRX1 on the first area AR1.

Figure 24:
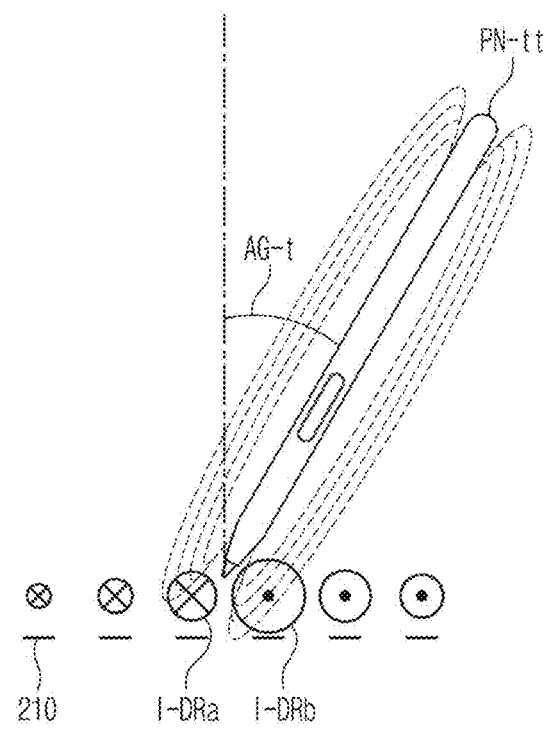
FIG. 24 is a view illustrating an intensity and direction of induced current generated between the pan and the first electrodes according to some embodiments of the present disclosure.
Figure 25:
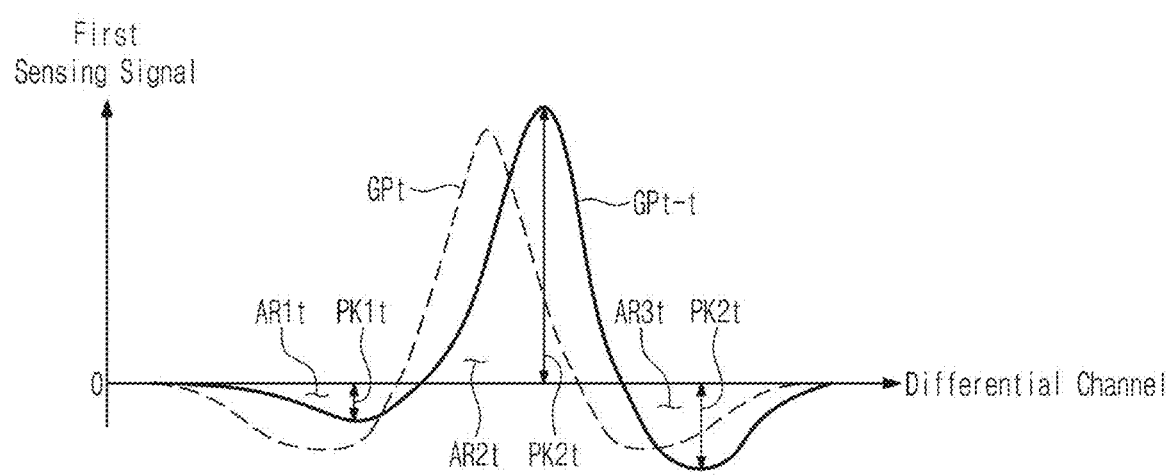
FIG. 25 is a view for explaining a method for measuring a tilt angle and azimuth angle of a pen according to some embodiments of the present disclosure.

FIG. 24 is a view illustrating an intensity and direction of the induced current generated between the pan and the first electrodes according to some embodiments of the present disclosure, and FIG. 25 is a view for explaining a method for measuring the tilt angle and the azimuth angle of the pen according to some embodiments of the present disclosure. In describing FIG. 24, the same reference numerals are used for the components described through FIG. 22, and descriptions thereof will be omitted. In description in FIG. 25, the same reference numerals are used for the components described in FIG. 23A, and descriptions thereof are omitted.

Referring to FIGS. 24 and 25, when a pen PN-tt is tilted at an angle (e.g., a set or predetermined angle) AG-t, an intensity of induced currents I-DRb in a tilted direction may be greater than that of induced current I-DRa in an opposite direction.

A first graph GPt is a first sensing signal sensed when the pen PN (see FIG. 22) is not tilted. For example, the first graph GPt may be substantially the same as the graph obtained by measuring the first sensing signal PRX1 of FIG. 23A. The first graph GPt may have a shape that is substantially symmetrical with respect to the second peak value PK2.

A second graph GPt-t is a first sensing signal sensed when the pen PN-tt is tilted. When the pen PN-tt is tilted, the first graph GPt may be transformed like the second graph GPt-t.

Information about first to third peak values PK1$t$, PK2$t$, and PK3$t$ and first to third areas AR1$t$, AR2$t$, and AR3$t$ may be acquired based on the second graph GPt-t. The sensor driving unit 200C (see FIG. 7) may calculate an X-axis tilt angle based on at least some of the first to third peak values PK1$t$, PK2$t$, and PK3$t$ and the first to third areas AR1$t$, AR2$t$, and AR3$t$.

Figure 26:
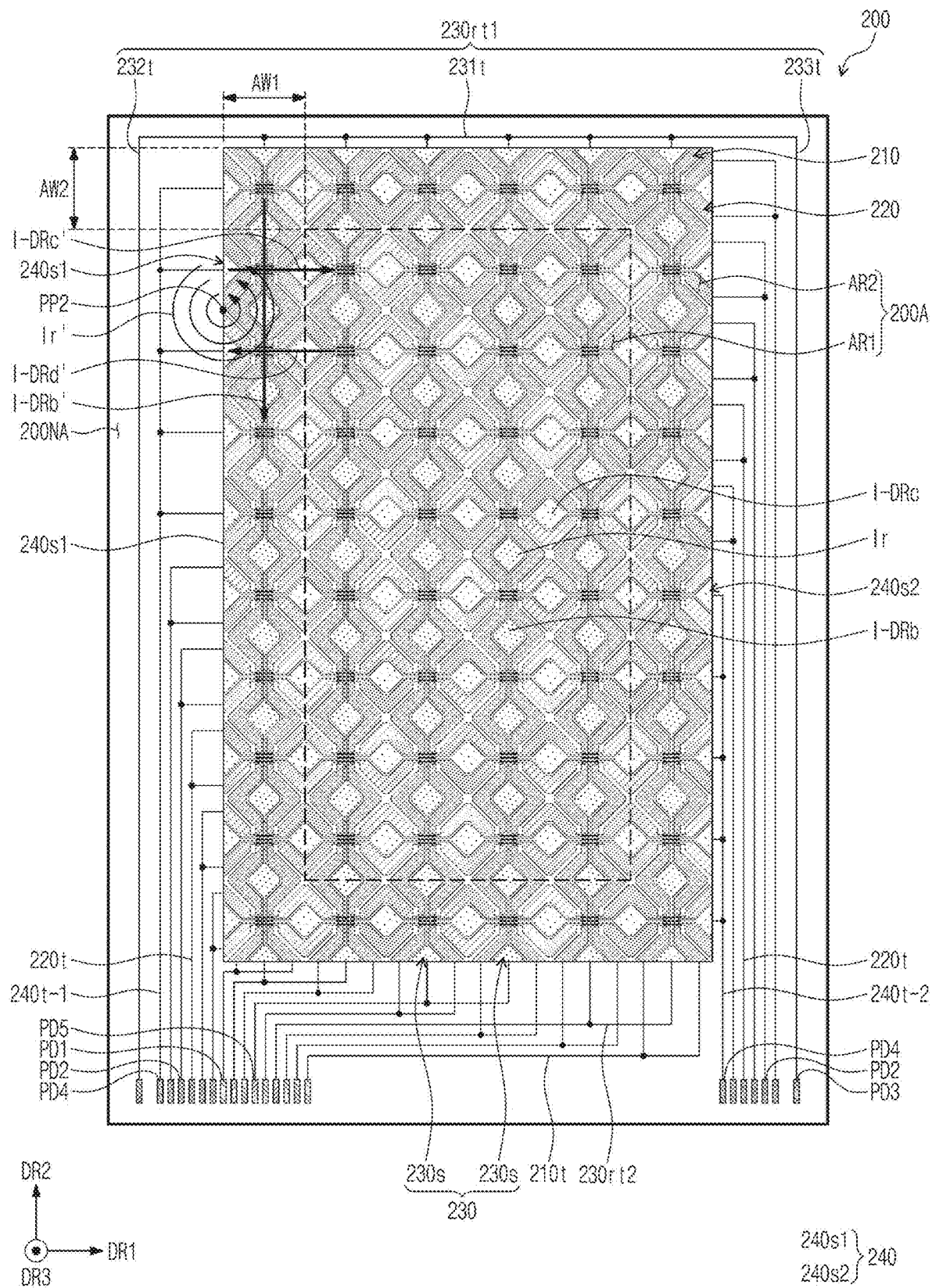
FIG. 26 is a view of a sensor layer for explaining an operation of the sensor driving unit according to some embodiments of the present disclosure.

FIG. 26 is a view of a sensor layer for explaining an operation of the sensor driving unit according to some embodiments of the present disclosure. In describing FIG. 26, the same reference numerals are used for the components described through FIG. 21, and descriptions thereof will be omitted.

Referring to FIGS. 20 and 26, the pen PN according to some embodiments of the present disclosure may be located at the second position PP2 overlapping the second area AR2. Current Ir' may flow through an inductor L while the RLC resonance circuit of the pen PN discharges the charged charges. Magnetic fields may be generated by the current Ir'. Induced currents I-DRb', I-DRc', and I-DRd' may be generated in the plurality of first electrodes 210 and the plurality of second electrodes 220 by the current Ir'. The induced currents I-DRb', I-DRc', and I-DRd' may be generated in a direction opposite to the direction of the current Ir'.

The second induced current I-DRb' may be generated in the first electrodes 210 located at a right side of the second position PP2 in a direction opposite to the second direction DR2.

The third induced current I-DRc' may be generated in the second electrodes 220 located above the second position PP2 in the first direction DR1.

The fourth induced current I-DRd' may be generated in the second electrodes 220 located below the second position PP2 in a direction opposite to the first direction DR1.

As described above, when the pen PN is located at a peripheral portion of the sensing area 200A like the second area AR2, some of the induced current I-DRa (see FIG. 21) may not be generated, unlike the first area AR1 that is a central portion. For example, the first electrodes 210 may not be located at the left side of the second position PP2, and as a result, induced current may not be generated.

Unlike embodiments of the present disclosure, when calculating coordinates based on the sensing signals PRX1 and PRX2 generated by the pen PN located on the second area AR2, the coordinates may not be accurately calculated by the non-generated induced current. However, according to some embodiments of the present disclosure, the coordinate calculation part 210C may be driven differently to sense the coordinates CD on the first area AR1 and the second area AR2. When the sensor driving unit 200C determines that the pen PN is located on the first area AR1, the coordinate calculation part 210C may calculate the coordinates CD (see FIG. 23A) through the method described in FIGS. 21 to 25. When the sensor driving unit 200C determines that the pen PN is located on the second area AR2, the coordinates CD may be calculated using a method that will be described later. As a result, the electronic device 1000 (see FIG. 1) having relatively improved coordinate reliability and coordinate accuracy for the peripheral area may be provided.

Figure 27:
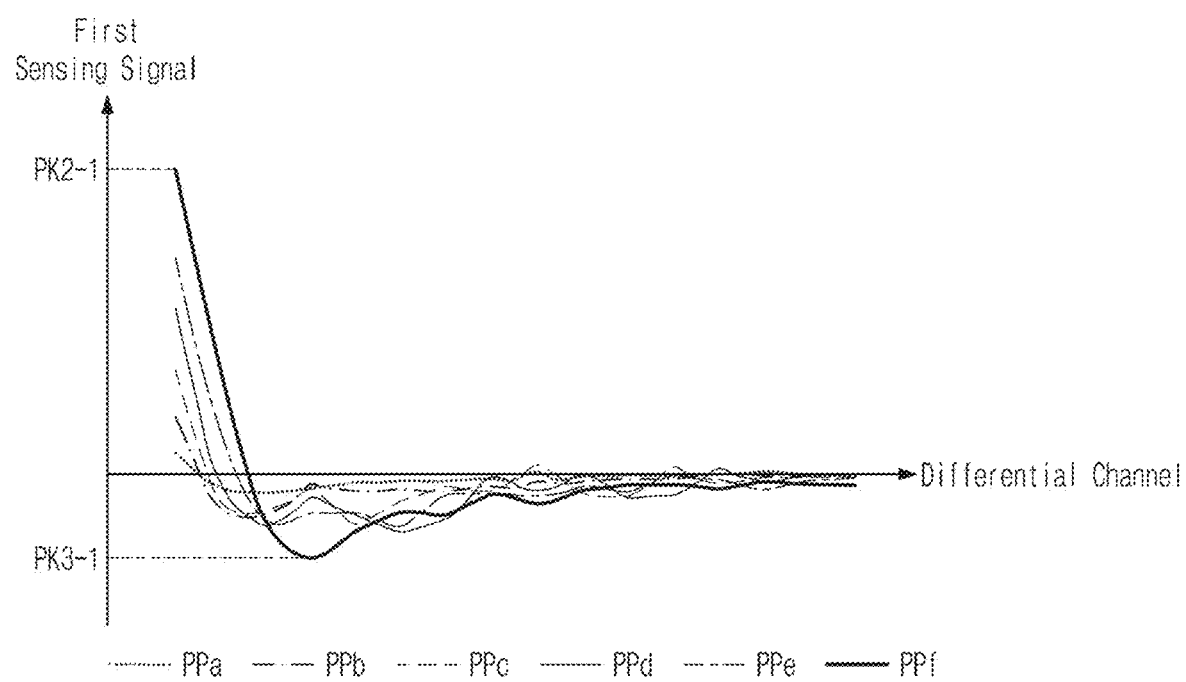
FIG. 27 a graph of a sensing current value illustrating a sensing signal acquired from a differential pair of channels according to some embodiments of the present disclosure.

FIG. 27 a graph of a sensing current value illustrating a sensing signal acquired form a differential pair of channels according to some embodiments of the present disclosure, and FIG. 28A is a view of a first lookup table according to some embodiments of the present disclosure. FIG. 27 illustrates an example of the first sensing signal PRX1 (see FIG. 19A) acquired from the channels defined by the first electrodes 210 (see FIG. 26).

Referring to FIGS. 20 and 26 to 28A, when the pen PN is located on the second area AR2, the coordinate calculation part 210C may differentially sense the adjacent channels or the channels spaced apart from each other of the plurality of first electrodes 210 to sense the first sensing signal PRX1. FIG. 27 illustrates the first sensing signal PRX1 acquired by differentially sensing an N-th first electrode and an N+2-th first electrode.

Each of sensing current value graphs PPa, PPb, PPc, PPd, PPe, and PPf may be a first sensing signal PRX1 measured differentially according to the position of the pen PN. The sensing current value graphs PPa, PPb, PPC, PPd, PPe, and PPf may be a first graph PPa, a second graph PPb, a third graph PPc, a fourth graph PPd, a fifth graph PPe, and a sixth graph PPf.

The first graph PPa may be a first sensing signal PRX1 sensed when the position of the pen PN moves by 0 mm (or about 0 mm) in the first direction DR1 from a left edge of the sensing area 200A. That is, the first graph PPa may be the first sensing signal PRX1 when the pen PN is located at the left edge of the sensing area 200A.

The second graph PPb may be a first sensing signal PRX1 sensed when the position of the pen PN moves by 1 mm (or about 1 mm) in the first direction DR1 from a left edge of the sensing area 200A.

The third graph PPc may be a first sensing signal PRX1 sensed when the position of the pen PN moves by 2 mm (or about 2 mm) in the first direction DR1 from a left edge of the sensing area 200A.

The fourth graph PPd may be a first sensing signal PRX1 sensed when the position of the pen PN moves by 3 mm (or about 3 mm) in the first direction DR1 from a left edge of the sensing area 200A.

The fifth graph PPe may be a first sensing signal PRX1 sensed when the position of the pen PN moves by 4 mm (or about 4 mm) in the first direction DR1 from a left edge of the sensing area 200A.

The sixth graph PPf may be a first sensing signal PRX1 sensed when the position of the pen PN moves by 5 mm (or about 5 mm) in the first direction DR1 from a left edge of the sensing area 200A.

Each of the sensing current value graphs PPa, PPb, PPc, PPd, PPe, and PPf may have a shape similar to a portion of the sensing current value graph of FIG. 23A. For example, if described based on FIG. 26, induced current I-DRb' generated in the first electrodes 210 may not be generated at the left side of the second position PP2, and thus, each of the sensing current value graphs PPa, PPb, PPc, PPd, PPe, and PPf may have a shape similar to that at the right side of the second peak value PK2 (see FIG. 23A) of the sensing current value graph of FIG. 23A.

Peak values PK2-1 and PK3-1 required for calculating the coordinates of the pen PN may be selected from each of the sensing current value graphs PPa, PPb, PPc, PPd, PPe, and PPf. FIG. 27 illustrates an example of the peak values PK2-1 and PK3-1 in the sixth graph PPf. The following descriptions may be equally applied to each of the sensing current value graphs PPa, PPb, PPc, PPd, PPe, and PPf.

The peak values PK2-1 and PK3-1 may include a second peak value PK2-1 and a third peak value PK3-1. The second peak value PK2-1 may have a positive sign, and the third peak value PK3-1 may have a negative sign. The second peak value PK2-1 may correspond to a maximum value in the sixth graph PPf. That is, the second peak value PK2-1 may be the maximum value of the first sensing signal PRX1 sensed on the second area AR2. The second peak value PK2-1 may be the first sensing signal PRX1 measured first in the sixth graph PPf.

The third peak value PK3-1 may correspond to a minimum value in the sixth graph PPf.

In a first lookup table LUT1, each of set coordinates according to the first signal values A1, A2, A3, A4, A5, A6, and A7 may be defined. The first signal values A1 to A7 may be defined as values corresponding to the sensing signal for each coordinate measured as an experimental value.

As the first signal values A1 to A7 increase in the first lookup table LUT1, the corresponding set coordinates may increase.

FIG. 28A illustrates an example each of seven first signal values A1 to A7 and corresponding set coordinates. A first-1 signal value A1 may correspond to a first set coordinate. The first set coordinate may be defined as 0 mm (or about 0 mm). A first-2 signal value A2 may correspond to a second set coordinate. The second set coordinate may be defined as 1 mm (or about 1 mm). A first-3 signal value A3 may correspond to a third set coordinate. The third set coordinate may be defined as 0 mm (or about 0 mm). A first-4 signal value A4 may correspond to a fifth set coordinate. The fifth set coordinate may be defined as 3 mm (or about 3 mm). A first-5 signal value A5 may correspond to a fifth set coordinate. The fifth set coordinate may be defined as 4 mm (or about 4 mm). A first-6 signal value A6 may correspond to a sixth set coordinate. The sixth set coordinate may be defined as 5 mm (or about 5 mm). A first-7 signal value A7 may correspond to a seventh set coordinate. The seventh set coordinate may be defined as 6 mm (or about 6 mm).

The lookup tables LUT may include the first lookup table LUT1. The coordinate calculation part 210C may receive the first lookup table LUT1. The coordinate calculation part 210C may select the second peak value PK2-1 from the first sensing signal PRX1. The first signal values A1 to A7 may correspond to the second peak value PK2-1. The coordinate calculation part 210C may search for the first-6 signal value A6 corresponding to the second peak value PK2-1 among the first signal values A1 to A7 of the first lookup table LUT1 to select the sixth set coordinate. The coordinate calculation part 210C may calculate an X coordinate CD based on the sixth set coordinate of 5 mm (or about 5 mm). That is, the coordinate calculator 210C may calculate the X coordinate CD of the pen PN for the second area AR2 based on the second peak value PK2-1 and the first lookup table LUT1.

A Y coordinate CD may also be detected from the plurality of second electrodes 220 in the same manner.

When there are no first signal values A1 to A7 corresponding to the second peak value PK2-1 in the first lookup table LUT1, the coordinate calculation part 210C may interpolate the coordinates using the adjacent first signal values to calculate the coordinates CD.

FIG. 28B is a view of lookup tables according to some embodiments of the present disclosure. In descriptions of FIG. 28B, the same reference numerals are used for components described through FIG. 28A, and descriptions thereof are omitted.

Referring to FIGS. 20, 27, and 28B, the lookup tables LUT may further include a second lookup table LUT2. The second lookup table LUT2 may be different from the first lookup table LUT1 (see FIG. 28A).

The set coordinates according to second signal values B1, B2, B3, B4, B5, B6, and B7 may be defined in the second lookup table LUT2. The second signal values B1 to B7 may be defined as values corresponding to the sensing signal for each coordinate measured as an experimental value.

As the second signal values B1 to B7 decrease in the second lookup table LUT2, the corresponding set coordinates may increase.

FIG. 28B illustrates an example each of seven second signal values B1 to B7 and corresponding set coordinates. A second-1 signal value B1 may correspond to the first set coordinate. A second-2 signal value B2 may correspond to the second set coordinate. A second-3 signal value B3 may correspond to the third set coordinate. A second-4 signal value B4 may correspond to the fourth set coordinate. A second-5 signal value B5 may correspond to the fifth set coordinate. A second-6 signal value B6 may correspond to the sixth set coordinate. A second-7 signal value B7 may correspond to the seventh set coordinate.

The coordinate calculation part 210C may receive the second lookup table LUT2. The coordinate calculation part 210C may select the third peak value PK3-1 from the first sensing signal PRX1. The second signal values B1 to B7 may correspond to the third peak value PK3-1. The coordinate calculation part 210C may search for the second-6 signal value B6 corresponding to the third peak value PK3-1 among the second signal values B1 to B7 of the second lookup table LUT2 to select the sixth set coordinate. The coordinate calculation part 210C may calculate an X coordinate CD based on the sixth set coordinate of 5 mm (or about 5 mm).

According to some embodiments of the present disclosure, the coordinate calculation part 210C may calculate the X coordinate CD of the pen PN based on the third peak value PK3-2 and the second lookup table LUT2 or calculate the X coordinate CD of the pen PN in consideration of the third peak value PK3-2 and the second lookup table LUT2 in the coordinates calculated through the second peak value PK-1 and the first lookup table LUT1. Thus, the electronic device 1000 (see FIG. 1) having relatively improved coordinates reliability may be provided.

FIG. 28C is a view of lookup tables according to some embodiments of the present disclosure. In the description of FIG. 28C, the same reference numerals are used for the components described through FIGS. 28A and 28B, and descriptions thereof will be omitted.

Referring to FIGS. 20 and 27 to 28C, the lookup table LUT may further include a third lookup table LUT3 and a fourth lookup table LUT4. Each of the third lookup table LUT3 and the fourth lookup table LUT4 may be different from the first lookup table LUT1 (see FIG. 28A) and the second lookup table LUT2 (see FIG. 28B).

Set coordinates according to signal values that are proportional to a four arithmetic operation between the second peak value PK2-1 and the third peak value PK3-1 may be defined in the third lookup table LUT3 and the fourth lookup table LUT4, respectively. The above four arithmetic operation may include addition, subtraction, multiplication, and division.

The set coordinates according to third signal values A1+B1, A2+B2, A3+B3, A4+B4, A5+B5, A6+B6, and A7+B7 may be defined in the third lookup table LUT3. Each of the third signal values A1+B1, A2+B2, A3+B3, A4+B4, A5+B5, A6+B6, and A7+B7 may correspond to a value obtained by adding the second peak value PK2-1 and the third peak value PK3-1. That is, the third signal values A1+B1, A2+B2, A3+B3, A4+B4, A5+B5, A6+B6, and A7+B7 may be values obtained by adding the first signal values A1 to A7 (see FIG. 28a) and the second signal values B1 to B7 (see FIG. 28B), respectively.

Each of set coordinates according to fourth signal values A1*B1, A2*B2, A3*B3, A4*B4, A5*B5, A6*B6, and A7*B7 may be defined in the fourth lookup table LUT4. Each of the fourth signal values A1*B1, A2*B2, A3*B3, A4*B4, A5*B5, A6*B6, and A7*B7 may correspond to a value multiplied by the second peak value PK2-1 and the third peak value PK3-1. That is, the fourth signal values A1*B1, A2*B2, A3*B3, A4*B4, A5*B5, A6*B6, and A7*B7 may be a value multiplied by each of the first signal values A1 to A7 (see FIG. 28A) and the second signal values B1 to B7 (see FIG. 28B).

The coordinate calculation part 210C may further receive the third lookup table LUT3 and the fourth lookup table LUT4. The coordinate calculation part 210C may calculate the coordinates CD of the pen PN by further considering the second peak value PK2-1 and the third peak value PK3-1 of the first detection signal PRX1, the third lookup table LUT3, and the fourth lookup table LUT4 on the second area AR2.

According to some embodiments of the present disclosure, the coordinate calculation part 210C may calculate the X coordinate CD of the pen PN on the second area AR2 based on at least one of the second peak value PK2-3, the third peak value PK3-2, or the first to fourth lookup tables LUT1, LUT2, LUT3, or LUT4. Thus, the electronic device 1000 (see FIG. 1) having relatively improved coordinates reliability may be provided.

FIG. 28D is a view of lookup tables according to some embodiments of the present disclosure. In the description of FIG. 28D, the same reference numerals are used for the components described through FIGS. 28A to 28C, and descriptions thereof will be omitted.

Referring to FIGS. 20, 27, and 28D, the lookup table LUT may further include a first-1 lookup table LUT1-1, a second-1 lookup table LUT2-1, a third-1 lookup table LUT3-1, and a fourth-1 lookup table LUT4-1.

Set coordinates according to first-1 signal values may be defined in the first-1 lookup table LUT1-1. The first-1 signal values may be values obtained by multiplying the first signal values A1 to A7 (see FIG. 28A) of the first lookup table LUT1 (see FIG. 28B) by a plurality of weights a1, a2, a3, a4, a5, a6, and a7, respectively. The plurality of weights a1 to a7 may be the same as or different from each other. That is, the first-1 signal values may correspond to values obtained by multiplying the corresponding second peak value PK2-1 by a weight (e.g., a set or predetermined weight).

Set coordinates according to the second-1 signal values may be defined in the second-1 lookup table LUT2-1. The second-1 signal values may be values obtained by multiplying the second signal values B1 to B7 (see FIG. 28B) of the second lookup table LUT2 (see FIG. 28B) by a plurality of weights b1, b2, b3, b4, b5, b6, and b7, respectively. The plurality of weights b1 to b7 may be the same as or different from each other. The second-1 signal values may correspond to values obtained by multiplying the corresponding third peak value PK3-1 by a weight (e.g., a set or predetermined weight).

Set coordinates according to the third-1 signal values may be defined in the third-1 lookup table LUT3-1. The third-1 signal values may be values obtained by multiplying the third signal values A1+B1, A2+B2, A3+B3, A4+B4, A5+B5, A6+B6, and A7+B7 (see FIG. 28C) of the third lookup table LUT3 (see FIG. 28C) by a plurality of weights c1, c2, c3, c4, c5, c6, and c7, respectively. The plurality of weights c1 to c7 may be the same as or different from each other. The third-1 signal values may correspond to values obtained by adding the corresponding second peak value PK2-1 and the third peak value PK3-1 and multiplied by a weight (e.g., a set or predetermined weight).

Set coordinates according to the fourth-1 signal values may be defined in the fourth-1 lookup table LUT4-1. The fourth-1 signal values may be values obtained by multiplying the fourth signal values A1*B1, A2*B2, A3*B3, A4*B4, A5*B5, A6*B6, and A7*B7 (see FIG. 28C) of the fourth lookup table LUT4 (see FIG. 28C) by a plurality of weights d1, d2, d3, d4, d5, d6, and d7, respectively. The plurality of weights d1 to d7 may be the same as or different from each other.

According to some embodiments of the present disclosure, even in the case in which the pen PN is tilted by the weights (e.g., the set or predetermined weights), the coordinates CD of the pen PN located on the second on AR2 may be calculated using the lookup tables LUT1-1, LUT2-1, LUT3-1, and LUT4-1. Thus, the electronic device 1000 (see FIG. 1) having relatively improved reliability may be provided.

Figure 29:
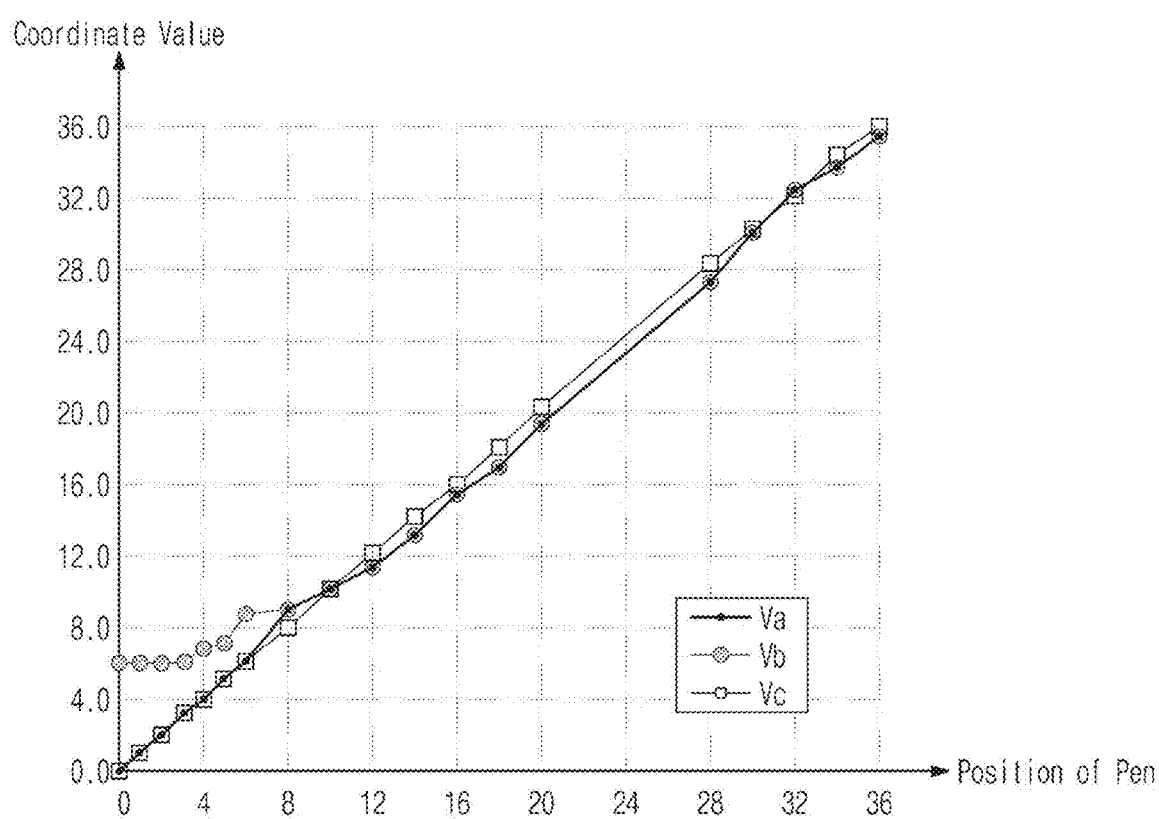
FIG. 29 is a graph illustrating coordinate values depending on a position of the pen according to some embodiments of the present disclosure.

FIG. 29 is a graph illustrating coordinate values depending on a position of the pen according to some embodiments of the present disclosure.

Referring to FIGS. 20, 26 to 28A, and 29, a first graph Va may be a coordinate value according to a position of the pen PN measured by using a method for driving the electronic device 1000 (see FIG. 1) according to some embodiments of the present disclosure.

A method for driving the electronic device including the display layer 100 (see FIG. 7), the sensor layer 200 on which the sensing area 200A including the first area AR1 and the second area AR2 surrounding the first area AR1 is defined, and a sensor driving unit 200C that drives the sensor layer 200 may include a process of sensing coordinates CD based on sensing signals PRX1 and PRX2 that are acquired by sensing the pen PN on the first area AR1 through the sensor driving unit 200C and a process of sensing the coordinates CD on the second area AR2 by driving the sensor driving unit 200C differently from the first area AR1.

The process of sensing the coordinates CD on the second area AR2 may include a process of calculating the coordinates CD of the pen PN based on the lookup table LUT in which at least one of the plurality of peak values PK2-1 and PK3-1 of the sensing signals PRX1 and PRX2 and the set coordinates according to the signal values are defined.

A first graph Va may be a graph obtained by calculating coordinates measured when the coordinates CD are calculated using the method described in FIGS. 21 to 25, and the coordinates CD are calculated on the second area AR2 using the method described in FIGS. 26 to 28D.

A second graph Vb may be a graph obtained by calculating coordinate values measured when the coordinate CD for the entire sensing area 200A are calculated only the method for calculating the coordinates CD on the first area AR1.

A reference graph Vc may be a graph in which the position and coordinate values of the pen PN are the same. That is, in an ideal case, the graph drawn based on the coordinates CD calculated by the coordinate calculation part 210C may be the same as the reference graph Vc.

Here, the second area AR2 may correspond to numbers 0 to 8 of the pen PN, and the first area AR1 may correspond to numbers 9 to 36 of the pen PN.

Unlike embodiments of the present disclosure, when calculating the coordinates of the pen PN like the second graph Vb, there is a difference between the second graph Vb and the reference graph Vc on the second area AR2 on which at least a portion of the first sensing signal PRX1 is not measured. However, according to some embodiments of the present disclosure, the coordinate calculation part 210C may calculate the coordinates CD using different methods on the first area AR1 and the second area AR2. When the pen PN is located on the second area AR2, the coordinate calculation part 210C may calculate the coordinates CD according to the position of the pen PN in a statistical manner using the lookup table LUT. The first graph Va may have substantially the same shape as the reference graph Vc. Thus, the electronic device 1000 (see FIG. 1) having relatively improved coordinate accuracy may be provided.

In FIG. 29, although an example in which the coordinates CD are sensed on one area at a left side of the second area AR2 and a portion of the first area AR1 is described, the same may be applied to the second area AR2 corresponding to top, bottom, left and right of the sensing area 200A.

Figure 30:
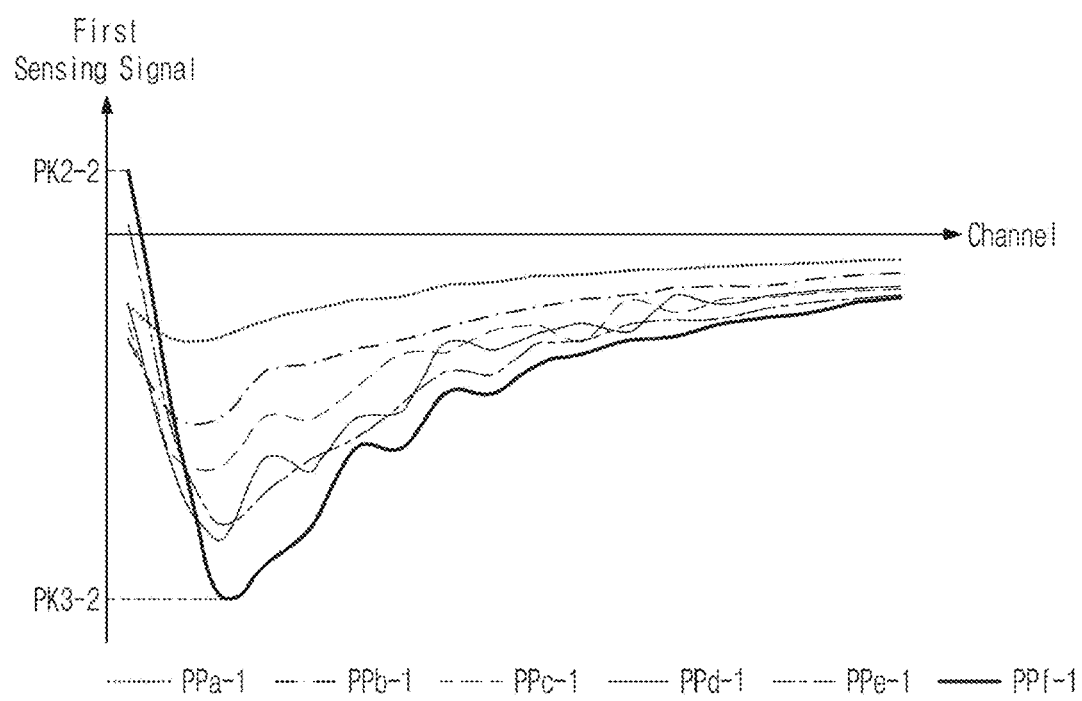
FIG. 30 is a graph of a sensing current value illustrating a sensing signal acquired from the channels according to some embodiments of the present disclosure.

FIG. 30 is a graph of a sensing current value illustrating a sensing signal acquired from the channels according to some embodiments of the present disclosure. FIG. 30 illustrates an example of the first sensing signal PRX1 (see FIG. 19A) acquired from the channels defined by the first electrodes 210 (see FIG. 26).

Referring to FIGS. 20 and 26 to 30, when the pen PN is located on the second area AR2, the coordinate calculation part 210C may sense the channels of the plurality of first electrodes 210 to sense the first sensing signal PRX1.

Each of sensing current value graphs PPa-1, PPb-1, PPc-1, PPd-1, PPe-1, and PPf-1 may be a first sensing signal PRX1 measured in a single-ended manner according to the position of the pen PN. The sensing current value graphs PPa-1, PPb-1, PPc-1, PPd-1, PPe-1, and PPf-1 may be a first graph PPa-1, a second graph PPb-1, a third graph PPc-1, a fourth graph PPd-1, a fifth graph PPe-1, and a sixth graph PPf-1.

The first graph PPa-1 may be a first sensing signal PRX1 sensed when the position of the pen PN moves by 0 mm (or about 0 mm) in the first direction DR1 from a left edge of the sensing area 200A. That is, the first graph PPa-1 may be the first sensing signal PRX1 when the pen PN is located at the left edge of the sensing area 200A.

The second graph PPb-1 may be a first sensing signal PRX1 sensed when the position of the pen PN moves by 1 mm (or about 1 mm) in the first direction DR1 from a left edge of the sensing area 200A.

The third graph PPc-1 may be a first sensing signal PRX1 sensed when the position of the pen PN moves by 2 mm (or about 2 mm) in the first direction DR1 from a left edge of the sensing area 200A.

The fourth graph PPd-1 may be a first sensing signal PRX1 sensed when the position of the pen PN moves by 3 mm (or about 3 mm) in the first direction DR1 from a left edge of the sensing area 200A.

The fifth graph PPe-1 may be a first sensing signal PRX1 sensed when the position of the pen PN moves by 4 mm (or about 4 mm) in the first direction DR1 from a left edge of the sensing area 200A.

The sixth graph PPf-1 may be a first sensing signal PRX1 sensed when the position of the pen PN moves by 5 mm (or about 5 mm) in the first direction DR1 from a left edge of the sensing area 200A.

Each of the sensing current value graphs PPa-1, PPb-1, PPc-1, PPd-1, PPe-1, and PPf-1 may have a shape similar to a portion of the sensing current value graph of FIG. 23B. For example, if described based on FIG. 26, induced current I-DRb' generated in the first electrodes 210 may not be generated at a left side of the second position PP2, and thus, each of the sensing current value graphs PPa-1, PPb-1, PPc-1, PPd-1, PPe-1, and PPf-1 may have a shape similar to that at a right side of the sensing current value graph of FIG. 23B.

Peak values PK2-2 and PK3-2 required for calculating the coordinates of the pen PN may be selected from each of the sensing current value graphs PPa-1, PPb-1, PPc-1, PPd-1, PPe-1, and PPf-1. FIG. 30 illustrates an example of the peak values PK2-2 and PK3-2 in the sixth graph PPf-1. The following descriptions may be applied to each of the sensing current value graphs PPa-1, PPb-1, PPc-1, PPd-1, PPe-1, and PPf-1.

The peak values PK2-2 and PK3-2 may include a second peak value PK2-2 and a third peak value PK3-2. The second peak value PK2-2 may be the first sensing signal PRX1 measured first in the sixth graph PPf-1. The third peak value PK3-2 may correspond to a minimum value in the sixth graph PPf-1.

Each of set coordinates according to a first signal value may be defined in the lookup table LUT. The coordinate calculation part 210C may receive a lookup table LUT. The coordinate calculation part 210C may select the second peak value PK2-2 or the third peak value PK3-2 from the first sensing signal PRX1. The first signal value may correspond to the second peak value PK2-2 or the third peak value PK3-2. The coordinate calculation part 210C may search one corresponding to the second peak value PK2-2 or the third peak value PK3-2 among the first signal values of the lookup table LUT to select the set coordinates stored in the lookup table LUT. The coordinate calculation part 210C may calculate an X coordinate CD based on the set coordinates. That is, the coordinate calculator 210C may calculate the X coordinate CD of the pen PN for the second area AR2 based on the second peak value PK2-2, the third peak value PK3-2, and the first lookup table LUT1. A Y coordinate CD may also be detected from the plurality of second electrodes 220 in the same manner.

According to some embodiments of the present disclosure, the coordinate calculator 210C may calculate the X coordinate CD of the pen PN on the second area AR2 based on the second peak value PK2-3, the third peak value PK3-2, and the lookup table LUT. Thus, the electronic device 1000 (see FIG. 1) having relatively improved coordinates reliability may be provided.

As described above, the coordinate calculation part may calculate the coordinates in different manners on the first area and the second area. When the input device is located on the second area, the coordinate calculation part may calculate the coordinates according to the position of the input device in the statistical manner using the lookup table. The graph measured as described above may have substantially the same shape as the reference graph that defines the ideal coordinates according to the movement of the input device. Therefore, the electronic device having the relatively improved coordinate accuracy may be provided.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

It will be apparent to those skilled in the art that various modifications and deviations can be made in the inventive concept. Thus, it is intended that the inventive concept covers the modifications and deviations of this invention provided they come within the scope of the appended claims and their equivalents. Accordingly, the technical scope of the inventive concept should not be limited to the contents described in the detailed description of the specification, but should be determined by the appended claims, and their equivalents.

What is claimed is:

1. An electronic device comprises:
   a display panel;
   a sensor layer on the display panel, the sensor layer having a sensing area corresponding to a display area of the display panel, the sensing area comprising a first area and a second area surrounding the first area; and
   a sensor driver configured to:
      drive the sensor layer;
      receive a sensing signal corresponding to an input device, the sensing signal comprising a first peak value, a second peak value, and a third peak value; and
      calculate coordinates of the input device at the second area based on the second peak value and the third peak value.

2. The electronic device of claim 1, wherein the sensor driver is further configured to calculate coordinates of the input device at the first area based on an interpolation between two sensors in the second area with signals that have different magnitudes and opposite signs.

3. The electronic device of claim 1, wherein the sensor driver is further configured to calculate coordinates of the input device at the first area based on a differential of the sensing signal and a determination of a region at which an amplitude is greatest.

4. The electronic device of claim 1, wherein the sensor driver is further configured to calculate the coordinates of the input device at the second area based on a comparison of the second peak value and the third peak value with a look up table.

5. The electronic device of claim 4, wherein the sensor driver comprises a memory, and the look up table is stored in the memory.

6. The electronic device of claim 4, further comprising a main driver configured to drive the sensor driver, the main driver comprising a memory, the look up table being stored in the memory.

7. The electronic device of claim 4, wherein the sensor driver is further configured to calculate the coordinates of the input device based on a sum of the second peak value and the third peak value.

8. The electronic device of claim 4, wherein the sensor driver is further configured to calculate the coordinates of the input device based on a weight multiplied by at least one of the second peak value or the third peak value.

9. The electronic device of claim 1, wherein the sensing signal is generated based on a differential signal that is sensed differently between different channels of the sensor layer.

10. An electronic device comprises:
    a sensor layer having a sensing area comprising a first area and a second area surrounding the first area; and
    a sensor driver configured to:
        receive a sensing signal corresponding to an input device, the sensing signal comprising a first peak value, a second peak value, and a third peak value; and
        calculate coordinates of the input device at the second area based on the second peak value and the third peak value.

11. The electronic device of claim 10, wherein the sensor driver is further configured to calculate coordinates of the input device at the first area based on an interpolation between two sensors in the second area with signals that have different magnitudes and opposite signs.

12. The electronic device of claim 10, wherein the sensor driver is further configured to calculate coordinates of the input device at the first area based on a differential of the sensing signal and a determination of a region at which an amplitude is greatest.

13. The electronic device of claim 10, wherein the sensor driver is further configured to calculate the coordinates of the input device at the second area based on a comparison of the second peak value and the third peak value with a look up table.

14. The electronic device of claim 13, wherein the sensor driver comprises a memory, and the look up table is stored in the memory.

15. The electronic device of claim 13, further comprising a main driver configured to drive the sensor driver, the main driver comprising a memory, the look up table being stored in the memory.

16. The electronic device of claim 13, wherein the sensor driver is further configured to calculate the coordinates of the input device based on a sum of the second peak value and the third peak value.

17. The electronic device of claim 13, wherein the sensor driver is further configured to calculate the coordinates of the input device based on a weight multiplied by at least one of the second peak value or the third peak value.

18. The electronic device of claim 10, wherein the sensing signal is generated based on a differential signal that is sensed differently between different channels of the sensor layer.

19. An electronic device comprises:
    a display panel;
    an application processor comprising a memory storing a lookup table;
    a sensor layer on the display panel, the sensor layer having a sensing area corresponding to a display area of the display panel, the sensing area comprising a first area and a second area surrounding the first area; and
    a sensor driver, the sensor driver being configured to:
        drive the sensor layer;
        receive a sensing signal corresponding to an input device, the sensing signal comprising a first peak value, a second peak value, and a third peak value; and
        calculate coordinates of the input device at the second area based on a comparison of at least one of the second peak value or the third peak value with values stored in the lookup table.

20. The electronic device of claim 19, wherein the sensor driver is further configured to calculate coordinates of the input device at the first area based on an interpolation between two sensors in the second area with signals that have different magnitudes and opposite signs.

21. The electronic device of claim 19, wherein the sensor driver is further configured to calculate coordinates of the input device at the first area based on a differential of the sensing signal and a determination of a region at which an amplitude is greatest.

22. The electronic device of claim 19, wherein the sensor driver is further configured to calculate the coordinates of the input device based on a sum of the second peak value and the third peak value.

23. The electronic device of claim 19, wherein the sensor driver is further configured to calculate the coordinates of the input device based on a weight multiplied by at least one of the second peak value or the third peak value.

24. The electronic device of claim 19, wherein the sensing signal is generated based on a differential signal that is sensed differently between different channels of the sensor layer.

25. An electronic device comprises:
    a display panel;
    a sensor layer on the display panel, the sensor layer having a sensing area corresponding to a display area of the display panel, the sensing area comprising a first area and a second area surrounding the first area, wherein a width of the second area, from an edge of the sensor layer to an edge of the first area, is equal to a pitch between adjacent channels multiplied by a predetermined number of channels divided by 2; and
    a sensor driver configured to:
        drive the sensor layer;

receive a sensing signal corresponding to an input device, the sensing signal comprising a first peak value, a second peak value, and a third peak value; and calculate coordinates of the input device at the second area based on the second peak value and the third peak value.

26. The electronic device of claim 25, wherein the predetermined number of channels is 3.

27. The electronic device of claim 25, wherein the pitch between adjacent channels is 4 millimeters.

28. The electronic device of claim 25, wherein the sensor driver is further configured to calculate the coordinates of the input device at the second area based on a comparison of the second peak value and the third peak value with a look up table.

29. The electronic device of claim 28, wherein the sensor driver is further configured to calculate the coordinates of the input device based on a sum of the second peak value and the third peak value.

30. The electronic device of claim 28, wherein the sensor driver is further configured to calculate the coordinates of the input device based on a weight multiplied by at least one of the second peak value or the third peak value.

* * * * *